US012683660B2

(12) United States Patent　　　　(10) Patent No.:　US 12,683,660 B2
Zhu et al.　　　　　　　　　　　　　(45) Date of Patent:　　Jul. 14, 2026

(54) METHOD AND APPARATUS FOR CONFIGURING MEASUREMENT AND REPORTING SETTINGS

(71) Applicant: Samsung Electronics Co., Ltd., Suwon-si (KR)

(72) Inventors: Dalin Zhu, Allen, TX (US); Emad Nader Farag, Flanders, NJ (US); Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 448 days.

(21) Appl. No.: 18/343,525

(22) Filed: Jun. 28, 2023

(65) Prior Publication Data

US 2024/0022300 A1　　Jan. 18, 2024

Related U.S. Application Data

(60) Provisional application No. 63/391,997, filed on Jul. 25, 2022, provisional application No. 63/359,639, filed on Jul. 8, 2022.

(51) Int. Cl.
H04L 5/00　　　　(2006.01)
H04B 7/06　　　　(2006.01)
　　　　　(Continued)

(52) U.S. Cl.
CPC ...... H04B 7/0626 (2013.01); H04W 72/0453 (2013.01); H04W 72/23 (2023.01); H04B 7/0413 (2013.01)

(58) Field of Classification Search
CPC .. H04B 7/0626; H04B 7/0413; H04B 7/0695; H04B 7/06952; H04W 72/0453;
　　　　　(Continued)

(56) References Cited

U.S. PATENT DOCUMENTS

| | | |
|---|---|---|
| 2019/0058517 A1 | 2/2019 | Kang et al. |
| 2020/0259608 A1 | 8/2020 | Kakishima et al. |

(Continued)

FOREIGN PATENT DOCUMENTS

| | | | | |
|---|---|---|---|---|
| EP | 3637902 A1 * | 4/2020 | .......... | H04W 72/046 |
| EP | 3625924 B1 | 5/2021 | | |

(Continued)

OTHER PUBLICATIONS

Extended European Search Report issued Jul. 14, 2025 regarding Application No. 23835851.9, 12 pages.

(Continued)

*Primary Examiner* — Thai Nguyen

(57) ABSTRACT

Methods and apparatus for configuring measurement and reporting settings in a wireless communication system. A method performed by a user equipment (UE) includes receiving first information for a channel state information (CSI) reporting setting to enable group based frequency selective beam reporting and receiving second information indicating a set of frequency subbands for the CSI reporting setting. The method further includes determining, based on the first and second information, one or more groups of resource indicators and transmitting, in a first beam report, the one or more groups of resource indicators. Each group of the one or more groups of resource indicators respectively corresponds to at least one frequency subband from the set of frequency subbands. A resource indicator from the one or more groups of resource indicators is a synchronization signal block resource indicator (SSBRI) or a CSI reference signal resource indicator (CRI).

18 Claims, 13 Drawing Sheets

(51) Int. Cl.

| | | |
|---|---|---|
| *H04W 72/0453* | (2023.01) | |
| *H04W 72/23* | (2023.01) | |
| *H04B 7/0413* | (2017.01) | |

(58) Field of Classification Search
CPC ... H04W 72/23; H04W 24/10; H04W 72/046;
H04W 72/231; H04W 72/232; H04L
5/0048; H04L 5/0057; H04L 5/0094;
H04L 5/005; H04L 5/0053
See application file for complete search history.

(56) References Cited

U.S. PATENT DOCUMENTS

| | | | | |
|---|---|---|---|---|
| 2020/0336194 A1* | 10/2020 | Karjalainen | .......... | H04L 5/0051 |
| 2022/0060266 A1 | 2/2022 | Xiao et al. | | |
| 2022/0140878 A1 | 5/2022 | Zhu et al. | | |
| 2023/0189035 A1* | 6/2023 | Yuan | .................... | H04B 17/318 |
| | | | | 370/252 |

FOREIGN PATENT DOCUMENTS

| | | | | |
|---|---|---|---|---|
| KR | 10-2022-0004162 A | 1/2022 | | |
| WO | WO-2019165224 A1 * | 8/2019 | ............. | H04L 5/005 |
| WO | 2020063983 A1 | 4/2020 | | |
| WO | 2024010423 A1 | 1/2024 | | |

OTHER PUBLICATIONS

"3rd Generation Partnership Project; Technical Specification Group Radio Access Network; NR; Physical channels and modulation (Release 16)", 3GPP TS 38.211 V16.1.0, Mar. 2020, 130 pages.
"3rd Generation Partnership Project; Technical Specification Group Radio Access Network; NR; Multiplexing and channel coding (Release 16)", 3GPP TS 38.212 V16.1.0, Mar. 2020, 146 pages.
"3rd Generation Partnership Project; Technical Specification Group Radio Access Network; NR; Physical layer procedures for control (Release 16)" 3GPP TS 38.213 V16.1.0, Mar. 2020, 156 pages.
"3rd Generation Partnership Project; Technical Specification Group Radio Access Network; NR; Physical layer procedures for data (Release 16)", 3GPP TS 38.214 V16.1.0, Mar. 2020, 151 pages.
"5G; NR; Medium Access Control (MAC) protocol specification (3GPP TS 38.321 version 16.1.0 Release 16)", ETSI TS 138 321 V16.1.0, Jul. 2020, 153 pages.
"5G; NR; Radio Resource Control (RRC); Protocol specification (3GPP TS 38.331 version 16.1.0 Release 16)", ETSI TS 138 331 V16.1.0, Jul. 2020, 886 pages.
International Search Report and Written Opinion issued Oct. 4, 2023 regarding International Application No. PCT/KR2023/ 009548, 7 pages.
Nokia, "Introduction of further enhancements on MIMO for NR", 3GPP TSG-RAN WG1 Meeting #107-e, R1-2112483, Nov. 2021, 94 pages.
"3rd Generation Partnership Project; Technical Specification Group Radio Access Network; NR; Physical layer procedures for data (Release 17)", 3GPP TS 38.214 V17.2.0, Jun. 2022, 228 pages.

* cited by examiner

102

210a

205a

TRANSCEIVER

210b

205b

TRANSCEIVER

• • •

210n

205n

TRANSCEIVER

CONTROLLER/ PROCESSOR

225

BACKHAUL/ NETWORK IF

225

220

MEMORY

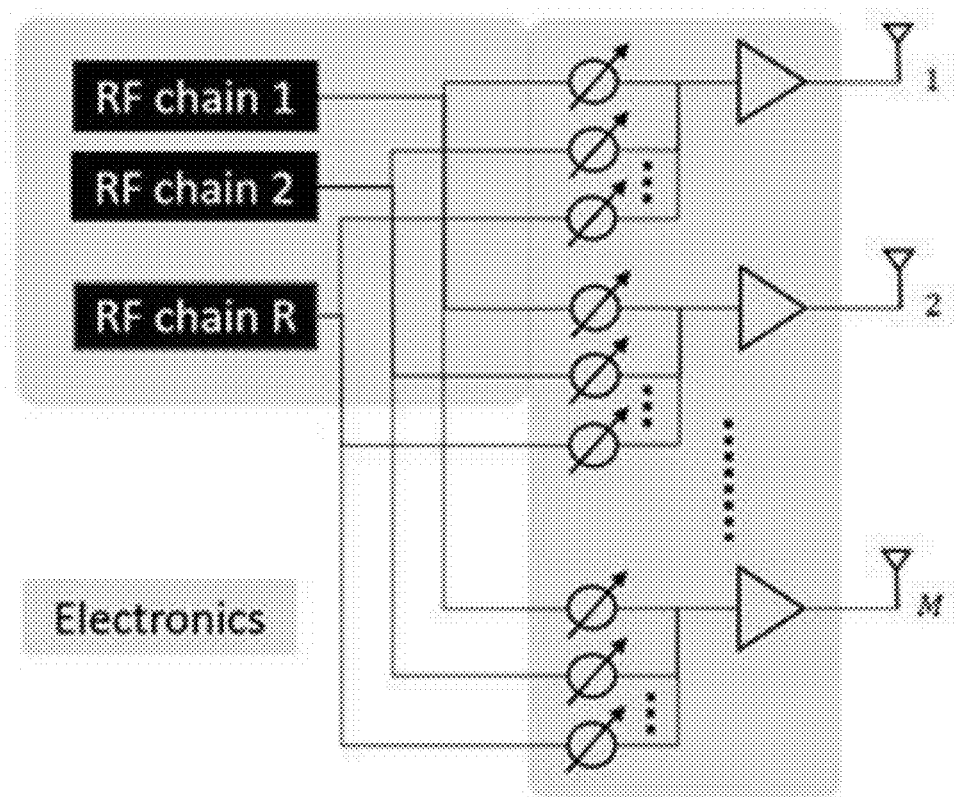
FIG. 7

1000

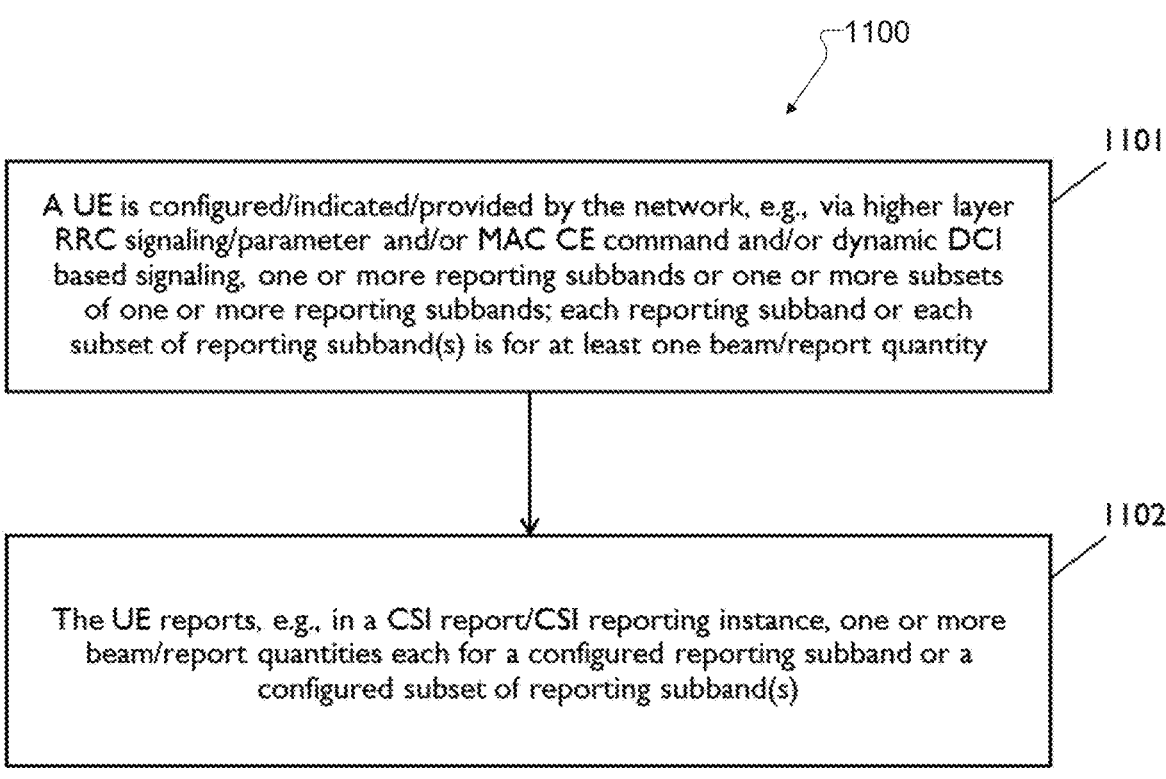

┌1100

┌1101

A UE is configured/indicated/provided by the network, e.g., via higher layer RRC signaling/parameter and/or MAC CE command and/or dynamic DCI based signaling, one or more reporting subbands or one or more subsets of one or more reporting subbands; each reporting subband or each subset of reporting subband(s) is for at least one beam/report quantity

┌1102

The UE reports, e.g., in a CSI report/CSI reporting instance, one or more beam/report quantities each for a configured reporting subband or a configured subset of reporting subband(s)

2-part UCI/CSI for FSBM

| Part 1 | Part 2 |
|---|---|

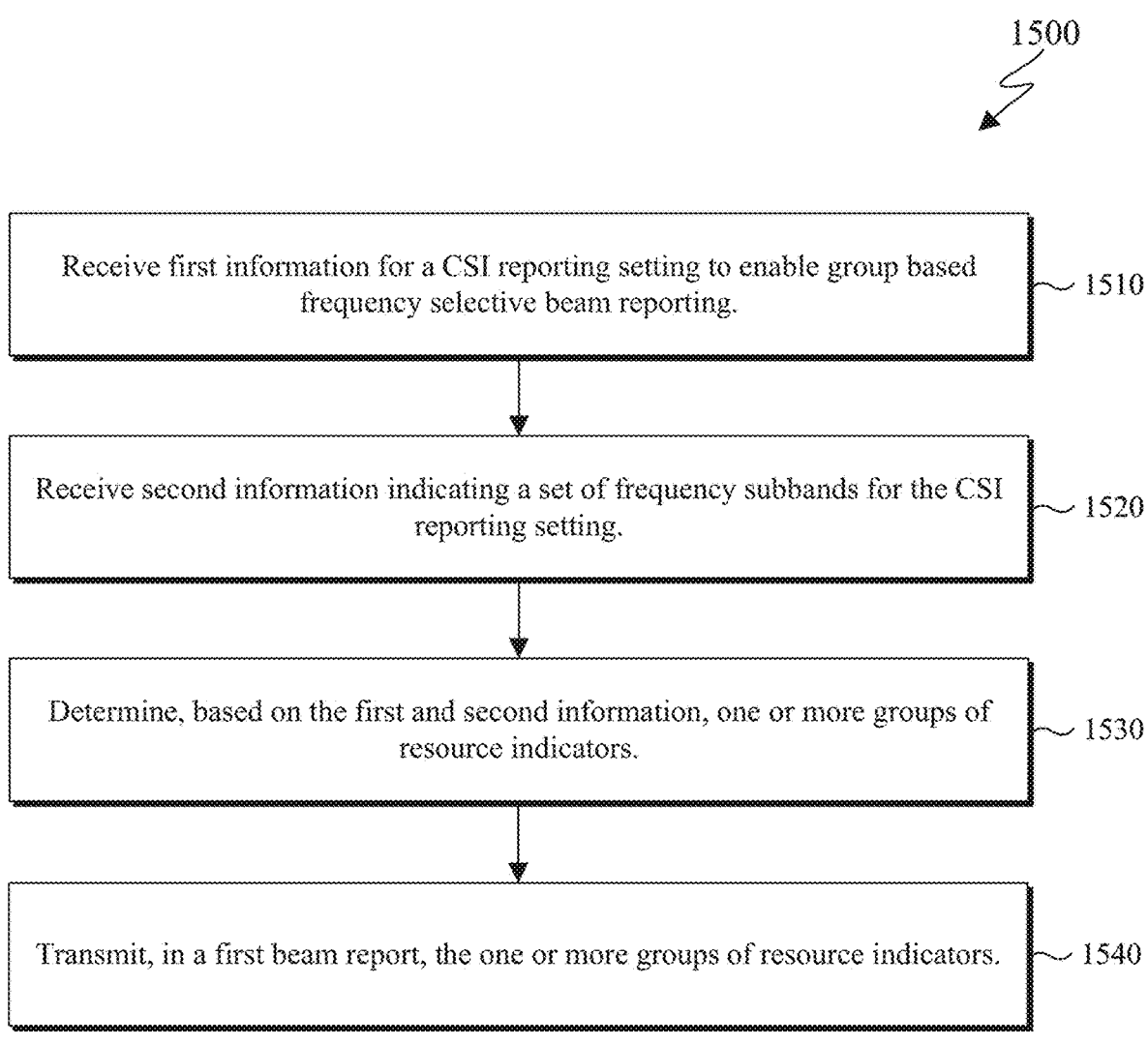

1500

Receive first information for a CSI reporting setting to enable group based frequency selective beam reporting.  ~ 1510

Receive second information indicating a set of frequency subbands for the CSI reporting setting.  ~ 1520

Determine, based on the first and second information, one or more groups of resource indicators.  ~ 1530

Transmit, in a first beam report, the one or more groups of resource indicators.  ~ 1540

FIG. 15

METHOD AND APPARATUS FOR CONFIGURING MEASUREMENT AND REPORTING SETTINGS

CROSS-REFERENCE TO RELATED AND CLAIM OF PRIORITY

The present application claims priority under 35 U.S.C. § 119(e) to U.S. Provisional Patent Application No. 63/359,639 filed on Jul. 8, 2022, and U.S. Provisional Patent Application No. 63/391,997 filed on Jul. 25, 2022, which is hereby incorporated by reference in their entirety.

TECHNICAL FIELD

The present disclosure relates generally to wireless communication systems and, more specifically, the present disclosure relates to methods and apparatus for configuring measurement and reporting settings.

BACKGROUND

Wireless communication has been one of the most successful innovations in modern history. Recently, the number of subscribers to wireless communication services exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices. In order to meet the high growth in mobile data traffic and support new applications and deployments, improvements in radio interface efficiency and coverage are of paramount importance. To meet the demand for wireless data traffic having increased since deployment of 4G communication systems, and to enable various vertical applications, 5G communication systems have been developed and are currently being deployed.

SUMMARY

The present disclosure relates to configuring measurement and reporting settings.

In one embodiment, a user equipment (UE) is provided. The UE includes a transceiver configured to receive first information for a channel state information (CSI) reporting setting to enable group based frequency selective beam reporting and receive second information indicating a set of frequency subbands for the CSI reporting setting. The UE further includes a processor operably coupled to the transceiver. The processor is configured to determine, based on the first and second information, one or more groups of resource indicators. The transceiver is further configured to transmit, in a first beam report, the one or more groups of resource indicators. Each group of the one or more groups of resource indicators respectively corresponds to at least one frequency subband from the set of frequency subbands. A resource indicator from the one or more groups of resource indicators is a synchronization signal block resource indicator (SSBRI) or a CSI reference signal resource indicator (CRI).

In another embodiment, a base station (BS) is provided. The BS includes a transceiver configured to transmit first information for a CSI reporting setting to enable group based frequency selective beam reporting; transmit second information indicating a set of frequency subbands for the CSI reporting setting; and receive, in a first beam report, the one or more groups of resource indicators that are based on the first and second information. Each group of the one or more groups of resource indicators respectively corresponds to at least one frequency subband from the set of frequency subbands. A resource indicator from the one or more groups of resource indicators is a SSBRI or a CRI.

In yet another embodiment, a method performed by a UE is provided. The method includes receiving first information for a CSI reporting setting to enable group based frequency selective beam reporting and receiving second information indicating a set of frequency subbands for the CSI reporting setting. The method further includes determining, based on the first and second information, one or more groups of resource indicators and transmitting, in a first beam report, the one or more groups of resource indicators. Each group of the one or more groups of resource indicators respectively corresponds to at least one frequency subband from the set of frequency subbands. A resource indicator from the one or more groups of resource indicators is a SSBRI or a CRI.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 illustrates an example of an array architecture for hybrid beamforming according to embodiments of the present disclosure;

FIG. 11 illustrates a flowchart of an example UE procedure for reporting quantities for a configured reporting subband or subset of reporting subbands according to embodiments of the present disclosure;

FIG. 12 illustrates an example of a two-part uplink control information (UCI)/channel state information (CSI) for FSBM according to embodiments of the present disclosure;

FIG. 15 illustrates an example method performed by a UE in a wireless communication system according to embodiments of the present disclosure.

DETAILED DESCRIPTION

FIGS. 1-15, discussed below, and the various, non-limiting embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, and to enable various vertical applications, 5G/NR communication systems have been developed and are currently being deployed. The 5G/NR communication system is implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G, or even later releases which may use terahertz (THz) bands.

The following documents and standards descriptions are hereby incorporated by reference into the present disclosure as if fully set forth herein: [1] 3GPP TS 38.211 v16.1.0, "NR; Physical channels and modulation;" [2] 3GPP TS 38.212 v16.1.0, "NR; Multiplexing and Channel coding;" [3] 3GPP TS 38.213 v16.1.0, "NR; Physical Layer Procedures for Control;" [4] 3GPP TS 38.214 v16.1.0, "NR; Physical Layer Procedures for Data;" [5] 3GPP TS 38.321 v16.1.0, "NR; Medium Access Control (MAC) protocol specification;" and [6] 3GPP TS 38.331 v16.1.0, "NR; Radio Resource Control (RRC) Protocol Specification."

Figure 1:
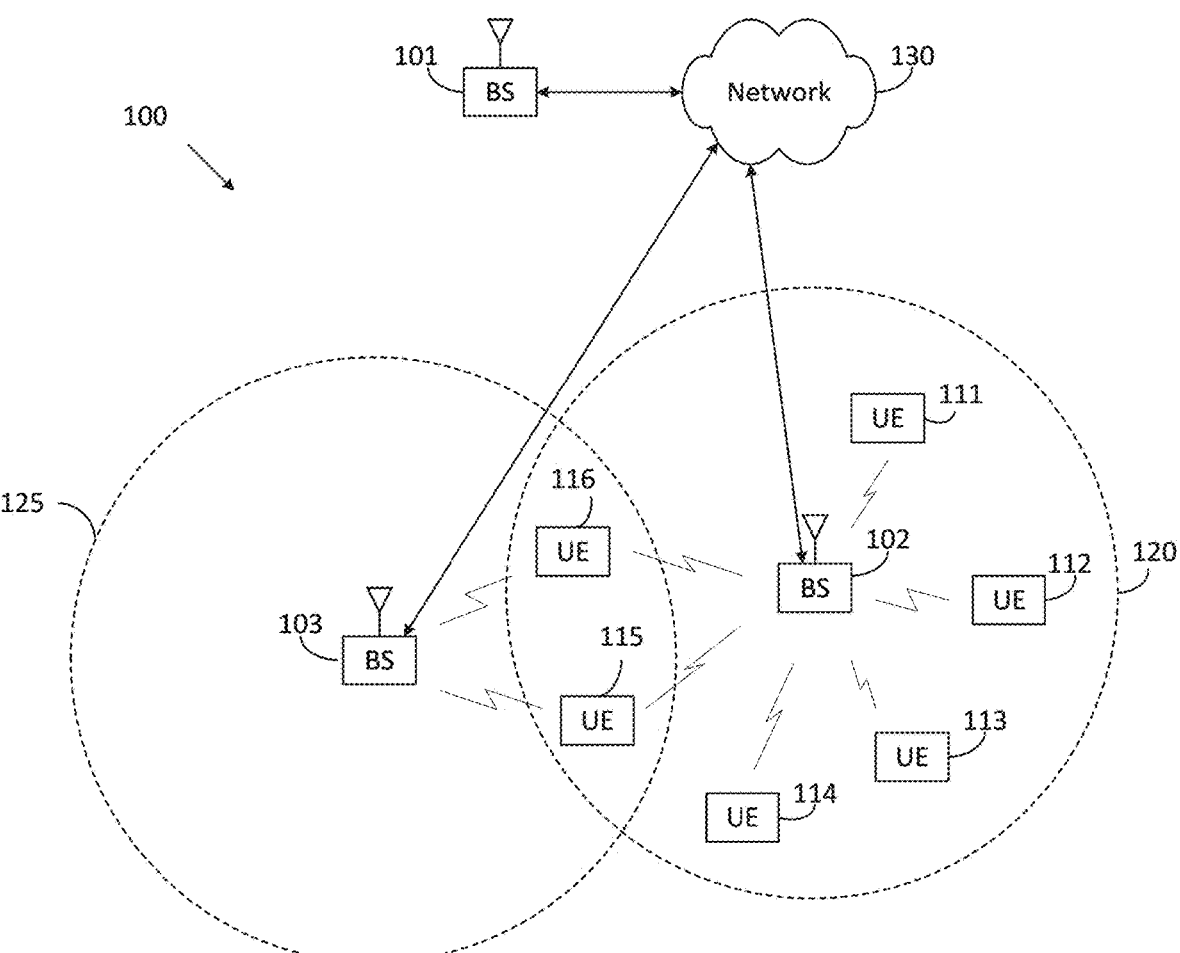
FIG. 1 illustrates an example wireless network according to embodiments of the present disclosure.
Figure 2:
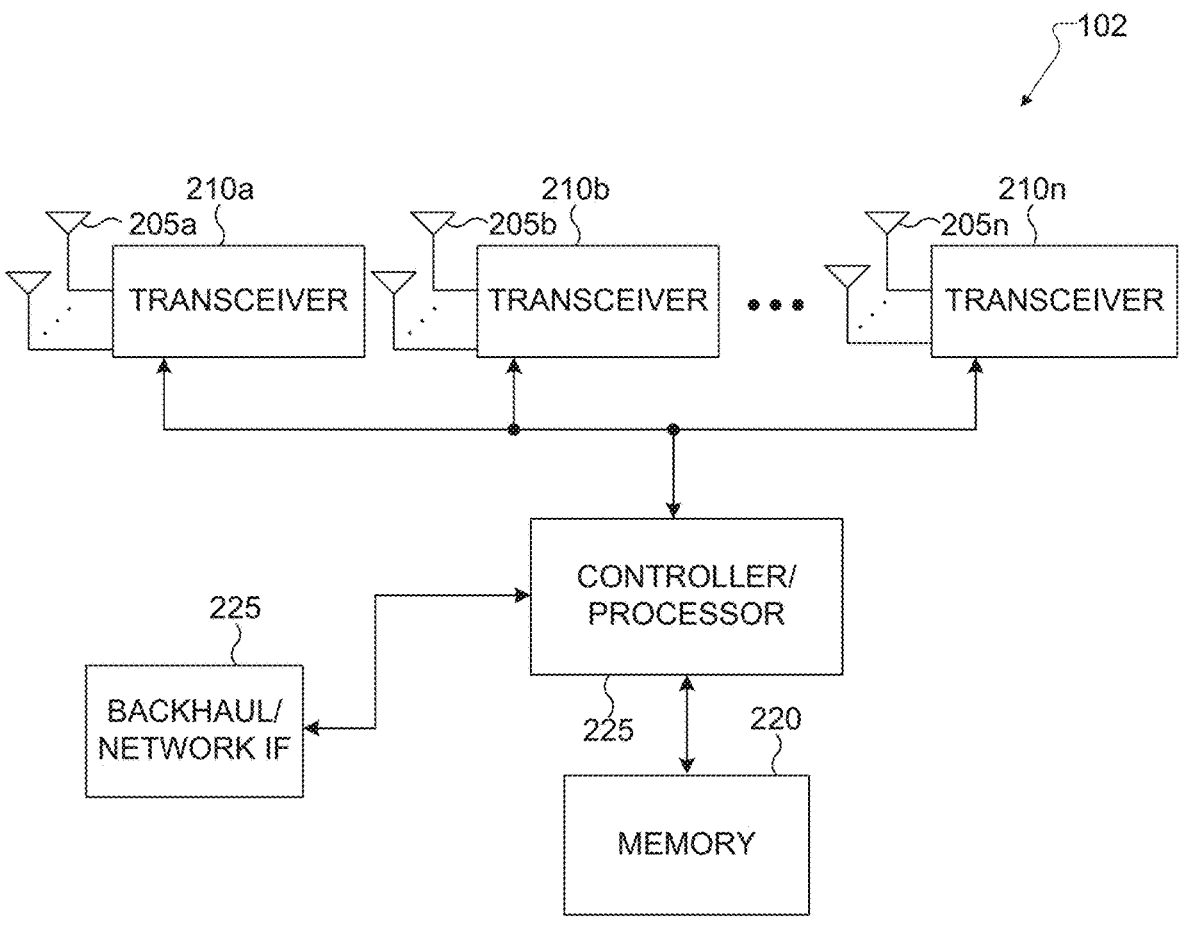
FIG. 2 illustrates an example gNodeB (gNB) according to embodiments of the present disclosure.
Figure 3:
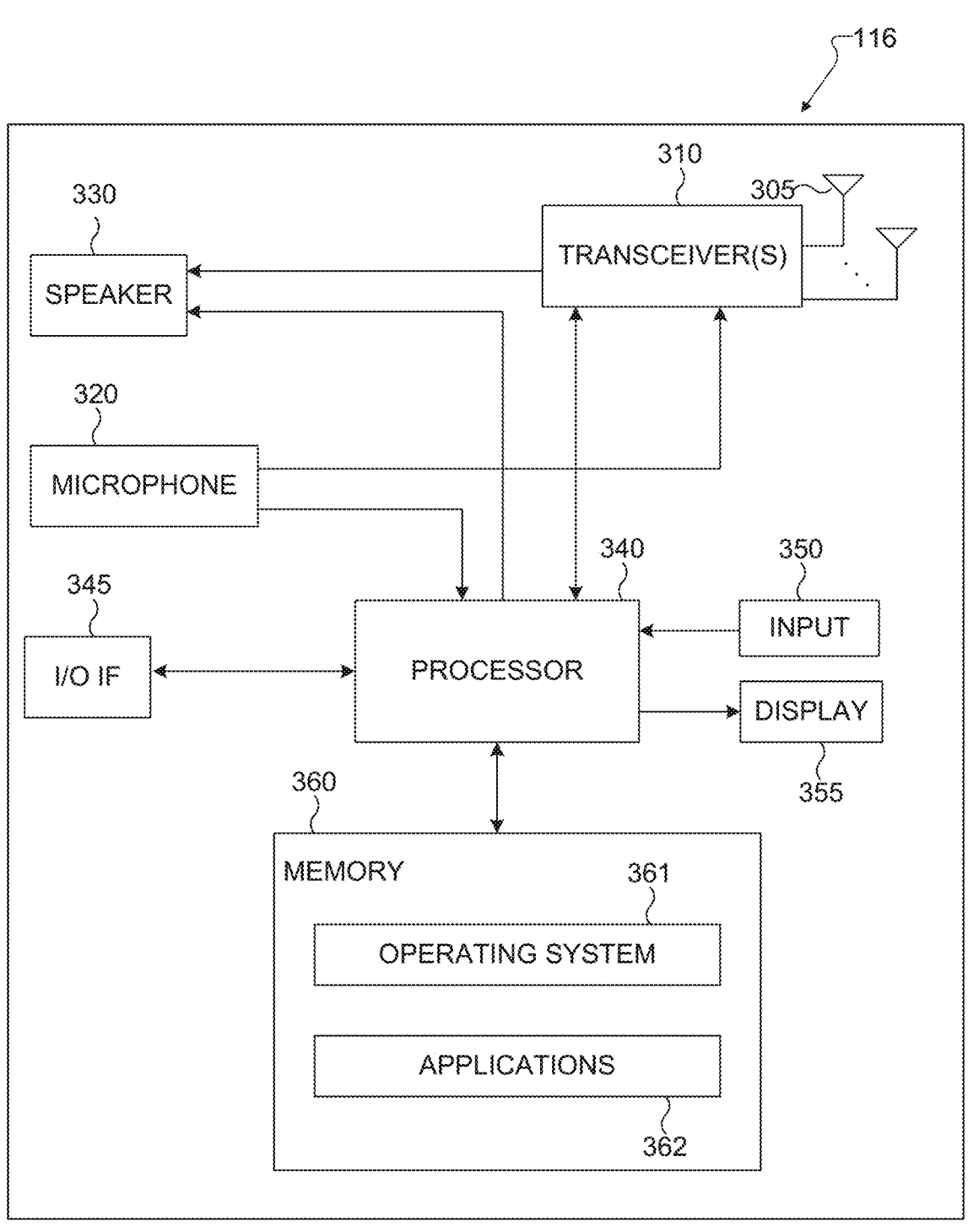
FIG. 3 illustrates an example user equipment (UE) according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to how different embodiments may be implemented. Different embodiments of the present disclosure may be implemented in any suitably arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR $3^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

The dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for utilizing configurations of measurement and reporting settings. In certain embodiments, one or more of the BSs 101-103 include circuitry, programing, or a combination thereof to support configuring measurement and reporting settings.

Although FIG. 1 illustrates one example of a wireless network, various changes may be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming radio frequency (RF) signals, such as signals transmitted by UEs in the wireless network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of uplink (UL) channel signals and the transmission of downlink (DL) channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for supporting configuring measurement and reporting settings. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna(s) 305, an incoming RF signal transmitted by a gNB of the wireless network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. For example, the processor 340 may execute processes for utilizing configurations of measurement and reporting settings as described in embodiments of the present disclosure. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes, for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4A:
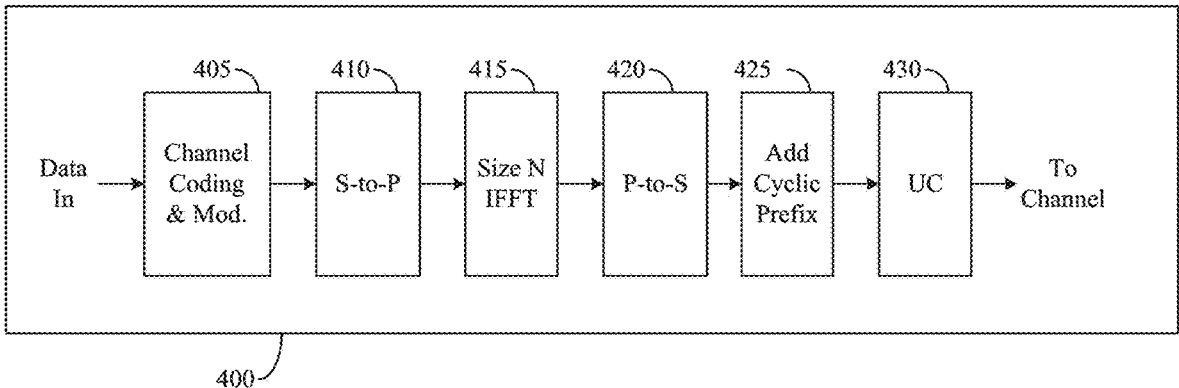
FIGS. 4A and 4B illustrate an example of a wireless transmit and receive paths according to embodiments of the present disclosure.
Figure 4B:
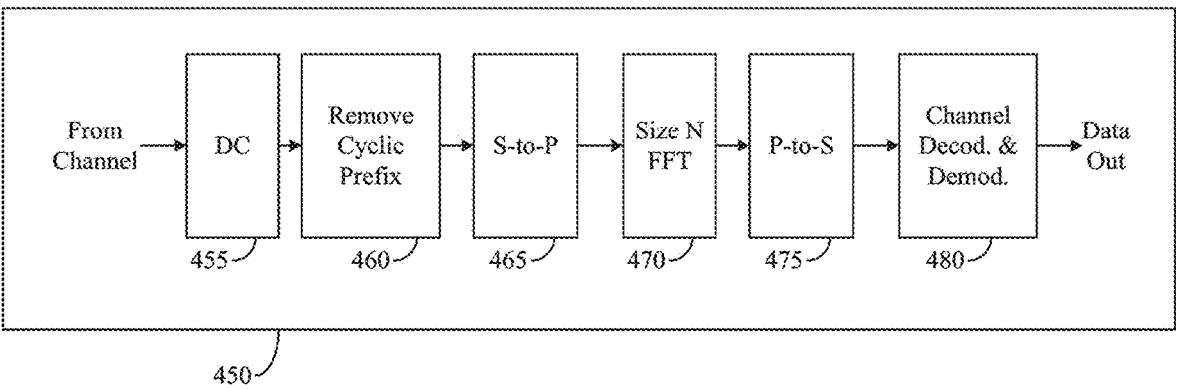

FIG. 4A and FIG. 4B illustrate an example of wireless transmit and receive paths 400 and 450, respectively, according to embodiments of the present disclosure. For example, a transmit path 400 may be described as being implemented in a gNB (such as gNB 102), while a receive path 450 may be described as being implemented in a UE (such as UE 116). However, it will be understood that the receive path 450 can be implemented in a gNB and that the transmit path 400 can be implemented in a UE. In some embodiments, the receive path 450 is configured to support configuration of measurement and reporting settings as described in embodiments of the present disclosure.

As illustrated in FIG. 4A, the transmit path 400 includes a channel coding and modulation block 205, a serial-to-parallel (S-to-P) block 410, a size N Inverse Fast Fourier Transform (IFFT) block 415, a parallel-to-serial (P-to-S) block 420, an add cyclic prefix block 425, and an up-converter (UC) 430. The receive path 250 includes a down-converter (DC) 455, a remove cyclic prefix block 460, a S-to-P block 465, a size N Fast Fourier Transform (FFT) block 470, a parallel-to-serial (P-to-S) block 475, and a channel decoding and demodulation block 480.

In the transmit path 400, the channel coding and modulation block 405 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to a RF frequency for transmission via a wireless channel. The signal may also be filtered at a baseband before conversion to the RF frequency.

As illustrated in FIG. 4B, the down-converter 455 down-converts the received signal to a baseband frequency, and the remove cyclic prefix block 460 removes the cyclic prefix to generate a serial time-domain baseband signal. The serial-to-parallel block 465 converts the time-domain baseband signal to parallel time-domain signals. The size N FFT block 470 performs an FFT algorithm to generate N parallel frequency-domain signals. The (P-to-S) block 475 converts the parallel frequency-domain signals to a sequence of modulated data symbols. The channel decoding and demodulation block 480 demodulates and decodes the modulated symbols to recover the original input data stream.

Each of the gNBs 101-103 may implement a transmit path 400 that is analogous to transmitting in the downlink to UEs 111-116 and may implement a receive path 450 that is analogous to receiving in the uplink from UEs 111-116. Similarly, each of UEs 111-116 may implement a transmit path 400 for transmitting in the uplink to gNBs 101-103 and may implement a receive path 450 for receiving in the downlink from gNBs 101-103.

Each of the components in FIGS. 4A and 4B can be implemented using only hardware or using a combination of hardware and software/firmware. As a particular example, at least some of the components in FIGS. 4A and 4B may be implemented in software, while other components may be implemented by configurable hardware or a mixture of software and configurable hardware. For instance, the FFT block 470 and the IFFT block 415 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, can be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 4A and 4B illustrate examples of wireless transmit and receive paths 400 and 450, respectively, various changes may be made to FIGS. 4A and 4B. For example, various components in FIGS. 4A and 4B can be combined, further subdivided, or omitted and additional components can be added according to particular needs. Also, FIGS. 4A and 4B are meant to illustrate examples of the types of transmit and receive paths that can be used in a wireless network. Any other suitable architectures can be used to support wireless communications in a wireless network.

In embodiments of the present disclosure, a beam is determined by either a transmission configuration indicator (TCI) state that establishes a quasi-colocation (QCL) relationship between a source reference signal (RS) (e.g., single sideband (SSB) and/or Channel State Information Reference Signal (CSI-RS)) and a target RS or a spatial relation information that establishes an association to a source RS, such as SSB or CSI-RS or SRS. In either case, the ID of the source reference signal identifies the beam. The TCI state and/or the spatial relation reference RS can determine a spatial RX filter for reception of downlink channels at the UE 116, or a spatial TX filter for transmission of uplink channels from the UE 116.

Figure 5A:
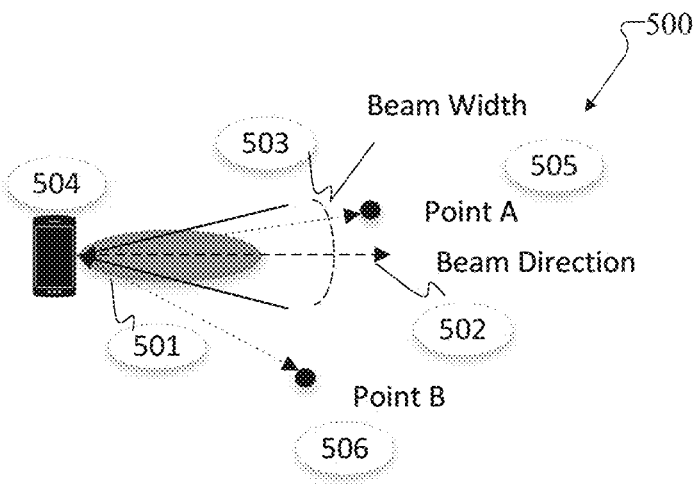
FIG. 5A illustrates an example of a wireless system according to embodiments of the present disclosure.

As illustrated in FIG. 5A, in a wireless system 500, a beam 501 for a device 504 can be characterized by abeam direction 502 and a beam width 503. For example, the device 504 (or UE 116) transmits RF energy in a beam direction and within a beam width. The device 504 receives RF energy in a beam direction and within a beam width. As illustrated in FIG. 5A, a device at point A 505 can receive from and transmit to device 504 as Point A is within a beam width and direction of a beam from device 504. As illustrated in FIG. 5A, a device at point B 506 cannot receive from and transmit to device 504 as Point B 506 is outside a beam width and direction of a beam from device 504. While FIG. 5A, for illustrative purposes, shows a beam in 2-dimensions (2D), it should be apparent to those skilled in the art, that a beam can be in 3-dimensions (3D), where the beam direction and beam width are defined in space.

Figure 5B:
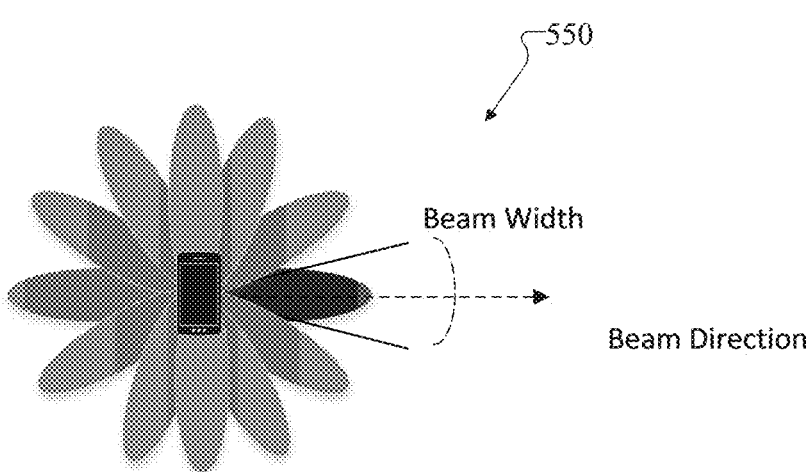
FIG. 5B illustrates an example of a multi-beam operation according to embodiments of the present disclosure.

FIG. 5B illustrates an example of a multi-beam operation 550 according to embodiments of the present disclosure. For example, the multi-beam operation 550 can be utilized by gNB 102 of FIG. 2. This example is for illustration only and other embodiments can be used without departing from the scope of the present disclosure.

In a wireless system, a device can transmit and/or receive on multiple beams. This is known as "multi-beam operation". While FIG. 5B, for illustrative purposes, a beam is in 2D, it should be apparent to those skilled in the art, that a beam can be 3D, where a beam can be transmitted to or received from any direction in space.

Figure 6:
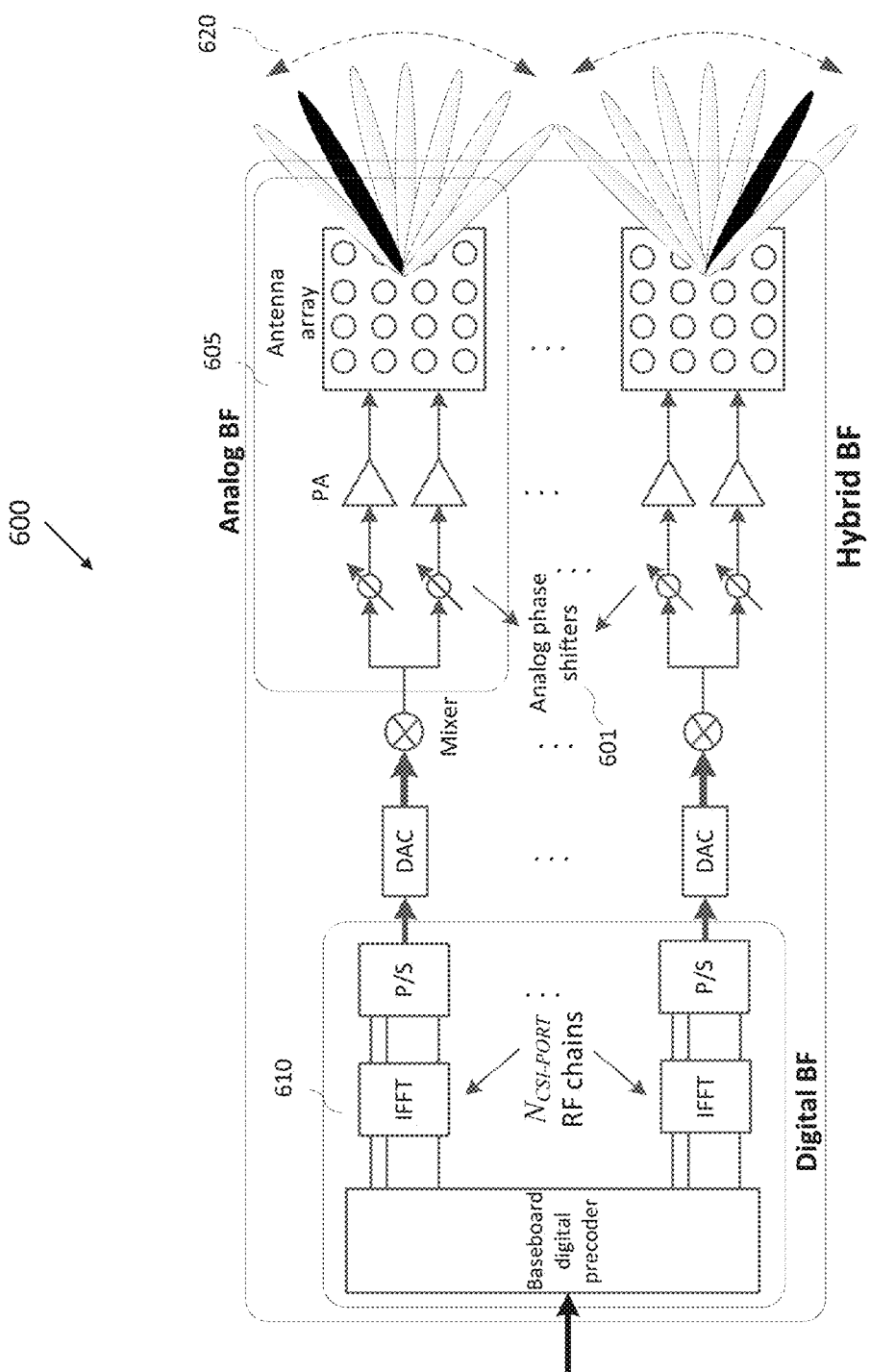
FIG. 6 illustrates an example of a transmitter structure for beamforming according to embodiments of the present disclosure.

FIG. 6 illustrates an example of a transmitter structure 600 for beamforming according to embodiments of the present disclosure. In certain embodiments, one or more of gNB 102 or UE 116 includes the transmitter structure 600. For example, one or more of antenna 205 and its associated systems or antenna 305 and its associated systems can be included in transmitter structure 600. This example is for illustration only and other embodiments can be used without departing from the scope of the present disclosure.

Accordingly, embodiments of the present disclosure recognize that Rel-14 LTE and Rel-15 NR support up to 32 CSI-RS antenna ports which enable an eNB or a gNB to be equipped with a large number of antenna elements (such as 64 or 128). A plurality of antenna elements can then be mapped onto one CSI-RS port. For mmWave bands, although a number of antenna elements can be larger for a given form factor, a number of CSI-RS ports, that can correspond to the number of digitally precoded ports, can be limited due to hardware constraints (such as the feasibility to install a large number of analog-to-digital converters (ADCs)/digital-to-analog converters (DACs) at mmWave frequencies) as illustrated in FIG. 6. Then, one CSI-RS port can be mapped onto a large number of antenna elements that can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or slots/subframes. The number of sub-arrays (equal to the number of RF chains) is the same as the number of CSI-RS ports $N_{CSI-PORT}$. A digital beamforming unit 610 performs a linear combination across $N_{CSI-PORT}$ analog beams to further increase a precoding gain. While analog beams are wideband (hence not frequency-selective), digital precoding can be varied across frequency subbands or resource blocks. Receiver operation can be conceived analogously.

Since the transmitter structure 600 of FIG. 6 utilizes multiple analog beams for transmission and reception (wherein one or a small number of analog beams are selected out of a large number, for instance, after a training duration that is occasionally or periodically performed), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting", respectively), and receiving a DL or UL transmission via a selection of a corresponding RX beam. The system of FIG. 6 is also applicable to higher frequency bands such as >52.6 GHz (also termed frequency range 4 or FR4). In this case, the system can employ only analog beams. Due to the O2 absorption loss around 60 GHz frequency (~10 dB additional loss per 100 m distance), a larger number and narrower analog beams (hence a larger number of radiators in the array) are needed to compensate for the additional path loss.

The text and figures are provided solely as examples to aid the reader in understanding the present disclosure. They are not intended and are not to be construed as limiting the scope of the present disclosure in any manner. Although certain embodiments and examples have been provided, it will be apparent to those skilled in the art based on the disclosures herein that changes in the embodiments and examples shown may be made without departing from the scope of the present disclosure. The transmitter structure 600 for beamforming is for illustration only and other embodiments can be used without departing from the scope of the present disclosure.

The flowcharts herein illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Embodiments of the resent disclosure provides various design aspects for frequency-selective beam management using a JPTA system as an example implementation, wherein one or more (analog) beams can be simultaneously transmitted/received over one or more frequency subbands. Specifically, various beam measurement and reporting configurations, beam indication mechanisms, and the corresponding signaling medium/procedures are specified/customized to enable frequency-selective beam management.

The present disclosure recognizes that due to the rising demand for traffic, wireless systems are moving towards higher frequencies of operation, such as millimeter-wave (mm-wave) and terahertz (THz) frequencies, where abundant spectrum is available; but, the higher frequencies also suffer from a high channel propagation loss and therefore require a large antenna array to create sufficient beamforming gain to ensure a sufficient link budget for operation. Thus, these high frequency systems are usually built with a large antenna array at the transmitter and/or the receiver containing many individual antenna elements. At the operating bandwidths of these mm-wave and THz systems, the cost and power consumption of mixed-signal components such as ADCs and/or DACs also grow tremendously. Thus, fully digital transceiver implementations, where each antenna element is fed by a dedicated RF chain, are impractical. To keep the hardware cost and power consumption of such large antenna arrays manageable, typically an analog beamforming or hybrid beamforming architecture is adopted where the large antenna array is fed with a much smaller number of RF chains via the use of analog hardware such as phase-shifters. This reduces the number of mixed-signal components which significantly reduces the cost, size, and power consumption of the transceivers.

FIG. 7 illustrates an example of an array architecture for hybrid beamforming 700. In certain embodiments, the gNB 102 includes the array architecture for hybrid beamforming. For example, one or more of antenna 205 and its associated systems can be included in the array architecture for hybrid beamforming. This example is for illustration only and other embodiments can be used without departing from the scope of the present disclosure.

With reference to FIG. 7, the case of hybrid beamforming at a BS with a single RF chain, i.e., R=1 is discussed. Note that with M antennas, the maximum possible beamforming gain in any direction is M. For the BS 102 to provide signal coverage to the UEs in the cell, the BS 102 would perform beam sweeping over time for its frequency-flat beams.

When transmitting a signal at the transmitter, a combination of digital beamforming before DAC and analog beamforming using the phase-shifters is used to create the overall beam shape in the desired direction. Similarly, when receiving a signal at the receiver, a combination of analog beamforming using phase-shifters and digital beamforming after ADC is used to create the overall beam shape in the desired direction. However conventional approaches usually use a phase-shifter array or a combination of phase-shifters and switches to connect the large antenna array to a few number of RF chains.

An alternative to frequency-flat hybrid beamforming is frequency-dependent hybrid beamforming, which we call JPTA beamforming. Note that, here, frequency-dependent beamforming refers to a technique where different components of the input signal may encounter a differently shaped analog beam based on their frequency.

Figure 8:
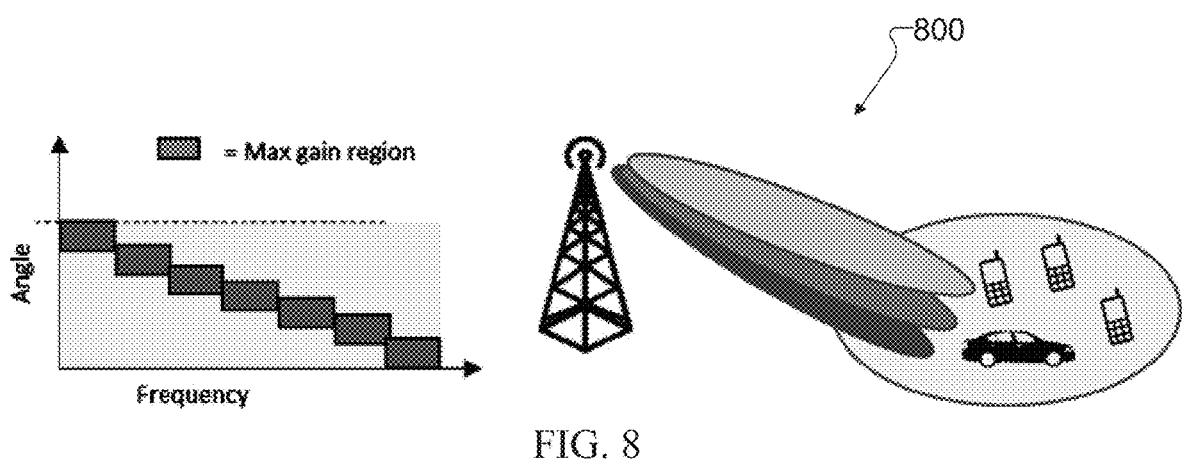
FIG. 8 illustrates an example of joint phase-time array (JPTA) based beamforming according to embodiments of the present disclosure.

FIG. 8 illustrates an example system 800 for JPTA based beamforming according to embodiments of the present disclosure. For example, the system 800 may be located in the wireless network 100 by gNB 102 in FIG. 1. This example is for illustration only and other embodiments can be used without departing from the scope of the present disclosure.

In one embodiment of JPTA beamforming, the maximum gain region of the beam sweeps over an angle range as the signal frequency varies. At any signal frequency f, the desired beam creates the maximum possible array-gain in one angular direction $\theta(f)$. As f varies linearly over the system bandwidth, the angular direction $\theta(f)$ also sweeps linearly over a certain angular region $[\theta_0 - \Delta\theta/2, \theta_0 + \Delta\theta/2]$ as shown in FIG. 8. Embodiments of this disclosure recognize such behavior of JPTA beamforming; however, it should be noted that the embodiments in the present disclosure can be applied to other behaviors of JPTA beamforming as well.

Figure 9:
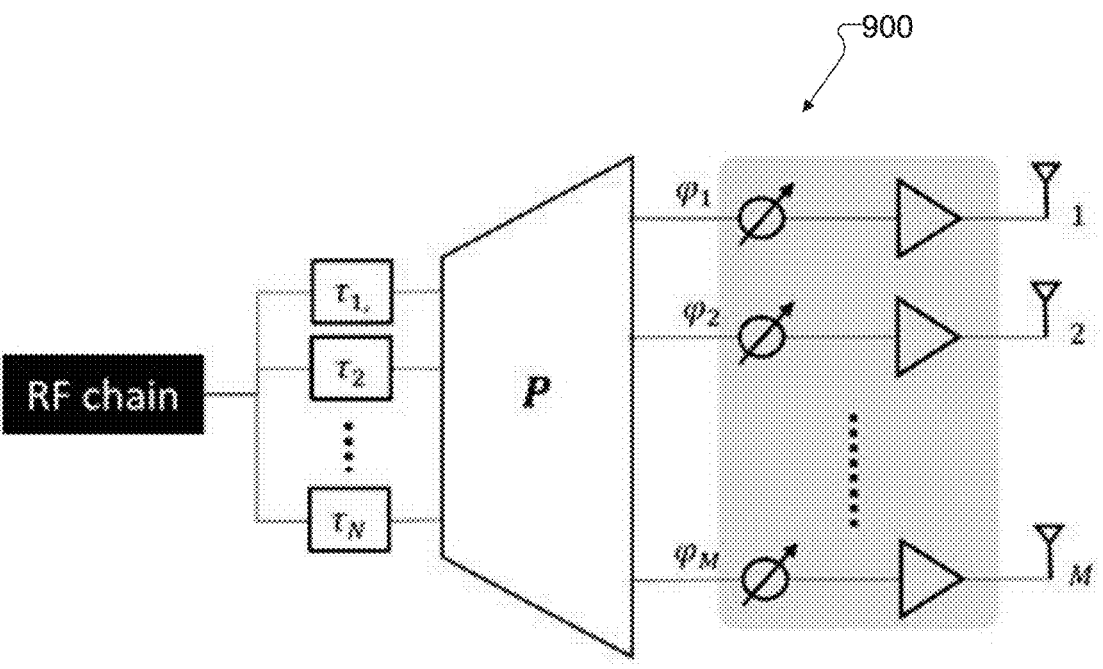
FIG. 9 illustrates an example of an array architecture for JPTA based beamforming according to embodiments of the present disclosure.

FIG. 9 illustrates an example of an array architecture for JPTA based beamforming 900 according to embodiments of the present disclosure. For example, the architecture 900 may be implemented by gNB 102 and, more particularly, in one or more of the transceivers 210 in FIG. 2. This example is for illustration only and other embodiments can be used without departing from the scope of the present disclosure.

In one embodiment, a layout with a single base-station (BS) serving many users in its coverage area and operating with a system bandwidth W around a center frequency $f_0$ is provided. The BS 102 is assumed to have a uniform linear antenna array having M elements, and $N_{RF}=1$ RF chain. Note that the disclosure can be directly extended to planar array configurations. The antenna spacing is half-wavelength at the center frequency $f_0$. Each of the M antennas has a dedicated phase-shifter, and they are connected to the single RF chain via a network of N≤M Time Division Duplexing (TTDs) as shown in FIG. 9. Here P is a fixed M×N mapping matrix, where each row m has one non-zero entry and determines which of the N TTDs antenna m is connected to. The TTDs are assumed to be configurable, with a delay variation range of 0≤τ≤κW, where κ is a design parameter to be selected. The phase-shifters are assumed to have unit magnitude and have arbitrarily reconfigurable phase $-\pi \leq \phi < \pi$. Transmission in both uplink and downlink directions is performed using OFDM with K subcarriers indexed as $$K = \left\{ \left\lfloor \frac{1-K}{2} \right\rfloor, \dots, \left\lfloor \frac{K-1}{2} \right\rfloor \right\}.$$

Then, the M×1 downlink TX signal on sub-carrier k∈ K for a representative OFDM symbol can be expressed as $$x_k = \frac{1}{\sqrt{M}} \begin{bmatrix} e^{j\varphi_1} & \cdots & 0 \\ \vdots & \ddots & \vdots \\ 0 & \cdots & e^{j\varphi_M} \end{bmatrix} P \begin{bmatrix} e^{j2\pi f_k \tau_1} \\ \vdots \\ e^{j2\pi f_k \tau_N} \end{bmatrix} \alpha_k s_k = TPd_k\alpha_k s_k$$

where $s_k$ and $\alpha_k$ are the scalar data and digital beamforming on the k-th subcarrier, $f_k$ is the frequency of the k-th sub-carrier (including the carrier frequency), $\tau_n$ is the delay of the n-th TTD and $\phi_n$ is the phase of the m phase-shifter connected to the m-th antenna. Note that from the equation herein the total transmit power of the BS 102 can be given by $P_{sum}=\Sigma_{k\in K}|\alpha_k|^2$. Note that for this JPTA architecture, the effective downlink unit-norm analog beamformer on sub-carrier k is $e_k=TPd_k$, where the M×M diagonal matrix T captures the effect of phase-shifters and the N×1 vector $d_k$ captures the effect of TTDs. It can be shown that the same beamformer is also applicable at the BS 102 for an uplink scenario.

Embodiments of the present disclosure recognize when JPTA beamforming 800 implementation is utilized, a significant departure from analog-based beam management occurs. That is, while analog beam management applies one analog beam for the entire system bandwidth or bandwidth part, JPTA beamforming 800 implementation allows the system to use different analog beams for different parts of the system bandwidth or bandwidth part which amounts to "frequency-selective" beam management (FSBM). Therefore, there is a need for enabling frequency-selective beam management operation wherein different analog beams (associated with TCI states, source RS resources, and/or measurement RS resources) can be utilized for different parts/portions of the system bandwidth or bandwidth parts.

A UE could be configured by the network 130 one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM; this indication could be via higher layer RRC signaling/parameter and/or medium access control (MAC) control element (CE) command and/or dynamic downlink control information (DCI) based signaling. For instance, a higher layer parameter, e.g., denoted by FreqSelectiveBeamMeasurement, could be indicated/provided in CSI-ResourceConfig to turn on/off the frequency-selective beam measurement for FSBM.

In one example, a UE could be configured by the network 130 one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM; this indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. The UE 116 could be configured by the network 130, e.g., in a CSI resource setting provided by CSI-ResourceConfig, a CSI resource set (e.g., provided by CSI-SSB-ResourceSet or NZP-CSI-RS-ResourceSet) comprising K≥1 CSI-RS resources (e.g., SSB resources or NZP CSI-RS resources) for FSBM. In particular, the k-th CSI-RS resource in the resource set could correspond to a set of $N_k \geq 1$ beams (and therefore, the corresponding set of $N_k \geq 1$ frequency subbands), where k=1, . . . , K. In the present disclosure, the set of $N_k \geq 1$ frequency-selective beams can also be referred to as a frequency-selective multi-beam. For a CSI-RS resource configured in the resource set for FSBM, the UE 116 could be indicated/configured by the network 130 with the corresponding/associated frequency subbands including their bandwidths/sizes, starting resource blocks (RBs), etc. This indication/configuration could be via higher layer RRC signaling (e.g., indicated/configured in the same CSI resource setting/set provided by CSI-ResourceConfig CSI-SSB-ResourceSet/NZP-CSI-RS-ResourceSet) and/or MAC CE command and/or dynamic DCI based signaling. There are various means to indicate/configure the frequency subbands corresponding/associated with the CSI-RS resource.

For example, the higher layer parameter that configures a CSI-RS resource (e.g., the k-th CSI-RS resource in the resource set), e.g., NZP-CSI-RS-Resource, could indicate/include $N_k$ CSI-RS resource mapping configurations each for a frequency subband. A CSI-RS resource mapping configuration (e.g., provided by CSI-RS-ResourceMapping) could comprise at least a frequency subband index, a frequency domain allocation of resource elements (REs) for a frequency subband (e.g., provided by frequencyDomainAllocation) and a frequency domain allocation of RBs for a frequency subband (e.g., provided by CSI-FrequencyOccupation). The frequency domain allocation of RBs for a frequency subband could comprise at least a starting RB (provided by startingRB) and a number of physical resource blocks (PRBs) (provided by nrofRBs) across which the corresponding frequency subband spans. For this case, the higher layer parameter NZP-CSI-RS-Resource that indicates/provides the $N_k$ CSI-RS resource mapping configurations could also include/provide/indicate the $N_k$ frequency subband indexes each associated/mapped to a CSI-RS resource mapping configuration indicated/configured therein. Alternatively, one or more of the described herein $N_k$ CSI-RS resource mapping configurations could be indicated in one or more DCIs, via one or more new DCI fields or by repurposing one or more bits/codepoints of one or more existing DCI fields in the DCI(s). Optionally, one or more of the described herein $N_k$ CSI-RS resource mapping configurations could be indicated/provided/included in one or more MAC CE commands; for this case, a MAC CE command could also include/indicate/provide the corresponding CSI-RS resource ID and/or frequency subband index(es). The $N_k$ CSI-RS resource mapping configurations discussed herein and the $N_k$ frequency subbands for the k-th CSI-RS resource in the resource set could be one-to-one mapped; for instance, the first CSI-RS resource mapping configuration could correspond to the first frequency subband, the second CSI-RS resource mapping configuration could correspond to the second frequency subband, and so on, and the $N_k$-th CSI-RS resource mapping configuration could correspond to the $N_k$-th frequency subband. Alternatively, the UE 116 could be indicated/provided by the network 130, e.g., via higher layer RRC signaling/parameter and/or MAC CE command and/or dynamic DCI based signaling, the mapping/association between the $N_k$ CSI-RS resource mapping configurations and the $N_k$ frequency subbands configured for the k-th CSI-RS resource in the CSI resource set for FSBM.

For another example, the higher layer parameter that provides a CSI-RS resource mapping configuration for a CSI-RS resource (e.g., the k-th CSI-RS resource in the resource set), e.g., CSI-RS-ResourceMapping, could indicate/include $N_k$ frequency domain allocations of REs each for a frequency subband and provided by frequencyDomainAllocation. Furthermore, the CSI-RS resource mapping configuration provided by CSI-RS-ResourceMapping could also indicate/include $N_k$ frequency domain allocations of RBs each for a frequency subband and provided by CSI-FrequencyOccupation. Each frequency domain allocation of RBs for a frequency subband, and therefore, the corresponding higher layer parameter CSI-FrequencyOccupation, could comprise at least a starting RB (provided by startingRB) and a number of PRBs (provided by nrofRBs) across which the corresponding frequency subband spans. For this case, the higher layer parameter CSI-RS-ResourceMapping could also include/provide/indicate $N_k$ frequency subband indexes each associated/mapped to a frequency domain allocation of REs and/or a frequency domain allocation of RBs indicated/configured therein. Alternatively, the higher layer parameter frequencyDomainAllocation or CSI-FrequencyOccupation could provide/indicate/include a frequency subband index. Alternatively, one or more of the described herein $N_k$ frequency domain allocations of REs and/or one or more of the described herein $N_k$ frequency domain allocations of RBs could be indicated in one or more DCIs, via one or more new DCI fields or by repurposing one or more bits/codepoints of one or more existing DCI fields in the DCI(s). Optionally, one or more of the described herein $N_k$ frequency domain allocations of REs and/or one or more of the described herein $N_k$ frequency domain allocations of RBs could be indicated/provided/included in one or more MAC CE commands; for this case, a MAC CE command could also include/indicate/provide the corresponding CSI-RS resource ID and frequency subband index(es). The $N_k$ frequency domain allocations of REs/RBs discussed herein and the $N_k$ frequency subbands for the k-th CSI-RS resource in the resource set could be one-to-one mapped; for instance, the first frequency domain allocations of REs/RBs could correspond to the first frequency subband, the second frequency domain allocations of REs/RBs could correspond to the second frequency subband, and so on, and the $N_k$-th frequency domain allocations of REs/RBs could correspond to the $N_k$-th frequency subband. Alternatively, the UE 116 could be indicated/provided by the network 130, e.g., via higher layer RRC signaling/parameter and/or MAC CE command and/or dynamic DCI based signaling, the mapping/association between the $N_k$ frequency domain allocations of REs/RBs and the $N_k$ frequency subbands configured for the k-th CSI-RS resource in the CSI resource set for FSBM.

Yet for another example, the higher layer parameter frequencyDomainAllocation could indicate/include $N_k$ frequency domain allocations of REs each for a frequency subband. In addition, the higher layer parameter CSI-FrequencyOccupation could indicate/include $N_k$ frequency domain allocations of RBs each for a frequency subband. For instance, the higher layer parameter CSI-FrequencyOccupation could provide $N_k$ starting RBs each for a frequency subband and provided by startingRB, and/or $N_k$ nrofRBs' each providing the number of PRBs across which the corresponding frequency subband spans. For this case, the higher layer parameter frequencyDomainAllocation or CSI-FrequencyOccupation could also include/provide/indicate $N_k$ frequency subband indexes each associated/mapped to a frequency domain allocation of REs and/or a frequency domain allocation of RBs indicated/configured therein. Alternatively, one or more of the described herein $N_k$ frequency domain allocations of REs and/or one or more of the described herein $N_k$ frequency domain allocations of RBs (including $N_k$ startingRB's and/or $N_k$ nrofRBs') could be indicated in one or more DCIs, via one or more new DCI fields or by repurposing one or more bits/codepoints of one or more existing DCI fields in the DCI(s). Optionally, one or more of the described herein $N_k$ frequency domain allocations of REs and/or one or more of the described herein $N_k$ frequency domain allocations of RBs (including $N_k$ startingRB's and/or $N_k$ nrofRBs') could be indicated/provided/included in one or more MAC CE commands; for this case, a MAC CE command could also include/indicate/provide the corresponding CSI-RS resource ID and/or frequency subband index(es). The $N_k$ frequency domain allocations of REs/RBs (e.g., $N_k$ startingRB's and/or $N_k$ nrofRBs') discussed herein and the $N_k$ frequency subbands for the k-th CSI-RS resource in the resource set could be one-to-one mapped; for instance, the first frequency domain allocations of REs/RBs (e.g., the first startingRB and/or the first nrofRBs) could correspond to the first frequency subband, the second frequency domain allocations of REs/RBs (e.g., the second startingRB and/or the second nrofRBs) could correspond to the second frequency subband, and so on, and the $N_k$-th frequency domain allocations of REs/RBs (e.g., the $N_k$-th startingRB and/or the $N_k$-th nrofRBs) could correspond to the $N_k$-th frequency subband. Alternatively, the UE 116 could be indicated/provided by the network 130, e.g., via higher layer RRC signaling/parameter and/or MAC CE command and/or dynamic DCI based signaling, the mapping/association between the $N_k$ frequency domain allocations of REs/RBs (e.g., $N_k$ startingRB's and/or $N_k$ nrofRBs') and the $N_k$ frequency subbands configured for the k-th CSI-RS resource in the CSI resource set for FSBM.

Yet for another example, the UE 116 could receive from the network 130, via higher layer RRC signaling (e.g., in NZP-CSI-RS-Resource, CSI-RS-ResourceMapping or CSI-FrequencyOccupation) and/or MAC CE command and/or dynamic DCI based signaling, one or more bitmaps (e.g., $N_k$ bitmaps) each for a frequency subband corresponding/associated to the CSI-RS resource (e.g., the k-th CSI-RS resource in the resource set). Each bit position/entry in a bitmap could correspond to a PRB or PRB index among all the PRBs across which the corresponding CSI-RS resource spans. If a bit position/entry of a bitmap is set to '1' (or '0'), the corresponding PRB or PRB index is allocated for the frequency subband corresponding/associated with the bitmap. A bitmap for a frequency subband could comprise more than one bit positions/entries set to '1' (or '0'). Different bitmaps for a CSI-RS resource could have the same bit position(s)/entry(s) set to '1' (or '0') meaning that different frequency subbands for a CSI-RS resource could be overlapped in frequency. The higher layer parameter(s), e.g., NZP-CSI-RS-Resource, CSI-RS-ResourceMapping, or CSI-FrequencyOccupation, that provides the one or more bitmaps could also include/provide/indicate $N_k$ frequency subband indexes each associated/mapped to a bitmap. If the frequency subband size/allocation for a CSI-RS resource (e.g., the one or more bitmaps discussed herein) is indicated via one or more DCIs, one or more new DCI fields can be introduced to indicate the one or more bitmaps; alternatively, one or more bits/codepoints of one or more existing DCI fields could be repurposed to indicate the one or more bitmaps. If the frequency subband size/allocation for a CSI-RS resource (e.g., the one or more bitmaps discussed herein) is indicated in one or more MAC CE commands, a MAC CE command could also indicate/provide/include the corresponding CSI-RS resource ID and/or frequency subband index(es). The $N_k$ bitmaps discussed herein and the $N_k$ frequency subbands for the k-th CSI-RS resource in the resource set could be one-to-one mapped; for instance, the first bitmap could correspond to the first frequency subband, the second bitmap could correspond to the second frequency subband, and so on, and the $N_k$-th bitmap could correspond to the $N_k$-th frequency subband. Alternatively, the UE 116 could be indicated/provided by the network 130, e.g., via higher layer RRC signaling/parameter and/or MAC CE command and/or dynamic DCI based signaling, the mapping/association between the $N_k$ bitmaps and the $N_k$ frequency subbands configured for the k-th CSI-RS resource in the CSI resource set for FSBM.

Yet for another example, the UE 116 could receive from the network 130, via higher layer RRC signaling (e.g., in NZP-CSI-RS-Resource, CSI-RS-ResourceMapping or CSI-FrequencyOccupation) and/or MAC CE command and/or dynamic DCI based signaling, a bitmap for one or more of the frequency subbands corresponding/associated to the CSI-RS resource (e.g., the k-th CSI-RS resource in the resource set). Each bit position/entry in the bitmap could correspond to a PRB or PRB index among all the PRBs across which the corresponding CSI-RS resource spans. Furthermore, each bit position/entry in the bitmap could be mapped/associated with a frequency subband for the CSI-RS resource. The mapping/association between the bit positions/entries in the bitmap and the frequency subbands for the CSI-RS resource could be fixed. For instance, the bitmap can be partitioned into $N_k$ parts each comprising one or more bit positions/entries; for this case, the first part of the bitmap could correspond to the first frequency subband for the CSI-RS resource, the second part of the bitmap could correspond to the second frequency subband for the CSI-RS resource, and so on, and the $N_k$-th part of the bitmap could correspond to the $N_k$-th frequency subband for the CSI-RS resource; the UE 116 could be provided/indicated/configured by the network 130, via higher layer RRC signaling and/or MAC CE command and/or dynamic DCI based signaling, how the bitmap is partitioned. Alternatively, the UE 116 could be provided/indicated/configured by the network 130, via higher layer RRC signaling and/or MAC CE command and/or dynamic DCI based signaling, the mapping/association between the bit positions/entries in the bitmap and the frequency subbands for the CSI-RS resource. If a bit position/entry of a bitmap is set to '1' (or '0'), the corresponding PRB or PRB index is allocated for the frequency subband corresponding/associated with the bit position/entry. A bitmap for a CSI-RS resource could contain/comprise more than one bit positions/entries set to '1' (or '0'). The higher layer parameter(s), e.g., NZP-CSI-RS-Resource, CSI-RS-ResourceMapping, or CSI-Frequency-Occupation, that provides the bitmap could also include/provide/indicate $N_k$ frequency subband indexes each associated/mapped to one or more bit positions/entries (e.g., a part discussed herein) in the bitmap. If the frequency subband size/allocation for a CSI-RS resource (e.g., the bitmap discussed herein) is indicated via one or more DCIs, one or more new DCI fields can be introduced to indicate the bitmap; alternatively, one or more bits/codepoints of one or more existing DCI fields could be repurposed to indicate the bitmap. If the frequency subband size/allocation for a CSI-RS resource (e.g., the bitmap discussed herein) is indicated in one or more MAC CE command(s), a MAC CE command could also indicate/provide/include the corresponding CSI-RS resource ID and/or frequency subband index(es).

Yet for another example, the UE 116 could receive from the network 130 one or more MAC CE activation commands (e.g., $N_k$ MAC CE activation commands) each for a frequency subband corresponding/associated to the CSI-RS resource (e.g., the k-th CSI-RS resource in the resource set). Each MAC CE activation command could activate one or more PRBs or PRB indexes—from all the PRBs across which the corresponding CSI-RS resource spans—for the corresponding/associated frequency subband. For this case, each MAC CE activation command could include/provide/indicate the corresponding CSI-RS resource ID and/or frequency subband index(es).

Yet for another example, the UE 116 could receive from the network 130 a MAC CE activation command activating one or more PRBs or PRB indexes—from all the PRBs across which the corresponding CSI-RS resource spans—for one or more of the frequency subbands corresponding/associated to a CSI-RS resource. For instance, for the k-th CSI-RS resource in the resource set, the MAC CE activation command could activate one or more PRBs or PRB indexes—from all the PRBs across which the corresponding CSI-RS resource spans—for the first frequency subband corresponding/associated to the CSI-RS resource, one or more PRBs or PRB indexes—from all the PRBs across which the corresponding CSI-RS resource spans—for the second frequency subband corresponding/associated to the CSI-RS resource, and so on, and one or more PRBs or PRB indexes—from all the PRBs across which the corresponding CSI-RS resource spans—for the $N_k$-th frequency subband corresponding/associated to the CSI-RS resource. For this case, the MAC CE activation command could include/provide/indicate the corresponding CSI-RS resource ID.

Yet for another example, the frequency subbands for the CSI-RS resource—e.g., the $N_k$ frequency subbands for the k-th CSI-RS resource in the resource set—could have the same bandwidth/size. For this case, the UE 116 could be provided by the network 130, via higher layer RRC signaling (e.g., in NZP-CSI-RS-Resource, CSI-RS-ResourceMapping or CSI-FrequencyOccupation) and/or MAC CE command and/or dynamic DCI based signaling, a common frequency subband bandwidth/size (e.g., in number of PRBs) and/or $N_k$ and/or one or more starting RBs of one or more frequency subbands. In addition, the frequency subbands for the CSI-RS resource—e.g., the $N_k$ frequency subbands for the k-th CSI-RS resource in the resource set—could equally divide the total PRBs across which the corresponding CSI-RS resource spans. For this case, the UE 116 could be provided by the network 130, via higher layer RRC signaling (e.g., in NZP-CSI-RS-Resource, CSI-RS-ResourceMapping or CSI-FrequencyOccupation) and/or MAC CE command and/or dynamic DCI based signaling, $N_k$ and/or one or more starting RBs of one or more frequency subbands.

Yet for another example, the higher layer parameter that configures a CSI resource set for FSBM, e.g., CSI-SSB-ResourceSet or NZP-CSI-RS-ResourceSet, could include/indicate K sets of frequency domain resource allocation parameters each corresponding/associated to a CSI-RS resource configured therein. A set of frequency domain resource allocation parameters could comprise at least one or more (e.g., $N_k$) frequency domain allocations of REs (e.g., each provided by frequencyDomainAllocation) for one or more frequency subbands corresponding/associated to a CSI-RS resource (e.g., the k-th CSI-RS resource in the resource set) and one or more (e.g., $N_k$) frequency domain allocations of RBs (e.g., each provided by CSI-FrequencyOccupation, which comprises at least a starting RB provided by startingRB and the number of PRBs provided by nrofRBs across which the corresponding frequency subband spans) for one or more frequency subbands corresponding/associated to a CSI-RS resource (e.g., the k-th CSI-RS resource in the resource set). In one example, the K sets of frequency domain resource allocation parameters and the K CSI-RS resources configured in the same CSI resource set are one-to-one mapped; for instance, the first set of frequency domain resource allocation parameters could correspond to the first CSI-RS resource in the CSI resource set, the second set of frequency domain resource allocation parameters could correspond to the second CSI-RS resource in the CSI resource set, and so on, and the K-th set of frequency domain resource allocation parameters could correspond to the K-th CSI-RS resource in the CSI resource set. In another example, the UE 116 could be indicated/provided by the network 130, e.g., via higher layer RRC signaling/parameter and/or MAC CE command and/or dynamic DCI based signaling, the mapping/association between the K sets of frequency domain resource allocation parameters and the K CSI-RS resources configured in the same CSI resource set. Optionally, the higher layer parameter(s), e.g., CSI-SSB-ResourceSet or NZP-CSI-RS-ResourceSet, that configures a CSI resource set and provides/indicates the K sets of frequency domain resource allocation parameters could also include/provide/indicate the K CSI-RS resource IDs/indexes each associated/mapped to a set of frequency domain resource allocation parameters discussed herein. Alternatively, one or more of the described herein K sets of frequency domain resource allocation parameters could be indicated in one or more DCIs, via one or more new DCI fields or by repurposing one or more bits/codepoints of one or more existing DCI fields in the DCI(s). One or more of the described herein K sets of frequency domain resource allocation parameters could also be indicated in one or more MAC CE commands; for this case, the MAC CE command(s) that provides/indicates the K sets of frequency domain resource allocation parameters could also include/provide/indicate the K CSI-RS resource IDs/indexes each associated/mapped to a set of frequency domain resource allocation parameters discussed herein. For both MAC CE and DCI based indication of the K sets of frequency domain resource allocation parameters, the association/mapping between the MAC CE/DCI indicated K sets of frequency domain resource allocation parameters and the K CSI-RS resources configured in the same CSI resource set could follow those discussed herein for the RRC based configuration/indication of the K sets of frequency domain resource allocation parameters.

Yet for another example, the higher layer parameter that configures a CSI resource setting comprising at least one CSI resource set for FSBM, e.g., CSI-ResourceConfig, could include/indicate K sets of frequency domain resource allocation parameters each corresponding/associated to a CSI-RS resource configured in the CSI resource set(s) for FSBM. A set of frequency domain resource allocation parameters could comprise at least one or more (e.g., $N_k$) frequency domain allocations of REs (e.g., each provided by frequencyDomainAllocation) for one or more frequency subbands corresponding/associated to a CSI-RS resource (e.g., the k-th CSI-RS resource in the resource set for FSBM) and one or more (e.g., $N_k$) frequency domain allocations of RBs (e.g., each provided by CSI-FrequencyOccupation, which comprises at least a starting RB provided by startingRB and the number of PRBs provided by nrofRBs across which the corresponding frequency subband spans) for one or more frequency subbands corresponding/associated to a CSI-RS resource (e.g., the k-th CSI-RS resource in the resource set for FSBM). In one example, the K sets of frequency domain resource allocation parameters configured in the CSI resource setting and the K CSI-RS resources configured in the CSI resource set(s) for FSBM are one-to-one mapped; for instance, the first set of frequency domain resource allocation parameters in the CSI resource setting could correspond to the first CSI-RS resource in the CSI resource set(s) for FSBM, the second set of frequency domain resource allocation parameters in the CSI resource setting could correspond to the second CSI-RS resource in the CSI resource set(s) for FSBM, and so on, and the K-th set of frequency domain resource allocation parameters in the CSI resource setting could correspond to the K-th CSI-RS resource in the CSI resource set(s) for FSBM. In another example, the UE 116 could be indicated/provided by the network 130, e.g., via higher layer RRC signaling/parameter and/or MAC CE command and/or dynamic DCI based signaling, the mapping/association between the K sets of frequency domain resource allocation parameters in the CSI resource setting and the K CSI-RS resources configured in the CSI resource set(s) for FSBM. Optionally, the higher layer parameter(s), e.g., CSI-ResourceConfig, that configures a CSI resource setting and provides/indicates the K sets of frequency domain resource allocation parameters could also include/provide/indicate the K CSI-RS resource IDs/indexes each associated/mapped to a set of frequency domain resource allocation parameters discussed herein. Alternatively, one or more of the described herein K sets of frequency domain resource allocation parameters could be indicated in one or more DCIs, via one or more new DCI fields or by repurposing one or more bits/codepoints of one or more existing DCI fields in the DCI(s). One or more of the described herein K sets of frequency domain resource allocation parameters could also be indicated in one or more MAC CE commands; for this case, the MAC CE command(s) that provides/indicates the K sets of frequency domain resource allocation parameters could also include/provide/indicate the K CSI-RS resource IDs/indexes each associated/mapped to a set of frequency domain resource allocation parameters discussed herein. For both MAC CE and DCI based indication of the K sets of frequency domain resource allocation parameters, the association/mapping between the MAC CE/DCI indicated K sets of frequency domain resource allocation parameters and the K CSI-RS resources configured in the CSI resource set(s) for FSBM could follow one or more examples discussed herein for the RRC based configuration/indication of the K sets of frequency domain resource allocation parameters.

Yet for another example, the higher layer parameter that configures a CSI resource set for FSBM, e.g., CSI-SSB-ResourceSet or NZP-CSI-RS-ResourceSet, could include/indicate K sets of bitmaps with each set comprising one or more bitmaps for a CSI-RS resource (e.g., a set of $N_k$ bitmaps for the k-th CSI-RS resource in the resource set). In this example, the configuration/indication of the one or more bitmaps in a set, and the association/mapping between the one or more bitmaps in a set and the frequency subband(s) for the corresponding CSI-RS resource could follow one or more examples described herein. In one example, the K sets of bitmaps and the K CSI-RS resources configured in the same CSI resource set are one-to-one mapped; for instance, the first set of bitmaps could correspond to the first CSI-RS resource in the CSI resource set, the second set of bitmaps could correspond to the second CSI-RS resource in the CSI resource set, and so on, and the K-th set of bitmaps could correspond to the K-th CSI-RS resource in the CSI resource set. In another example, the UE 116 could be indicated/provided by the network 130, e.g., via higher layer RRC signaling/parameter and/or MAC CE command and/or dynamic DCI based signaling, the mapping/association between the K sets of bitmaps and the K CSI-RS resources configured in the CSI resource set. Optionally, the higher layer parameter(s), e.g., CSI-SSB-ResourceSet or NZP-CSI-RS-ResourceSet, that configures a CSI resource set and provides/indicates the K sets of bitmaps could also include/provide/indicate the K CSI-RS resource IDs/indexes each associated/mapped to a set of bitmaps discussed herein. Alternatively, one or more of the described herein K sets of bitmaps could be indicated in one or more DCIs, via one or more new DCI fields or by repurposing one or more bits/codepoints of one or more existing DCI fields in the DCI(s). The association/mapping between the DCI indicated K sets of bitmaps and the K CSI-RS resources configured in the same CSI resource set could follow one or more examples discussed herein for the RRC based configuration/indication of the K sets of bitmaps.

Yet for another example, the higher layer parameter that configures a CSI resource setting comprising at least one CSI resource set for FSBM, e.g., CSI-ResourceConfig, could include/indicate K sets of bitmaps with each set comprising one or more bitmaps for a CSI-RS resource configured in the CSI resource set(s) for FSBM (e.g., a set of $N_k$ bitmaps for the k-th CSI-RS resource in the resource set). In this example, the configuration/indication of the one or more bitmaps in a set, and the association/mapping between the one or more bitmaps in a set and the frequency subband(s) for the corresponding CSI-RS resource could follow one or more examples described herein. In one example, the K sets of bitmaps in the CSI resource setting and the K CSI-RS resources configured in the CSI resource set(s) for FSBM are one-to-one mapped; for instance, the first set of bitmaps in the CSI resource setting could correspond to the first CSI-RS resource in the CSI resource set(s) for FSBM, the second set of bitmaps in the CSI resource setting could correspond to the second CSI-RS resource in the CSI resource set(s) for FSBM, and so on, and the K-th set of bitmaps in the CSI resource setting could correspond to the K-th CSI-RS resource in the CSI resource set(s) for FSBM. In another example, the UE 116 could be indicated/provided by the network 130, e.g., via higher layer RRC signaling/parameter and/or MAC CE command and/or dynamic DCI based signaling, the mapping/association between the K sets of bitmaps configured in the CSI resource setting and the K CSI-RS resources configured in the CSI resource set(s) for FSBM. Optionally, the higher layer parameter(s), e.g., CSI-ResourceConfig, that configures a CSI resource setting and provides/indicates the K sets of bitmaps could also include/provide/indicate the K CSI-RS resource IDs/indexes each associated/mapped to a set of bitmaps discussed herein. Alternatively, one or more of the described herein K sets of bitmaps could be indicated in one or more DCIs, via one or more new DCI fields or by repurposing one or more bits/codepoints of one or more existing DCI fields in the DCI(s). The association/mapping between the DCI indicated K sets of bitmaps and the K CSI-RS resources configured in the CSI resource set(s) for FSBM could follow one or more examples described herein for the RRC based configuration/indication of the K sets of bitmaps.

Yet for another example, the higher layer parameter that configures a CSI resource set for FSBM, e.g., CSI-SSB-ResourceSet or NZP-CSI-RS-ResourceSet, could include/indicate K bitmaps each corresponding/associated to a CSI-RS resource configured therein. In this example, the configuration/indication of a bitmap, and the association/mapping between each bit position/entry in a bitmap and the frequency subband(s) for the corresponding CSI-RS resource could follow one or more examples described herein. In one example, the K bitmaps and the K CSI-RS resources configured in the same CSI resource set are one-to-one mapped; for instance, the first bitmap could correspond to the first CSI-RS resource in the CSI resource set, the second bitmap could correspond to the second CSI-RS resource in the CSI resource set, and so on, and the K-th bitmap could correspond to the K-th CSI-RS resource in the CSI resource set. In another example, the UE 116 could be indicated/provided by the network 130, e.g., via higher layer RRC signaling/parameter and/or MAC CE command and/or dynamic DCI based signaling, the mapping/association between the K bitmaps and the K CSI-RS resources configured in the CSI resource set. Optionally, the higher layer parameter(s), e.g., CSI-SSB-ResourceSet or NZP-CSI-RS-ResourceSet, that configures a CSI resource set and provides/indicates the K bitmaps could also include/provide/indicate the K CSI-RS resource IDs/indexes each associated/mapped to a bitmap discussed herein. Alternatively, one or more of the described herein K bitmaps could be indicated in one or more DCIs, via one or more new DCI fields or by repurposing one or more bits/codepoints of one or more existing DCI fields in the DCI(s). The association/mapping between the DCI indicated K bitmaps and the K CSI-RS resources configured in the same CSI resource set could follow those discussed herein for the RRC based configuration/indication of the K bitmaps.

Yet for another example, the higher layer parameter that configures a CSI resource setting comprising at least one CSI resource set for FSBM, e.g., CSI-ResourceConfig, could include/indicate K bitmaps each corresponding/associated to a CSI-RS resource configured in the CSI resource set(s) for FSBM. In this example, the configuration/indication of a bitmap, and the association/mapping between each bit position/entry in a bitmap and the frequency subband(s) for the corresponding CSI-RS resource could follow one or more examples described herein. In one example, the K bitmaps in the CSI resource setting and the K CSI-RS resources configured in the CSI resource set(s) for FSBM are one-to-one mapped; for instance, the first bitmap in the CSI resource setting could correspond to the first CSI-RS resource in the CSI resource set(s) for FSBM, the second bitmap in the CSI resource setting could correspond to the second CSI-RS resource in the CSI resource set(s) for FSBM, and so on, and the K-th bitmap in the CSI resource setting could correspond to the K-th CSI-RS resource in the CSI resource set(s) for FSBM. In another example, the UE 116 could be indicated/provided by the network 130, e.g., via higher layer RRC signaling/parameter and/or MAC CE command and/or dynamic DCI based signaling, the mapping/association between the K bitmaps configured in the CSI resource setting and the K CSI-RS resources configured in the CSI resource set(s) for FSBM. Optionally, the higher layer parameter(s), e.g., CSI-ResourceConfig, that configures a CSI resource setting and provides/indicates the K bitmaps could also include/provide/indicate the K CSI-RS resource IDs/indexes each associated/mapped to a bitmap discussed herein. Alternatively, one or more of the described herein K bitmaps could be indicated in one or more DCIs, via one or more new DCI fields or by repurposing one or more bits/codepoints of one or more existing DCI fields in the DCI(s). The association/mapping between the DCI indicated K bitmaps and the K CSI-RS resources configured in the CSI resource set(s) for FSBM could follow those discussed herein for the RRC based configuration/indication of the K bitmaps.

Yet for another example, the UE 116 could receive from the network 130 a MAC CE command indicating/providing/including K sets of bitmaps with each set comprising one or more bitmaps for a CSI-RS resource configured in the CSI resource set(s) for FSBM (e.g., a set of $N_k$ bitmaps for the k-th CSI-RS resource in the resource set). In this example, the configuration/indication of the one or more bitmaps in a set, and the association/mapping between the one or more bitmaps in a set and the frequency subband(s) for the corresponding CSI-RS resource could follow one or more examples described herein. In one example, the K sets of bitmaps in the MAC CE command and the K CSI-RS resources configured in the CSI resource set(s) for FSBM are one-to-one mapped; for instance, the first set of bitmaps in the MAC CE command could correspond to the first CSI-RS resource in the CSI resource set(s) for FSBM, the second set of bitmaps in the MAC CE command could correspond to the second CSI-RS resource in the CSI resource set(s) for FSBM, and so on, and the K-th set of bitmaps in the MAC CE command could correspond to the K-th CSI-RS resource in the CSI resource set(s) for FSBM. In another example, the UE 116 could be indicated/provided by the network 130, e.g., via higher layer RRC signaling/parameter and/or MAC CE command and/or dynamic DCI based signaling, the mapping/association between the K sets of bitmaps configured in the MAC CE command and the K CSI-RS resources configured in the CSI resource set(s) for FSBM. Optionally, the MAC CE command that provides/indicates the K sets of bitmaps could also include/provide/indicate the K CSI-RS resource IDs/indexes each associated/mapped to a set of bitmaps discussed herein.

Yet for another example, a UE could receive from the network 130 a MAC CE command indicating/providing/including K bitmaps each corresponding/associated to a CSI-RS resource configured in a CSI-RS resource set for FSBM. In this example, the configuration/indication of a bitmap, and the association/mapping between each bit position/entry in a bitmap and the frequency subband(s) for the corresponding CSI-RS resource could follow one or more examples described herein. In one example, the K bitmaps indicated in the MAC CE activation command and the K CSI-RS resources configured in the CSI resource set(s) for FSBM are one-to-one mapped; for instance, the first bitmap in the MAC CE command could correspond to the first CSI-RS resource in the CSI resource set(s) for FSBM, the second bitmap in the MAC CE command could correspond to the second CSI-RS resource in the CSI resource set(s) for FSBM, and so on, and the K-th bitmap in the MAC CE command could correspond to the K-th CSI-RS resource in the CSI resource set(s) for FSBM. In another example, the UE 116 could be indicated/provided by the network 130, e.g., via higher layer RRC signaling/parameter and/or MAC CE command and/or dynamic DCI based signaling, the mapping/association between the K bitmaps in the MAC CE command and the K CSI-RS resources configured in the CSI resource set(s) for FSBM. Optionally, the MAC CE command that provides/indicates the K bitmaps could also include/provide/indicate the K CSI-RS resource IDs/indexes each associated/mapped to a bitmap discussed herein.

Yet for another example, one or more of the design examples described herein can be combined to indicate/configure one or more frequency subbands for each of the K CSI-RS resources configured in the CSI RS resource set(s) for FSBM.

A UE could be configured by the network 130 one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM; this indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. For a CSI-RS resource configured in the CSI resource set for FSBM, and therefore, the corresponding/associated frequency subbands (e.g., the $N_k$ frequency subbands for the k-th CSI-RS resource in the resource set) configured/indicated according to one or more of the described herein design examples, the UE 116 could be further indicated/configured/provided by the network 130, via higher layer RRC signaling/parameter and/or MAC CE command and/or dynamic DCI based signaling, one or more of the total configured/indicated frequency subbands (e.g., one or more of the $N_k$ frequency subbands for the k-th CSI-RS resource in the resource set) for FSBM on the corresponding CSI-RS resource.

For example, the UE 116 could receive from the network 130, via higher layer RRC signaling/parameter and/or MAC CE command and/or dynamic DCI based signaling, a bitmap of length $N_k$ for the k-th CSI-RS resource in the resource set, where $k \in \{1, \ldots, K\}$. Each bit position/entry in the bitmap could correspond to a frequency subband corresponding/associated with the k-th CSI-RS resource in the resource set. If a bit position/entry in the bitmap is set to '1' (or '0'), the corresponding frequency subband is used/active for FSBM on the corresponding/associated CSI-RS resource (the k-th CSI-RS resource in the resource set in this example). The bitmap could comprise more than one bit positions/entries set to '1' (or '0') indicating that more than one frequency subbands can be used/active for FSBM on the corresponding/associated CSI-RS resource. The UE 116 could receive at least one bitmap for each CSI-RS resource configured in the resource set for FSBM.

For another example, the UE 116 could receive from the network 130, via higher layer RRC signaling/parameter and/or MAC CE command and/or dynamic DCI based signaling, a set of one or more frequency subband indexes each determined from $\{1, \ldots, N_k\}$ for the k-th CSI-RS resource in the resource set, where $k \in \{1, \ldots, K\}$. For this case, the frequency subband(s) corresponding to the indicated/configured/provided frequency subband index(es) is used/active for FSBM on the corresponding/associated CSI-RS resource (the k-th CSI-RS resource in the resource set in this example). The UE 116 could receive at least one set of one or more frequency subband indexes for each CSI-RS resource configured in the resource set for FSBM.

Yet for another example, the UE 116 could receive from the network 130 one or more MAC CE activation commands each activating one or more of the frequency subbands configured/indicated for one or more CSI-RS resources, where the activated one or more frequency subbands are used/active for FSBM on the corresponding CSI-RS resource(s).

Yet for another example, the higher layer parameter that configures a frequency subband for a CSI-RS resource (e.g., the k-th CSI-RS resource configured in the resource set) could include/indicate/comprise an indicator. If the indicator is set to 'enabled'/'on' or the like, the corresponding frequency subband is used/active for FSBM on the corresponding CSI-RS resource. Alternatively, the indicator could correspond to a one-big flag indicator. That is, if the one-bit flag indicator is set to '1' (or '0') or the like, the corresponding frequency subband is used/active for FSBM on the corresponding CSI-RS resource.

In yet another example, a UE could be configured by the network 130 with one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM; this indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. The UE 116 could be configured by the network 130, e.g., in a CSI resource setting provided by CSI-ResourceConfig, a CSI resource set (e.g., provided by CSI-SSB-ResourceSet or NZP-CSI-RS-ResourceSet) comprising one or more (e.g., $K \geq 1$) groups of CSI-RS resources (e.g., SSB resources or NZP CSI-RS resources) with each group comprising one or more (e.g., $N_k$) CSI-RS resources for FSBM, where $k = 1, \ldots, K$. Here, a group of CSI-RS resources can be referred to as a CSI resource subset or a CSI resource group for FSBM. In particular, the k-th CSI resource subset/group, and therefore, the $N_k$ CSI-RS resources configured therein, in the resource set could correspond to a set of $N_k \geq 1$ frequency-selective beams (and therefore, the corresponding set of $N_k \geq 1$ frequency subbands), where each CSI-RS resource configured in the k-th CSI resource subset/group could correspond to a frequency-selective beam (and therefore, the corresponding frequency subband). In the present disclosure, the set of $N_k \geq 1$ frequency-selective beams can also be referred to as a frequency-selective multi-beam. There are various means to indicate/configure/provide one or more CSI resource subsets/groups in a CSI resource set.

A UE could be configured by the network 130 one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM; this indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. For a CSI resource subset/group (and therefore, the corresponding CSI-RS resources configured therein for FSBM) configured in the resource set, the UE 116 could be indicated/configured by the network 130 with the corresponding/associated frequency subbands including their bandwidths/sizes, starting RBs and etc.; this indication/configuration could be via higher layer RRC signaling and/or MAC CE command and/or dynamic DCI based signaling. There are various means to indicate/configure the frequency subbands corresponding/associated with the CSI resource subset/group (and therefore, the corresponding CSI-RS resources configured therein for FSBM).

For example, the frequency subband for FSBM, across which the $n_k$-th CSI-RS resource in the k-th CSI resource subset/group spans, could be determined according to the (existing) frequency domain resource allocation for the CSI-RS resource, where $n_k = 1, \ldots, N_k$. Here, the (existing) frequency domain resource allocation for a CSI-RS resource could comprise/include/contain at least the frequency domain allocation of REs provided by frequencyDomainAllocation in CSI-RS-ResourceMapping for the CSI-RS resource and/or the frequency domain allocation of RBs provided by CSI-FrequencyOccupation (including the starting RB provided by startingRB and the number of PRBs provided by nrofRBs) in CSI-RS-ResourceMapping for the CSI-RS resource.

For another example, the UE 116 could be provided/indicated/configured by the network 130, e.g., via higher layer RRC signaling/parameter and/or MAC CE command and/or dynamic DCI based signaling, a set of frequency domain resource allocation parameters for the frequency subband for FSBM, across which the $n_k$-th CSI-RS resource in the k-th CSI resource subset/group spans, where $n_k = 1, \ldots, N_k$. The set of frequency domain resource allocation parameters could comprise/include/contain at least a frequency domain allocation of REs and a frequency domain allocation of RBs (comprising at least a starting RB and the number of PRBs across which the corresponding frequency subband spans). The set of frequency domain resource allocation parameters for the frequency subband could be provided in the higher layer parameter, e.g., NZP-CSI-RS-Resource, that configures the corresponding CSI-RS resource (i.e., the $n_k$-th CSI-RS resource in the k-th CSI resource subset/group in this example), and/or the higher layer parameter, e.g., CSI-RS-ResourceMapping/CSI-FrequencyOccupation, that provides resource allocation for the corresponding CSI-RS resource (i.e., the $n_k$-th CSI-RS resource in the k-th CSI resource subset/group in this example). Alternatively, the set of frequency domain resource allocation parameters discussed herein could be indicated in one or more DCIs, via one or more new DCI fields or by repurposing one or more bits/codepoints of one or more existing DCI fields in the DCI(s). Optionally, the set of frequency domain resource allocation parameters discussed herein could be indicated/provided/included in one or more MAC CE commands; for this case, a MAC CE command could also include/indicate/provide the corresponding CSI-RS resource ID/index and or frequency subband index.

Yet for another example, the UE 116 could receive from the network 130, via higher layer RRC signaling (e.g., in NZP-CSI-RS-Resource, CSI-RS-ResourceMapping or CSI-FrequencyOccupation) and/or MAC CE command and/or dynamic DCI based signaling, a bitmap to indicate/provide the frequency domain resource allocation (e.g., configuration of a frequency subband) for the $n_k$-th CSI-RS resource in the k-th CSI resource subset/group, where $n_k=1, \ldots, N_k$. Each bit position/entry in a bitmap could correspond to a PRB or PRB index among all the PRBs across which all the $N_k$ CSI-RS resources in the k-th CSI resource subset/group spans. If a bit position/entry of a bitmap is set to '1' (or '0'), the corresponding PRB or PRB index is allocated for the frequency subband for the CSI-RS resource corresponding/associated with the bitmap. A bitmap for a CSI-RS resource (and therefore, the corresponding frequency subband) could contain/comprise more than one bit positions/entries set to '1' (or '0'). Different bitmaps for different CSI-RS resources could have the same bit position(s)/entry(s) set to '1' (or '0') meaning that different frequency subbands for different CSI-RS resources in a CSI resource subset/group for FSBM could be overlapped in frequency. If the frequency subband size/allocation for a CSI-RS resource (e.g., the bitmap discussed herein) is indicated via one or more DCIs, one or more new DCI fields can be introduced to indicate the bitmap; alternatively, one or more bits/codepoints of one or more existing DCI fields could be repurposed to indicate the bitmap. If the frequency subband size/allocation for a CSI-RS resource (e.g., the bitmap discussed herein) is indicated in one or more MAC CE commands, a MAC CE command could also indicate/provide/include the corresponding CSI-RS resource ID/index and/or frequency subband index(es).

Yet for another example, the higher layer parameter that configures a CSI resource subset/group (e.g., the k-th CSI resource subset/group in the resource set), e.g., NZP-CSI-RS-ResourceSubSet, could indicate/include $N_k$ CSI-RS resource mapping configurations each for a frequency subband. A CSI-RS resource mapping configuration could contain/comprise at least a CSI-RS resource ID/index or a frequency subband index, a frequency domain allocation of REs for a CSI-RS resource/frequency subband, and a frequency domain allocation of RBs for a CSI-RS resource/ frequency subband. The frequency domain allocation of RBs for a CSI-RS resource/frequency subband could contain/comprise at least a starting RB and a number of PRBs across which the corresponding CSI-RS resource/frequency subband spans. For this case, the higher layer parameter NZP-CSI-RS-ResourceSubSet that indicates/provides the $N_k$ CSI-RS resource mapping configurations could also include/provide/indicate the $N_k$ CSI-RS resource IDs/indexes and/or the $N_k$ frequency subband indexes each associated/mapped to a CSI-RS resource mapping configuration indicated/configured therein. Alternatively, one or more of the described herein $N_k$ CSI-RS resource mapping configurations could be indicated in one or more DCIs, via one or more new DCI fields or by repurposing one or more bits/codepoints of one or more existing DCI fields in the DCI(s). Optionally, one or more of the described herein $N_k$ CSI-RS resource mapping configurations could be indicated/provided/included in one or more MAC CE commands; for this case, a MAC CE command could also include/indicate/provide the corresponding CSI resource subset/group ID and/or CSI-RS resource ID(s)/index(es) and/or frequency subband index(es). The $N_k$ CSI-RS resource mapping configurations discussed herein and the $N_k$ CSI-RS resources configured in the k-th CSI resource subset/group for JTPA measurement could be one-to-one mapped; for instance, the first CSI-RS resource mapping configuration could correspond to the first CSI-RS resource in the CSI resource subset/group, the second CSI-RS resource mapping configuration could correspond to the second CSI-RS resource in the CSI resource subset/group, and so on, and the $N_k$-th CSI-RS resource mapping configuration could correspond to the $N_k$-th CSI-RS resource in the CSI resource subset/group. Alternatively, the UE 116 could be indicated/provided by the network 130, e.g., via higher layer RRC signaling/parameter and/or MAC CE command and/or dynamic DCI based signaling, the mapping/association between the $N_k$ CSI-RS resource mapping configurations and the $N_k$ CSI-RS resources configured in the k-th CSI resource subset/group.

Yet for another example, the UE 116 could receive from the network 130, via higher layer RRC signaling (e.g., in a CSI resource subset/group provided by NZP-CSI-RS-ResourceSubSet) and/or MAC CE command and/or dynamic DCI based signaling, one or more bitmaps (e.g., $N_k$ bitmaps) each for a frequency subband corresponding/associated to a CSI-RS resource (e.g., the $n_k$-th CSI-RS resource in the k-th CSI resource subset/group for FSBM). Each bit position/entry in a bitmap could correspond to a PRB or PRB index among all the PRBs across which all the $N_k$ CSI-RS resources in the k-th CSI resource subset/group spans. If a bit position/entry of a bitmap is set to '1' (or '0'), the corresponding PRB or PRB index is allocated for the frequency subband for the CSI-RS resource corresponding/associated with the bitmap. A bitmap for a CSI-RS resource/frequency subband could contain/comprise more than one bit positions/entries set to '1' (or '0'). Different bitmaps for different CSI-RS resources could have the same bit position(s)/entry(s) set to '1' (or '0') meaning that different frequency subbands for different CSI-RS resources configured in a CSI resource subset/group for FSBM could be overlapped in frequency. For this case, the higher layer parameter NZP-CSI-RS-ResourceSubSet that indicates/provides the $N_k$ bitmaps could also include/provide/indicate $N_k$ CSI-RS resource IDs/indexes and/or $N_k$ frequency subband indexes each associated/mapped to a bitmap indicated/configured therein. If the frequency subband size/allocation for one or more CSI-RS resources in the CSI resource subset/group (e.g., the one or more bitmaps discussed herein) is indicated via one or more DCIs, one or more new DCI fields can be introduced to indicate the one or more bitmaps; alternatively, one or more bits/codepoints of one or more existing DCI fields could be repurposed to indicate the one or more bitmaps. If the frequency subband size/allocation for one or more CSI-RS resources in the CSI resource subset/group (e.g., the one or more bitmaps discussed herein) is indicated in one or more MAC CE commands, a MAC CE command could also indicate/provide/include the corresponding CSI resource subset/group ID and/or CSI-RS resource ID(s)/index(es) and/or frequency subband index(es). The $N_k$ bitmaps discussed herein and the $N_k$ CSI-RS resources configured in the k-th CSI resource subset/group for FSBM could be one-to-one mapped; for instance, the first bitmap could correspond to the first CSI-RS resource in the CSI resource subset/group, the second bitmap could correspond to the second CSI-RS resource in the CSI resource subset/group, and so on, and the $N_k$-th bitmap could correspond to the $N_k$-th CSI-RS resource in the CSI resource subset/group. Alternatively, the UE 116 could be indicated/provided by the network 130, e.g., via higher layer RRC signaling/parameter and/or MAC CE command and/or dynamic DCI based signaling, the mapping/association between the $N_k$ bitmaps and the $N_k$ CSI-RS resources configured in the k-th CSI resource subset/group.

Yet for another example, the UE 116 could receive from the network 130, via higher layer RRC signaling (e.g., in a CSI resource subset/group provided by NZP-CSI-RS-ResourceSubSet) and/or MAC CE command and/or dynamic DCI based signaling, a bitmap for one or more of the frequency subbands corresponding/associated to one or more of the $N_k$ CSI-RS resources configured in the k-th CSI resource subset/group for FSBM. Each bit position/entry in the bitmap could correspond to a PRB or PRB index among all the PRBs across which all the $N_k$ CSI-RS resources in the k-th CSI resource subset/group spans. Furthermore, each bit position/entry in the bitmap could be mapped/associated with a frequency subband for a CSI-RS resource. The mapping/association between the bit positions/entries in the bitmap and the frequency subbands for the CSI-RS resources in a CSI resource subset/group could be fixed. For instance, the bitmap can be partitioned into $N_k$ parts each comprising one or more bit positions/entries; for this case, the first part of the bitmap could correspond to the first frequency subband for the first CSI-RS resource in the CSI resource subset/group, the second part of the bitmap could correspond to the second frequency subband for the second CSI-RS resource in the CSI resource subset/group, and so on, and the $N_k$-th part of the bitmap could correspond to the $N_k$-th frequency subband for the $N_k$-th CSI-RS resource in the CSI resource subset/group; the UE 116 could be provided/indicated/configured by the network 130, via higher layer RRC signaling and/or MAC CE command and/or dynamic DCI based signaling, how the bitmap is partitioned. Alternatively, the UE 116 could be provided/indicated/configured by the network 130, via higher layer RRC signaling and/or MAC CE command and/or dynamic DCI based signaling, the mapping/association between the bit positions/entries in the bitmap and the frequency subbands for the corresponding CSI-RS resources in the CSI resource subset/group for FSBM. If a bit position/entry of a bitmap is set to '1' (or '0'), the corresponding PRB or PRB index is allocated for the frequency subband (and therefore, the corresponding CSI-RS resource) corresponding/associated to the bit position/entry. The bitmap could contain/comprise more than one bit positions/entries set to '1' (or '0'). The higher layer parameter(s), e.g., NZP-CSI-RS-ResourceSub- Set, that provides the bitmap could also include/provide/indicate the $N_k$ CSI-RS resource IDs/indexes and/or the $N_k$ frequency subband indexes each associated/mapped to one or more bit positions/entries (e.g., a part discussed herein) in the bitmap. If the frequency subband size/allocation for one or more CSI-RS resources in the CSI resource subset/group (e.g., the bitmap discussed herein) is indicated via one or more DCIs, one or more new DCI fields can be introduced to indicate the bitmap; alternatively, one or more bits/codepoints of one or more existing DCI fields could be repurposed to indicate the bitmap. If the frequency subband size/allocation for one or more CSI-RS resources in the CSI resource subset/group (e.g., the bitmap discussed herein) is indicated in one or more MAC CE commands, a MAC CE command could also indicate/provide/include the corresponding CSI resource subset/group ID and/or CSI-RS resource ID(s)/index(es) and/or frequency subband index(es).

Yet for another example, the UE 116 could receive from the network 130 one or more MAC CE activation commands (e.g., $N_k$ MAC CE activation commands) each for a frequency subband corresponding/associated to a CSI-RS resource configured in a CSI resource subset/group for FSBM (e.g., the $n_k$-th CSI-RS resource in the k-th CSI resource subset/group in the resource set). Each MAC CE activation command could activate one or more PRBs or PRB indexes—from all the PRBs across which all the $N_k$ CSI-RS resources in the k-th CSI resource subset/group spans—for the corresponding/associated frequency subband (and therefore, the corresponding CSI-RS resource). For this case, each MAC CE activation command could include/provide/indicate the corresponding CSI resource subset/group ID/index and/or CSI-RS resource ID/index and frequency subband index.

Yet for another example, the UE 116 could receive from the network 130 a MAC CE activation command activating one or more PRBs or PRB indexes—from all the PRBs across which all the $N_k$ CSI-RS resources in the k-th CSI resource subset/group spans—for one or more of the frequency subbands corresponding/associated to the one or more of the $N_k$ CSI-RS resources in the k-th CSI resource subset/group for FSBM. For instance, for the k-th CSI resource subset/group in the resource set, the MAC CE activation command could activate one or more PRBs or PRB indexes—from all the PRBs across which all the $N_k$ CSI-RS resources in the k-th CSI resource subset/group spans—for the first frequency subband corresponding/associated to the first CSI-RS resource in the CSI resource subset/group, one or more PRBs or PRB indexes—from all the PRBs across which all the $N_k$ CSI-RS resources in the k-th CSI resource subset/group spans—for the second frequency subband corresponding/associated to the second CSI-RS resource in the CSI resource subset/group, and so on, and one or more PRBs or PRB indexes—from all the PRBs across which all the $N_k$ CSI-RS resources in the k-th CSI resource subset/group spans—for the $N_k$-th frequency subband corresponding/associated to the $N_k$-th CSI-RS resource in the CSI resource subset/group. For this case, the MAC CE activation command could include/provide/indicate the corresponding CSI resource subset/group ID and/or CSI-RS resource ID(s)/index(es) and/or frequency subband index(es).

Yet for another example, the frequency subbands for different CSI-RS resources configured in the same CSI resource subset/group—e.g., the $N_k$ frequency subbands for the $N_k$ CSI-RS resources configured in the k-th CSI resource subset/group in the CSI resource set—could have the same bandwidth/size. For this case, the UE 116 could be provided by the network 130, via higher layer RRC signaling (e.g., in a CSI resource subset/group provided by NZP-CSI-RS-ResourceSubSet, or in a CSI-RS resource provided by NZP-CSI-RS-Resource, CSI-RS-ResourceMapping or CSI-FrequencyOccupation) and/or MAC CE command and/or dynamic DCI based signaling, a common frequency sub-band bandwidth/size (e.g., in number of PRBs) and/or one or more starting RBs of one or more frequency subbands. In addition, the frequency subbands for different CSI-RS resources configured in the same CSI resource subset/group—e.g., the $N_k$ frequency subbands for the $N_k$ CSI-RS resources configured in the k-th CSI resource subset/group in the CSI resource set—could equally divide the total PRBs across which all the $N_k$ CSI-RS resources in the k-th CSI resource subset/group spans. For this case, the UE 116 could be provided by the network 130, via higher layer RRC signaling (e.g., in a CSI resource subset/group provided by NZP-CSI-RS-ResourceSubSet, or in a CSI-RS resource provided by NZP-CSI-RS-Resource, CSI-RS-ResourceMapping or CSI-FrequencyOccupation) and/or MAC CE command and/or dynamic DCI based signaling, one or more starting RBs of one or more frequency subbands for one or more CSI-RS resources configured in the CSI resource subset/group.

Yet for another example, the higher layer parameter that configures a CSI resource set for FSBM, e.g., CSI-SSB-ResourceSet or NZP-CSI-RS-ResourceSet, could include/indicate K sets of frequency domain resource allocation parameters each corresponding/associated to a CSI resource subset/group configured therein. A set of frequency domain resource allocation parameters could comprise at least one or more (e.g., $N_k$) frequency domain allocations of REs for one or more frequency subbands corresponding/associated with one or more CSI-RS resources configured in a CSI resource subset/group (e.g., the $N_k$ CSI-RS resources in the k-th CSI resource subset/group in the resource set) and one or more (e.g., $N_k$) frequency domain allocations of RBs (comprising at least a starting RB and the number of PRBs across which the corresponding CSI-RS resource/frequency subband spans) for one or more frequency subbands corresponding/associated to one or more CSI-RS resources configured in a CSI resource subset/group (e.g., the $N_k$ CSI-RS resources in the k-th CSI resource subset/group in the resource set). In one example, the K sets of frequency domain resource allocation parameters and the K CSI resource subsets/groups configured in the same CSI resource set are one-to-one mapped; for instance, the first set of frequency domain resource allocation parameters could correspond to the first CSI resource subset/group (and therefore, the $N_1$ CSI-RS resources for FSBM configured therein) in the CSI resource set, the second set of frequency domain resource allocation parameters could correspond to the second CSI resource subset/group (and therefore, the $N_2$ CSI-RS resources for FSBM configured therein) in the CSI resource set, and so on, and the K-th set of frequency domain resource allocation parameters could correspond to the K-th CSI resource subset/group (and therefore, the $N_K$ CSI-RS resources for FSBM configured therein) in the CSI resource set. In another example, the UE 116 could be indicated/provided by the network 130, e.g., via higher layer RRC signaling/parameter and/or MAC CE command and/or dynamic DCI based signaling, the mapping/association between the K sets of frequency domain resource allocation parameters and the K CSI resource subsets/groups (and therefore, the corresponding CSI-RS resources for FSBM configured therein) configured in the same CSI resource set.

Optionally, the higher layer parameter(s), e.g., CSI-SSB-ResourceSet/NZP-CSI-RS-ResourceSet, that configures a CSI resource set and provides the K sets of frequency domain resource allocation parameters could also include/provide/indicate the K CSI resource subset IDs/indexes each associated/mapped to a set of frequency domain resource allocation parameters discussed herein. Alternatively, one or more of the described herein K sets of frequency domain resource allocation parameters could be indicated in one or more DCIs, via one or more new DCI fields or by repurposing one or more bits/codepoints of one or more existing DCI fields in the DCI(s). One or more of the described herein K sets of frequency domain resource allocation parameters could also be indicated in one or more MAC CE commands; for this case, the MAC CE command(s) that provides/indicates the K sets of frequency domain resource allocation parameters could also include/provide/indicate the K CSI resource subset IDs/indexes each associated/mapped to a set of frequency domain resource allocation parameters discussed herein. For both MAC CE and DCI based indication of the K sets of frequency domain resource allocation parameters, the association/mapping between the MAC CE/DCI indicated K sets of frequency domain resource allocation parameters and the K CSI resource subsets/groups (and therefore, the corresponding CSI-RS resources for FSBM configured therein) configured in the same CSI resource set could follow one or more examples discussed herein for the RRC based configuration/indication of the K sets of frequency domain resource allocation parameters.

Yet for another example, the higher layer parameter that configures a CSI resource setting comprising at least one CSI resource set for FSBM, e.g., CSI-ResourceConfig, could include/indicate K sets of frequency domain resource allocation parameters each corresponding/associated to a CSI resource subset/group configured in the CSI resource set(s) for FSBM. A set of frequency domain resource allocation parameters could comprise at least one or more (e.g., $N_k$) frequency domain allocations of REs for one or more frequency subbands corresponding/associated with one or more CSI-RS resources configured in a CSI resource subset/group (e.g., the $N_k$ CSI-RS resources in the k-th CSI resource subset/group in the resource set for FSBM) and one or more (e.g., $N_k$) frequency domain allocations of RBs (comprising at least a starting RB and the number of PRBs across which the corresponding CSI-RS resource/frequency subband spans) for one or more frequency subbands corresponding/associated to one or more CSI-RS resources in a CSI resource subset/group (e.g., the $N_k$ CSI-RS resources in the k-th CSI resource subset/group in the resource set for FSBM). In one example, the K sets of frequency domain resource allocation parameters configured in the CSI resource setting and the K CSI resource subsets/groups configured in the CSI resource set(s) for FSBM are one-to-one mapped; for instance, the first set of frequency domain resource allocation parameters in the CSI resource setting could correspond to the first CSI resource subset/group (and therefore, the $N_1$ CSI-RS resources for FSBM configured therein) in the CSI resource set(s) for FSBM, the second set of frequency domain resource allocation parameters in the CSI resources setting could correspond to the second CSI resource subset/group (and therefore, the $N_2$ CSI-RS resources for FSBM configured therein) in the CSI resource set(s) for FSBM, and so on, and the K-th set of frequency domain resource allocation parameters in the CSI resource setting could correspond to the K-th CSI resource subset/group (and therefore, the $N_K$ CSI-RS resources for FSBM configured therein) in the CSI resource set(s) for FSBM. In another example, the UE 116 could be indicated/provided by the network 130, e.g., via higher layer RRC signaling/parameter and/or MAC CE command and/or dynamic DCI based signaling, the mapping/association between the K sets of frequency domain resource allocation parameters in the CSI resource setting and the K CSI resource subsets/groups (and therefore, the corresponding CSI-RS resources for FSBM configured therein) configured in the CSI resource set(s) for FSBM. Optionally, the higher layer parameter(s), e.g., CSI-ResourceConfig, that configures a CSI resource setting and provides the K sets of frequency domain resource allocation parameters could also include/provide/indicate the K CSI resource subset IDs/indexes each associated/mapped to a set of frequency domain resource allocation parameters discussed herein. Alternatively, one or more of the described herein K sets of frequency domain resource allocation parameters could be indicated in one or more DCIs, via one or more new DCI fields or by repurposing one or more bits/codepoints of one or more existing DCI fields in the DCI(s). One or more of the described herein K sets of frequency domain resource allocation parameters could also be indicated in one or more MAC CE commands; for this case, the MAC CE command(s) that provides/indicates the K sets of frequency domain resource allocation parameters could also include/provide/indicate the K CSI resource subset IDs/indexes each associated/mapped to a set of frequency domain resource allocation parameters discussed herein. For both MAC CE and DCI based indication of the K sets of frequency domain resource allocation parameters, the association/mapping between the MAC CE/DCI indicated K sets of frequency domain resource allocation parameters and the K CSI resource subsets/groups (and therefore, the corresponding CSI-RS resources for FSBM configured therein) configured in the CSI resource set(s) for FSBM could follow those discussed herein for the RRC based configuration/indication of the K sets of frequency domain resource allocation parameters.

Yet for another example, the higher layer parameter that configures a CSI resource set for FSBM, e.g., CSI-SSB-ResourceSet or NZP-CSI-RS-ResourceSet, could include/indicate K sets of bitmaps with each set comprising one or more bitmaps for a CSI resource subset/group (e.g., a set of $N_k$ bitmaps for the $N_k$ CSI-RS resources configured in the k-th CSI resource subset/group in the resource set). In this example, the configuration/indication of the one or more bitmaps in a set, and the association/mapping between the one or more bitmaps in a set and the frequency subband(s) for the corresponding CSI-RS resource(s) could follow one or more examples described herein. In one example, the K sets of bitmaps and the K CSI resource subsets/groups configured in the same CSI resource set are one-to-one mapped; for instance, the first set of bitmaps could correspond to the first CSI resource subset/group (and therefore, the $N_1$ CSI-RS resources for FSBM configured therein) in the CSI resource set, the second set of bitmaps could correspond to the second CSI resource subset/group (and therefore, the $N_2$ CSI-RS resources for FSBM configured therein) in the CSI resource set, and so on, and the K-th set of bitmaps could correspond to the K-th CSI resource subset/group (and therefore, the $N_K$ CSI-RS resources for FSBM configured therein) in the CSI resource set. In another example, the UE 116 could be indicated/provided by the network 130, e.g., via higher layer RRC signaling/parameter and/or MAC CE command and/or dynamic DCI based signaling, the mapping/association between the K sets of bitmaps and the K CSI resource subsets/groups (and therefore, the corresponding CSI-RS resources for FSBM configured therein) configured in the CSI resource set. Optionally, the higher layer parameter(s), e.g., CSI-SSB-ResourceSet/NZP-CSI-RS-ResourceSet, that configures a CSI resource set and provides the K sets of bitmaps could also include/provide/indicate the K CSI resource subset IDs/indexes each associated/mapped to a set of bitmaps discussed herein. Alternatively, one or more of the described herein K sets of bitmaps could be indicated in one or more DCIs, via one or more new DCI fields or by repurposing one or more bits/codepoints of one or more existing DCI fields in the DCI(s). The association/mapping between the DCI indicated K sets of bitmaps and the K CSI resource subsets/groups (and therefore, the corresponding CSI-RS resources for FSBM configured therein) configured in the same CSI resource set could follow one or more examples described herein for the RRC based configuration/indication of the K sets of bitmaps.

Yet for another example, the higher layer parameter that configures a CSI resource setting comprising at least one CSI resource set for FSBM, e.g., CSI-ResourceConfig, could include/indicate K sets of bitmaps with each set comprising one or more bitmaps for a CSI resource subset/group configured in the CSI resource set(s) for FSBM (e.g., a set of N bitmaps for the $N_k$ CSI-RS resources configured in the k-th CSI resource subset/group in the resource set). In this example, the configuration/indication of the one or more bitmaps in a set, and the association/mapping between the one or more bitmaps in a set and the frequency subband(s) for the corresponding CSI-RS resource(s) could follow one or more examples described herein. In one example, the K sets of bitmaps in the CSI resource setting and the K CSI resource subsets/groups configured in the CSI resource set(s) for FSBM are one-to-one mapped; for instance, the first set of bitmaps in the CSI resource setting could correspond to the first CSI resource subset/group (and therefore, the $N_1$ CSI-RS resources for FSBM configured therein) in the CSI resource set(s) for FSBM, the second set of bitmaps in the CSI resource setting could correspond to the second CSI resource subset/group (and therefore, the $N_2$ CSI-RS resources for FSBM configured therein) in the CSI resource set(s) for FSBM, and so on, and the K-th set of bitmaps in the CSI resource setting could correspond to the K-th CSI resource subset/group (and therefore, the $N_K$ CSI-RS resources for FSBM configured therein) in the CSI resource set(s) for FSBM. In another example, the UE 116 could be indicated/provided by the network 130, e.g., via higher layer RRC signaling/parameter and/or MAC CE command and/or dynamic DCI based signaling, the mapping/association between the K sets of bitmaps configured in the CSI resource setting and the K CSI resource subsets/groups (and therefore, the corresponding CSI-RS resources for FSBM configured therein) configured in the CSI resource set(s) for FSBM. Optionally, the higher layer parameter(s), e.g., CSI-ResourceConfig, that configures a CSI resource setting and provides the K sets of bitmaps could also include/provide/indicate the K CSI resource subset IDs/indexes each associated/mapped to a set of bitmaps discussed herein. Alternatively, one or more of the described herein K sets of bitmaps could be indicated in one or more DCIs, via one or more new DCI fields or by repurposing one or more bits/codepoints of one or more existing DCI fields in the DCI(s). The association/mapping between the DCI indicated K sets of bitmaps and the K CSI resource subsets/groups (and therefore, the corresponding CSI-RS resources for FSBM configured therein) configured in the CSI resource set(s) for FSBM could follow one or more examples discussed herein for the RRC based configuration/indication of the K sets of bitmaps.

Yet for another example, the higher layer parameter that configures a CSI resource set for FSBM, e.g., CSI-SSB-ResourceSet or NZP-CSI-RS-ResourceSet, could include/indicate K bitmaps each corresponding/associated to a CSI resource subset/group configured therein. In this example, the configuration/indication of a bitmap, and the association/mapping between each bit position/entry in a bitmap and the frequency subband(s) for the corresponding CSI-RS resource(s) could follow one or more examples described herein. In one example, the K bitmaps and the K CSI resource subsets/groups configured in the same CSI resource set are one-to-one mapped; for instance, the first bitmap could correspond to the first CSI resource subset/group (and therefore, the $N_1$ CSI-RS resources for FSBM configured therein) in the CSI resource set, the second bitmap could correspond to the second CSI resource subset/group (and therefore, the $N_2$ CSI-RS resources for FSBM configured therein) in the CSI resource set, and so on, and the K-th bitmap could correspond to the K-th CSI resource subset/group (and therefore, the $N_K$ CSI-RS resources for FSBM configured therein) in the CSI resource set. In another example, the UE 116 could be indicated/provided by the network 130, e.g., via higher layer RRC signaling/parameter and/or MAC CE command and/or dynamic DCI based signaling, the mapping/association between the K bitmaps and the K CSI resource subsets/groups (and therefore, the corresponding CSI-RS resources for FSBM configured therein) configured in the CSI resource set. Optionally, the higher layer parameter(s), e.g., CSI-SSB-ResourceSet or NZP-CSI-RS-ResourceSet, that configures a CSI resource set and provides the K bitmaps could also include/provide/indicate the K CSI resource subset IDs/indexes each associated/mapped to a bitmap discussed herein. Alternatively, one or more of the described herein K bitmaps could be indicated in one or more DCIs, via one or more new DCI fields or by repurposing one or more bits/codepoints of one or more existing DCI fields in the DCI(s). The association/mapping between the DCI indicated K bitmaps and the K CSI resource subsets/groups (and therefore, the corresponding CSI-RS resources for FSBM configured therein) configured in the same CSI resource set could follow those discussed herein for the RRC based configuration/indication of the K bitmaps.

Yet for another example, the higher layer parameter that configures a CSI resource setting comprising at least one CSI resource set for FSBM, e.g., CSI-ResourceConfig, could include/indicate K bitmaps each corresponding/associated to a CSI resource subset/group configured in the CSI resource set(s) for FSBM. In this example, the configuration/indication of a bitmap, and the association/mapping between each bit position/entry in a bitmap and the frequency subband(s) for the corresponding CSI-RS resource(s) could follow one or more examples described herein. In one example, the K bitmaps in the CSI resource setting and the K CSI resource subsets/groups configured in the CSI resource set(s) for FSBM are one-to-one mapped; for instance, the first bitmap in the CSI resource setting could correspond to the first CSI resource subset/group (and therefore, the $N_1$ CSI-RS resources for FSBM configured therein) in the CSI resource set(s) for FSBM, the second bitmap in the CSI resource setting could correspond to the second CSI resource subset/group (and therefore, the $N_2$ CSI-RS resources for FSBM configured therein) in the CSI resource set(s) for FSBM, and so on, and the K-th bitmap in the CSI resource setting could correspond to the K-th CSI resource subset/group (and therefore, the $N_K$ CSI-RS resources for FSBM configured therein) in the CSI resource set(s) for FSBM. In another example, the UE 116 could be indicated/provided by the network 130, e.g., via higher layer RRC signaling/parameter and/or MAC CE command and/or dynamic DCI based signaling, the mapping/association between the K bitmaps configured in the CSI resource setting and the K CSI resource subsets/groups (and therefore, the corresponding CSI-RS resources for FSBM configured therein) configured in the CSI resource set(s) for FSBM. Optionally, the higher layer parameter(s), e.g., CSI-ResourceConfig, that configures a CSI resource setting and provides the K bitmaps could also include/provide/indicate the K CSI resource subset IDs/indexes each associated/mapped to a bitmap discussed herein. Alternatively, one or more of the described herein K bitmaps could be indicated in one or more DCIs, via one or more new DCI fields or by repurposing one or more bits/codepoints of one or more existing DCI fields in the DCI(s). The association/mapping between the DCI indicated K bitmaps and the K CSI resource subsets/groups (and therefore, the corresponding CSI-RS resources for FSBM configured therein) configured in the CSI resource set(s) for FSBM could follow those discussed herein for the RRC based configuration/indication of the K bitmaps.

Yet for another example, the UE 116 could receive from the network 130 a MAC CE command indicating/providing/including K sets of bitmaps with each set comprising one or more bitmaps for a CSI resource subset/group (and therefore, the corresponding CSI-RS resources configured therein) configured in the CSI resource set(s) for FSBM (e.g., a set of $N_k$ bitmaps for the $N_k$ CSI-RS resources configured in the k-th CSI resource subset/group in the resource set). In this example, the configuration/indication of the one or more bitmaps in a set, and the association/mapping between the one or more bitmaps in a set and the frequency subband(s) for the corresponding CSI-RS resource(s) could follow one or more examples described herein. In one example, the K sets of bitmaps in the MAC CE command and the K CSI resource subsets/groups configured in the CSI resource set(s) for FSBM are one-to-one mapped; for instance, the first set of bitmaps in the MAC CE command could correspond to the first CSI resource subset/group (and therefore, the $N_1$ CSI-RS resources for FSBM configured therein) in the CSI resource set(s) for FSBM, the second set of bitmaps in the MAC CE command could correspond to the second CSI resource subset/group (and therefore, the $N_2$ CSI-RS resources for FSBM configured therein) in the CSI resource set(s) for FSBM, and so on, and the K-th set of bitmaps in the MAC CE command could correspond to the K-th CSI resource subset/group (and therefore, the $N_K$ CSI-RS resources for FSBM configured therein) in the CSI resource set(s) for FSBM. In another example, the UE 116 could be indicated/provided by the network 130, e.g., via higher layer RRC signaling/parameter and/or MAC CE command and/or dynamic DCI based signaling, the mapping/association between the K sets of bitmaps configured in the MAC CE command and the K CSI resource subsets/groups (and therefore, the corresponding CSI-RS resources for FSBM configured therein) configured in the CSI resource set(s) for FSBM. Optionally, the MAC CE command that provides/indicates the K sets of bitmaps could also include/provide/indicate the K CSI resource subset IDs/indexes each associated/mapped to a set of bitmaps discussed herein.

Yet for another example, a UE could receive from the network 130 a MAC CE command indicating/providing/including K bitmaps each corresponding/associated to a CSI resource subset/group configured in a CSI-RS resource set for FSBM. In this example, the configuration/indication of a bitmap, and the association/mapping between each bit position/entry in a bitmap and the frequency subband(s) for the corresponding CSI-RS resource(s) could follow one or more examples described herein. In one example, the K bitmaps indicated in the MAC CE command and the K CSI resource subsets/groups configured in the CSI resource set(s) for FSBM are one-to-one mapped; for instance, the first bitmap in the MAC CE command could correspond to the first CSI resource subset/group (and therefore, the $N_1$ CSI-RS resources for FSBM configured therein) in the CSI resource set(s) for FSBM, the second bitmap in the MAC CE command could correspond to the second CSI resource subset/group (and therefore, the $N_2$ CSI-RS resources for FSBM configured therein) in the CSI resource set(s) for FSBM, and so on, and the K-th bitmap in the MAC CE command could correspond to the K-th CSI resource subset/group (and therefore, the $N_K$ CSI-RS resources for FSBM configured therein) in the CSI resource set(s) for FSBM. In another example, the UE 116 could be indicated/provided by the network 130, e.g., via higher layer RRC signaling/parameter and/or MAC CE command and/or dynamic DCI based signaling, the mapping/association between the K bitmaps in the MAC CE command and the K CSI resource subsets/groups (and therefore, the corresponding CSI-RS resources for FSBM configured therein) configured in the CSI resource set(s) for FSBM. Optionally, the MAC CE command that provides/indicates the K bitmaps could also include/provide/indicate the K CSI resource subset IDs/indexes each associated/mapped to a bitmap discussed herein.

Yet for another example, one or more of the design examples described herein can be combined to indicate/configure one or more frequency subbands for one or more CSI-RS resources in each of the K CSI resource subsets/groups configured in the CSI resource set(s) for FSBM.

A UE could be configured by the network 130 with one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM; this indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. For a CSI resource subset/group configured in the CSI resource set for FSBM, and therefore, the corresponding/associated frequency subbands (e.g., the $N_k$ frequency subbands for the $N_k$ CSI-RS resources configured in the k-th CSI resource subset/group in the resource set for FSBM) configured/indicated according to one or more of the described herein design examples, the UE 116 could be further indicated/configured/provided by the network 130, via higher layer RRC signaling/parameter and/or MAC CE command and/or dynamic DCI based signaling, one or more of the total configured/indicated frequency subbands (e.g., one or more of the $N_k$ frequency subbands for the k-th CSI resource subset/group in the resource set), and therefore, the corresponding one or more of the total configured/indicated CSI-RS resources in the CSI resource subset/group (e.g., one or more of the $N_k$ CSI-RS resources in the k-th CSI resource subset/group in the resource set), for FSBM.

For example, the UE 116 could receive from the network 130, via higher layer RRC signaling/parameter and/or MAC CE command and/or dynamic DCI based signaling, a bitmap of length $N_k$ for the k-th CSI resource subset/group in the resource set, where $k \in \{1, \ldots, K\}$. Each bit position/entry in the bitmap could correspond to a frequency subband, and therefore a CSI-RS resource—configured in the k-th CSI resource subset/group in the resource set—corresponding/associated to the frequency subband. If a bit position/entry in the bitmap is set to '1' (or '0'), the corresponding frequency subband/CSI-RS resource in the CSI resource subset/group is used/active for FSBM. The bitmap could comprise more than one bit positions/entries set to '1' (or '0') indicating that more than one frequency subbands/CSI-RS resources in the CSI resource subset/group can be used/active for FSBM. The UE 116 could receive at least one bitmap for each CSI resource subset/group configured in the resource set for FSBM.

For another example, the UE 116 could receive from the network 130, via higher layer RRC signaling/parameter and/or MAC CE command and/or dynamic DCI based signaling, a set of one or more frequency subband indexes each determined from $\{1, \ldots, N_k\}$ for the k-th CSI resource subset/group in the resource set, where $k \in \{1, \ldots, K\}$. Here, a frequency subband index is equivalent to a CSI-RS resource ID/index, a frequency subband is equivalent to a CSI-RS resource, a set of one or more frequency subband indexes are equivalent to a set of one or more CSI-RS resource indexes/IDs, and a set of one or more frequency subbands are equivalent to a set of one or more CSI-RS resources. For this case, the frequency subband(s) corresponding to the indicated/configured/provided frequency subband index(es), and therefore, the corresponding CSI-RS resource(s) configured in the CSI resource subset/group, is used/active for FSBM. The UE 116 could receive at least one set of one or more frequency subband indexes for each CSI resource subset/group configured in the resource set for FSBM.

Yet for another example, the UE 116 could receive from the network 130 one or more MAC CE activation commands each activating one or more of the frequency subbands/CSI-RS resources configured in one or more CSI resource subsets/groups, where the activated one or more frequency subbands/CSI-RS resources are used/active for FSBM.

Yet for another example, the higher layer parameter, e.g., NZP-CSI-RS-Resource, that configures a CSI-RS resource in a CSI resource subset/group for FSBM could include/indicate/comprise an indicator. If the indicator is set to 'enabled'/'on' or the like, the corresponding CSI-RS resource (and therefore, the corresponding frequency subband) is used/active for FSBM for the corresponding CSI resource subset/group. Alternatively, the indicator could correspond to a one-big flag indicator. That is, if the one-bit flag indicator is set to '1' (or '0') or the like, the corresponding CSI-RS resource (and therefore, the corresponding frequency subband) is used/active for FSBM for the corresponding CSI resource subset/group.

In yet another example, a UE could be configured by the network 130 with one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM; this indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. The UE 116 could be configured by the network 130, e.g., in a CSI resource setting provided by CSI-ResourceConfig, one or more (e.g., K≥1) CSI resource sets (each provided by, e.g., CSI-SSB-ResourceSet/NZP-CSI-RS-ResourceSet) each comprising one or more (e.g., N) CSI-RS resources for FSBM, where k=1, . . . , K. In particular, the k-th CSI resource set, and therefore, the $N_k$ CSI-RS resources configured therein, could correspond to a set of $N_k \geq 1$ frequency-selective beams (and therefore, the corresponding set of $N_k \geq 1$ frequency subbands), where each CSI-RS resource configured in the k-th CSI resource set could correspond to a frequency-selective beam (and therefore, the corresponding frequency subband). In the present disclosure, the set of $N_k \geq 1$ frequency-selective beams can also be referred to as a frequency-selective multi-beam. The indication/configuration of frequency subbands (in terms of their sizes and/or frequency domain resource allocations and/or etc.) for one or more CSI-RS resources, and the mapping/association between the frequency subbands and the CSI-RS resources could follow one or more examples described herein (e.g., by replacing CSI resource subset/group with CSI resource set in one or more of these design examples). Furthermore, the activation/indication of one or more frequency subbands/CSI-RS resources in a CSI resource set for FSBM could follow one or more examples described herein (e.g., by replacing CSI resource subset/group with CSI resource set in one or more of these design examples).

In yet another example, a UE could be configured by the network 130 one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM; this indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. The UE 116 could be configured by the network 130 one or more (e.g., K≥1) CSI resource settings (each provided by, e.g., CSI-ResourceConfig) each comprising one or more (e.g., $N_k$) CSI-RS resources for FSBM, where k=1, . . . , K. In particular, the k-th CSI resource setting, and therefore, the $N_k$ CSI-RS resources configured therein, could correspond to a set of $N_k \geq 1$ frequency-selective beams (and therefore, the corresponding set of $N_k \geq 1$ frequency subbands), where each CSI-RS resource configured in the k-th CSI resource setting could correspond to a frequency-selective beam (and therefore, the corresponding frequency subband). In the present disclosure, the set of $N_k \geq 1$ frequency-selective beams can also be referred to as a frequency-selective multi-beam. The indication/configuration of the frequency subbands (in terms of their sizes and/or frequency domain resource allocations and/or etc.) for one or more CSI-RS resources, the mapping/association between the frequency subbands, and the CSI-RS resources could follow one or more examples described herein (e.g., by replacing CSI resource subset/group with CSI resource setting in one or more of these design examples). Furthermore, the activation/indication of one or more frequency subbands/CSI-RS resources in a CSI resource setting for FSBM could follow one or more examples described herein (e.g., by replacing CSI resource subset/group with CSI resource setting in one or more of these design examples).

A UE could be configured by the network 130 with one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM; this indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. As discussed herein, a UE could be provided/indicated by the network 130, e.g., via higher layer RRC signaling/parameter and/or MAC CE command and/or dynamic DCI based signaling, that one or more CSI-RS resources (each corresponding to a SSB resource or a NZP CSI-RS resource) and/or one or more CSI resource subsets/groups (each comprising one or more CSI-RS resources) and/or one or more CSI resource sets (each comprising one or more CSI resource subsets/groups or one or more CSI-RS resources) and/or one or more CSI resource settings (each comprising one or more CSI resource sets or one or more CSI resource subsets/groups or one or more CSI-RS resources) are (configured) for frequency-selective beam measurement for FSBM. That is, a CSI measurement setting could comprise/configure/indicate/provide CSI resource settings and/or CSI resource sets and/or CSI resource subsets/groups and/or CSI-RS resources for beam measurements for both FSBM and conventional BM (or, non-frequency-selective BM (non-FSBM)); a CSI resource setting could comprise/configure/indicate/provide CSI resource sets and/or CSI resource subsets/groups and/or CSI-RS resources for beam measurements for both FSBM and non-FSBM; a CSI resource set could comprise/configure/indicate/provide CSI resource subsets/groups and/or CSI-RS resources for beam measurements for both FSBM and non-FSBM; and a CSI resource subset/group could comprise/configure/indicate/provide CSI-RS resources for beam measurements for both FSBM and non-FSBM.

In one example, a UE could be configured by the network 130 with one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM; this indication could be via higher layer RRC signaling/parameter and/or MAC CE command and/or dynamic DCI based signaling. For instance, a higher layer parameter, e.g., denoted by FreqSelectiveBeamMeasure-ment, could be indicated/provided in CSI-ResourceConfig to turn on/off the frequency-selective beam measurement for FSBM. The UE 116 could be indicated/configured/provided by the network 130, via higher layer RRC signaling/param-eter and/or MAC CE command and/or dynamic DCI based signaling, a bitmap to indicate RS resource(s) for frequency-selective beam measurement for FSBM.

For example, the higher layer parameter, e.g., CSI-MeasConfig, that configures a CSI measurement setting could provide/include/configure/indicate a bitmap with each bit position/entry of the bitmap corresponding to a CSI resource setting configured therein. If a bit position/entry of the bitmap is set to '1' (or '0'), the corresponding CSI resource setting (and therefore, the CSI resource sets and/or the CSI resource subsets/groups and/or CSI-RS resources configured therein) is for frequency-selective beam mea-surement for FSBM. Alternatively, the UE 116 could receive in a MAC CE command/DCI format the bitmap; the MAC CE command/DCI format could also include/provide/com-prise/indicate the corresponding CSI measurement setting ID/index.

For another example, the higher layer parameter, e.g., CSI-ResourceConfig, that configures a CSI resource setting could provide/include/comprise a bitmap with each bit posi-tion/entry of the bitmap corresponding to a CSI resource set configured therein. If a bit position/entry of the bitmap is set to '1' (or '0'), the corresponding CSI resource set (and therefore, the CSI resource subsets/groups and/or CSI-RS resources configured therein) is for frequency-selective beam measurement for FSBM. Alternatively, the UE 116 could receive in a MAC CE command/DCI format the bitmap; the MAC CE command/DCI format could also include/provide/comprise/indicate the corresponding CSI resource setting ID/index.

Yet for another example, the higher layer parameter, e.g., CSI-SSB-ResourceSet/NZP-CSI-RS-ResourceSet, that con-figures a CSI resource set could provide/include/comprise a bitmap with each bit position/entry of the bitmap corre-sponding to a CSI resource subset/group configured therein. If a bit position/entry of the bitmap is set to '1' (or '0'), the corresponding CSI resource subset/group (and therefore, the CSI-RS resources configured therein) is for frequency-selective beam measurement for FSBM. Alternatively, the UE 116 could receive in a MAC CE command/DCI format the bitmap; the MAC CE command/DCI format could also include/provide/comprise/indicate the corresponding CSI resource set ID/index.

Yet for another example, the higher layer parameter, e.g., CSI-SSB-ResourceSet/NZP-CSI-RS-ResourceSet, that con-figures a CSI resource set could provide/include/comprise a bitmap with each bit position/entry of the bitmap corre-sponding to a CSI-RS resource configured therein. If a bit position/entry of the bitmap is set to '1' (or '0'), the corresponding CSI-RS resource (e.g., the corresponding SSB resource or NZP CSI-RS resource) is for frequency-selective beam measurement for FSBM. Alternatively, the UE 116 could receive in a MAC CE command/DCI format the bitmap; the MAC CE command/DCI format could also include/provide/comprise/indicate the corresponding CSI resource set ID/index.

Yet for another example, the higher layer parameter, e.g., CSI-SSB-ResourceSubSet/NZP-CSI-RS-ResourceSubSet, that configures a CSI resource subset/group could provide/ include/comprise a bitmap with each bit position/entry of the bitmap corresponding to a CSI-RS resource configured therein. If a bit position/entry of the bitmap is set to '1' (or '0'), the corresponding CSI-RS resource (e.g., the corre-sponding SSB resource or NZP CSI-RS resource) is for frequency-selective beam measurement for FSBM. Alterna-tively, the UE 116 could receive in a MAC CE command/ DCI format the bitmap; the MAC CE command/DCI format could also include/provide/comprise/indicate the corre-sponding CSI resource subset/group ID/index.

In another example, a UE could be configured by the network 130 with one or more RS resources for frequency-selective beam measurement for FSBM, wherein one RS resource (e.g., corresponding to a SSB resource index or a NZP CSI-RS resource configuration index) could corre-spond to a set of one or more frequency-selective beams probing over one or more frequency subbands. The UE 116 could be indicated by the network 130 that the one or more RS resources are configured for frequency-selective beam measurement for FSBM; this indication could be via higher layer RRC signaling/parameter and/or MAC CE command and/or dynamic DCI based signaling. For instance, a higher layer parameter, e.g., denoted by FreqSelectiveBeamMea-surement, could be indicated/provided in CSI-ResourceCon-fig to turn on/off the frequency-selective beam measurement for FSBM. A UE could be indicated/configured/provided by the network 130, via higher layer RRC signaling/parameter and/or MAC CE command and/or dynamic DCI based signaling, a set of IDs/indexes to indicate RS resource(s) for frequency-selective beam measurement for FSBM.

For example, the higher layer parameter, e.g., CSI-MeasConfig, that configures a CSI measurement setting could provide/include/comprise a set of one or more CSI resource setting IDs/indexes. The CSI resource setting(s) (and therefore, the CSI resource sets and/or the CSI resource subsets/groups and/or CSI-RS resources configured therein) that corresponds to the CSI resource setting ID(s)/index(es) configured in the same CSI measurement setting is for frequency-selective beam measurement for FSBM. Alterna-tively, the UE 116 could receive in a MAC CE command/ DCI format the set of one or more CSI resource setting IDs/indexes; the MAC CE command/DCI format could also include/provide/comprise/indicate the corresponding CSI measurement setting ID/index.

For another example, the higher layer parameter, e.g., CSI-ResourceConfig, that configures a CSI resource setting could provide/include/comprise a set of one or more CSI resource set IDs/indexes. The CSI resource set(s) (and therefore, the CSI resource subsets/groups and/or CSI-RS resources configured therein) that corresponds to the CSI resource set ID(s)/index(es) configured in the same CSI resource setting is for frequency-selective beam measure-ment for FSBM. Alternatively, the UE 116 could receive in a MAC CE command/DCI format the set of one or more CSI resource set IDs/indexes; the MAC CE command/DCI for-mat could also include/provide/comprise/indicate the corre-sponding CSI resource setting ID/index.

Yet for another example, the higher layer parameter, e.g., CSI-SSB-ResourceSet/NZP-CSI-RS-ResourceSet, that con-figures a CSI resource set could provide/include/comprise a set of one or more CSI resource subset/group IDs/indexes. The CSI resource subset(s)/group(s) (and therefore, the CSI-RS resources configured therein) that corresponds to the CSI resource subset/group ID(s)/index(es) configured in the same CSI resource subset/group is for frequency-selective beam measurement for FSBM. Alternatively, the UE 116 could receive in a MAC CE command/DCI format the set of one or more CSI resource subset/group IDs/indexes; the MAC CE command/DCI format could also include/provide/comprise/indicate the corresponding CSI resource set ID/index.

Yet for another example, the higher layer parameter, e.g., CSI-SSB-ResourceSet/NZP-CSI-RS-ResourceSet, that configures a CSI resource set could provide/include/comprise a set of one or more CSI-RS resource IDs/indexes. The CSI-RS resource(s) (e.g., the corresponding SSB resource or NZP CSI-RS resource) that corresponds to the CSI-RS resource ID(s)/index(es) configured in the same CSI resource set is for frequency-selective beam measurement for FSBM. Alternatively, the UE 116 could receive in a MAC CE command/DCI format the set of one or more CSI-RS resource IDs/indexes; the MAC CE command/DCI format could also include/provide/comprise/indicate the corresponding CSI resource set ID/index.

Yet for another example, the higher layer parameter, e.g., CSI-SSB-ResourceSubSet/NZP-CSI-RS-ResourceSubSet, that configures a CSI resource subset/group could provide/include/comprise a set of one or more CSI-RS resource IDs/indexes. The CSI-RS resource(s) (e.g., the corresponding SSB resource or NZP CSI-RS resource) that corresponds to the CSI-RS resource ID(s)/index(es) configured in the same CSI resource subset/group is for frequency-selective beam measurement for FSBM. Alternatively, the UE 116 could receive in a MAC CE command/DCI format the set of one or more CSI-RS resource IDs/indexes; the MAC CE command/DCI format could also include/provide/comprise/indicate the corresponding CSI resource subset/group ID/index.

In yet another example, a UE could be configured by the network 130 with one or more RS resources for frequency-selective beam measurement for FSBM, wherein one RS resource (e.g., corresponding to a SSB resource index or a NZP CSI-RS resource configuration index) could correspond to a set of one or more frequency-selective beams probing over one or more frequency subbands. The UE 116 could be indicated by the network 130 that the one or more RS resources are configured for frequency-selective beam measurement for FSBM; this indication could be via higher layer RRC signaling/parameter and/or MAC CE command and/or dynamic DCI based signaling. For instance, a higher layer parameter, e.g., denoted by FreqSelectiveBeamMeasurement, could be indicated/provided in CSI-ResourceConfig to turn on/off the frequency-selective beam measurement for FSBM. The UE 116 could be indicated/configured/provided by the network 130, via higher layer RRC signaling/parameter and/or MAC CE command and/or dynamic DCI based signaling, an indicator to indicate RS resource(s) for frequency-selective beam measurement for FSBM.

For example, the higher layer parameter, e.g., CSI-MeasConfig, that configures a CSI measurement setting could provide/indicate/configure/include the indicator; if the indicator is set to 'enabled'/'on' or the like, the CSI resource setting(s)—and therefore, the corresponding CSI resource set(s) and/or CSI resource subset(s)/group(s) and/or CSI-RS resource(s) configured therein—configured in the CSI measurement setting could be for frequency-selective beam measurement for FSBM. Alternatively, the indicator could correspond to a one-bit flag indicator; if the one-bit flag indicator is set to '1' (or '0') or the like, the CSI resource setting(s)—and therefore, the corresponding CSI resource set(s) and/or CSI resource subset(s)/group(s) and/or CSI-RS resource(s) configured therein—configured in the CSI measurement setting could be for frequency-selective beam measurement for FSBM.

For another example, the higher layer parameter, e.g., CSI-ResourceConfig, that configures a CSI resource setting could provide/indicate/configure/include the indicator; if the indicator is set to 'enabled'/'on' or the like, the CSI resource set(s)—and therefore, the corresponding CSI resource subset(s)/group(s) and/or CSI-RS resource(s) configured therein—configured in the CSI resource setting could be for frequency-selective beam measurement for FSBM. Alternatively, the indicator could correspond to a one-bit flag indicator; if the one-bit flag indicator is set to '1' (or '0') or the like, the CSI resource set(s)—and therefore, the corresponding CSI resource set(s) and/or CSI resource subset(s)/group(s) and/or CSI-RS resource(s) configured therein—configured in the CSI resource setting could be for frequency-selective beam measurement for FSBM.

Yet for another example, the higher layer parameter, e.g., CSI-SSB-ResourceSet or NZP-CSI-RS-ResourceSet, that configures a CSI resource set could provide/indicate/configure/include the indicator; if the indicator is set to 'enabled'/'on' or the like, the CSI resource subset(s)/group(s)—and therefore, the corresponding CSI-RS resource(s) configured therein—configured in the CSI resource set could be for frequency-selective beam measurement for FSBM. Alternatively, the indicator could correspond to a one-bit flag indicator; if the one-bit flag indicator is set to '1' (or '0') or the like, the CSI resource subset(s)/group(s)—and therefore, the corresponding CSI-RS resource(s) configured therein—configured in the CSI resource set could be for frequency-selective beam measurement for FSBM.

Yet for another example the higher layer parameter, e.g., NZP-CSI-RS-Resource, that configures a CSI-RS resource could provide/indicate/configure/include the indicator; if the indicator is set to 'enabled'/'on' or the like, the corresponding CSI-RS resource could be for frequency-selective beam measurement for FSBM. Alternatively, the indicator could correspond to a one-bit flag indicator; if the one-bit flag indicator is set to '1' (or '0') or the like, the corresponding CSI-RS resource could be for frequency-selective beam measurement for FSBM.

In yet another example, the RS resource(s) configured/indicated in a CSI resource subset/group as discussed herein is for frequency-selective beam measurement for FSBM.

A UE could be indicated/configured by the network 130, e.g., via higher layer RRC signaling/parameter and/or MAC CE command and/or dynamic DCI based signaling, to report, e.g., in one or more CSI reports, one or more CSI/beam reporting metrics/quantities for FSBM.

In one example, the UE 116 could receive from the network 130, e.g., in the CSI reporting setting provided by CSI-ResportConfig, a higher layer parameter, e.g., denoted by FrequencySelectiveBasedReporting or FreqSelective-BeamReporting, to turn on/off CSI/beam reporting for FSBM. For instance, when the higher layer parameter (e.g., FrequencySelectiveBasedReporting orFreqSelectiveBeam-Reporting) in the CSI reporting setting provided by CSI-ReportConfig is configured or set to 'enabled', the UE 116 could report, e.g., in one or more CSI reports, one or more CSI/beam reporting metrics/quantities determined according to the measurement RS resource(s) configured for FSBM (according to one or more examples described herein).

In another example, the UE 116 could report, e.g., in one or more CSI reports, one or more CSI/beam reporting metrics/quantities for FSBM if one or more RS resources are configured for frequency-selective measurement for FSBM (according to one or more examples described herein).

Yet in another example, a new report quantity could be specified for CSI/beam reporting for FSBM (e.g., the new report quantity could be denoted by 'TTD'). The UE 116 could report, e.g., in one or more CSI reports, one or more CSI/beam reporting metrics/quantities such as TTD(s) if the UE 116 receives, in a CSI reporting setting provided by CSI-ReportConfig, the 'reportQuantity' set to 'TTD'.

Yet in another example, the UE 116 could report, e.g., in one or more CSI reports, one or more CSI/beam reporting metrics/quantities for FSBM if the UE 116 is configured/indicated by the network 130 that the (beam) measurement for FSBM is enabled—e.g., the UE 116 receives, in a CSI resource setting provided by CSI-ResourceConfig, a higher layer parameter FreqSelectiveBeamMeasurement set to 'enabled'.

The UE 116 could measure one or more CSI-RS resources (each for a frequency-selective multi-beam) configured in one or more CSI resource settings and/or CSI resource sets and/or CSI resource subsets/groups according to one or more examples described herein. When the CSI/beam reporting for FSBM is configured/enabled, e.g., when the UE 116 receives from the network 130, e.g., in the CSI reporting setting provided by CSI-ResportConfig, a higher layer parameter, e.g., denoted by FrequencySelectiveReporting or FreqSelectiveBeamReporting, that can turn on/off the CSI/beam reporting for FSBM, is configured or set to 'enabled', the UE 116 could report in a CSI report one or more of the following (e.g., when the CSI/beam reporting for FSBM is enabled/configured according to one or more examples described herein).

One or more (e.g., P≥1) pairs/group of one or more (e.g., L≥1) resource indicators (such as serving synchronization block reference identities (SSBRIs)/carrier resource indicators (CRIs)) and one or more (e.g., M≥1) beam metrics (such as layer 1 reference signal received powers (L1-RSRPs)/layer 1 signal to interference and noise ratios (L1-SINRs)). Each pair/group could comprise at least one resource indicator such as SSBRI/CRI and the corresponding beam metric such as L1-RSRP/L1-SINR. A resource indicator could correspond to a CSI-RS resource (corresponding to a frequency-selective multi-beam) configured according to one or more of the examples described herein.

One or more frequency subbands for a CSI-RS resource configured one or more examples described herein. For a configured CSI-RS resource, the UE 116 could derive the corresponding beam metric based on measurements from a subset of the frequency subband(s) configured for frequency-selective beam measurement for FSBM on the CSI-RS resource (e.g., the $N_k$ frequency subbands for the k-th CSI-RS resource for frequency-selective beam measurement for FSBM). The UE 116 could report in the CSI report the subset of the frequency subband(s), from which the beam metric for the CSI-RS resource is derived/determined. The UE 116 could be configured/indicated/provided by the network 130, e.g., via higher layer RRC signaling and/or MAC CE command and/or dynamic DCI based signaling, one or more thresholds to determine the subset of frequency subband(s) to report. If the subset of frequency subbands, from which the beam metric for the corresponding CSI-RS resource is derived/determined, correspond to all the frequency subbands configured for the CSI-RS resource for frequency-selective beam measurement for FSBM, the UE 116 could indicate to the network 130 (e.g., in the CSI report) that the beam metric for the CSI-RS resource is derived/determined from all the frequency subbands configured for the CSI-RS resource.

For example, when the CSI/beam reporting for FSBM is configured/enabled, e.g., when the UE 116 receives from the network 130, e.g., in the CSI reporting setting provided by CSI-ResportConfig, a higher layer parameter, e.g., denoted by FrequencySelectiveReporting or FreqSelectiveBeamReporting, that can turn on/off the CSI/beam reporting for FSBM, is configured or set to 'enabled', the UE 116 could report, e.g., in the CSI report, a set of one or more frequency subband indexes, each pointing to a frequency subband among all the frequency subbands configured for the corresponding CSI-RS resource for frequency-selective beam measurement for FSBM. Each frequency subband index in the set indicates/provides a frequency subband in the subset of frequency subband(s), from which the reported beam metric for the CSI-RS resource is derived/determined.

For another example, when the CSI/beam reporting for FSBM is configured/enabled, e.g., when the UE 116 receives from the network 130, e.g., in the CSI reporting setting provided by CSI-ResportConfig, a higher layer parameter, e.g., denoted by FrequencySelectiveReporting or FreqSelectiveBeamReporting, that can turn on/off the CSI/beam reporting for FSBM, is configured or set to 'enabled', the UE 116 could report, e.g., in the CSI report, a bitmap with each bit position/entry in the bitmap corresponding to a frequency subband among all the frequency subbands configured for the corresponding CSI-RS resource for frequency-selective beam measurement for FSBM. If a bit position/entry of the bitmap is set to '1' (or '0'), the frequency subband corresponding/associated with the bit position/entry is indicated/identified as a frequency subband in the subset of frequency subband(s), from which the reported beam metric for the CSI-RS resource is derived/determined. The bitmap could have more than one bit positions/entries set to '1' (or '0') each corresponding to a frequency subband in the subset of frequency subband(s).

Yet for another example, when the CSI/beam reporting for FSBM is configured/enabled, e.g., when the UE 116 receives from the network 130, e.g., in the CSI reporting setting provided by CSI-ResportConfig, a higher layer parameter, e.g., denoted by FrequencySelectiveReporting or FreqSelectiveBeamReporting, that can turn on/off the CSI/beam reporting for FSBM, is configured or set to 'enabled', the UE 116 could report, e.g., in the CSI report, the size of the subset of frequency subband(s), or equivalently, the number of frequency subband(s) in the subset of frequency subband(s), from which the reported beam metric for the CSI-RS resource is derived/determined.

Yet for another example, when the CSI/beam reporting for FSBM is configured/enabled, e.g., when the UE 116 receives from the network 130, e.g., in the CSI reporting setting provided by CSI-ResportConfig, a higher layer parameter, e.g., denoted by FrequencySelectiveReporting or FreqSelectiveBeamReporting, that can turn on/off the CSI/beam reporting for FSBM, is configured or set to 'enabled', the UE 116 could be indicated/configured by the network 130, e.g., via higher layer RRC signaling and/or MAC CE command and/or dynamic DCI based signaling, to use one or more of the examples described herein to report the subset of frequency subband(s), from which the reported beam metric for the CSI-RS resource is derived/determined.

One or more TTD delays estimated for a CSI-RS resource: for the k-th (k=1, . . . , K) CSI-RS resource configured in the resource set for frequency-selective beam measurement for FSBM, the corresponding $N_k$ TTD delays are $\tau_{1,k}, \tau_{2,k}, \ldots, \tau_{Nk,k}$ (see FIG. 8) each for a frequency subband. Here, a TTD delay could also correspond to a scaling factor of a TTD delay with respect to a reference TTD delay, a difference between a TTD delay and a reference TTD delay, a scaling factor between any two adjacent TTD delays and/or a difference between any two adjacent TTD delays. The one or more TTD delays estimated for the k-th CSI-RS resource could correspond to all the estimated TTD delays for the corresponding CSI-RS resource, e.g., $\hat{\tau}_{1,k}, \hat{\tau}_{2,k}, \ldots, \hat{\tau}_{Nk,k}$ for the k-th CSI-RS resource. The one or more TTD delays estimated for the k-th CSI-RS resource could also correspond to a subset of all the estimated TTD delays for the k-th CSI-RS resource. For instance, the UE 116 could report two estimated TTD delays $\hat{\tau}_{1,k}$ and $\hat{\tau}_{2,k}$ corresponding to the first and second frequency subbands for the k-th CSI-RS resource, respectively.

For example, when the CSI/beam reporting for FSBM is configured/enabled, e.g., when the UE 116 receives from the network 130, e.g., in the CSI reporting setting provided by CSI-ResportConfig, a higher layer parameter, e.g., denoted by FrequencySelectiveReporting or FreqSelectiveBeamReporting, that can turn on/off the CSI/beam reporting for FSBM, is configured or set to 'enabled', the UE 116 could report, e.g., in the CSI report: (1) the exact values of the one or more TTD delays estimated for the CSI-RS resource or (2) indexes of one or more entries in a set of candidate TTD delay values, wherein the one or more entries are associated with or determined from the one or more TTD delays estimated for the CSI-RS resource. Furthermore, the UE 116 could also report, e.g., in the CSI report, indexes of the one or more TTD delays estimated for the CSI-RS resource among all the estimated TTD delays for the CSI-RS resource; here, each index could point to a (estimated) TTD delay among all the (estimated) TTD delays or a frequency subband among all the frequency subbands configured for frequency-selective beam measurement for FSBM. For instance, the UE 116 could report $n_k$ for the estimated TTD delay $\hat{\tau}_{nk,k}$ for the k-th CSI-RS resource, where $n_k \in \{1, \ldots, N_k\}$.

For another example, when the CSI/beam reporting for FSBM is configured/enabled, e.g., when the UE 116 receives from the network 130, e.g., in the CSI reporting setting provided by CSI-ResportConfig, a higher layer parameter, e.g., denoted by FrequencySelectiveReporting or FreqSelectiveBeamReporting, that can turn on/off the CSI/beam reporting for FSBM, is configured or set to 'enabled', the UE 116 could report, e.g., in the CSI report: (1) the exact values of the one or more TTD delays estimated for the CSI-RS resource or (2) indexes of one or more entries in a set of candidate TTD delay values, wherein the one or more entries are associated with or determined from the one or more TTD delays estimated for the CSI-RS resource. For this design example, the UE 116 may not need to report to the network 130 indexes of the one or more TTD delays estimated for the CSI-RS resource. This is because the indexes of the one or more TTD delays estimated for the CSI-RS resource could correspond to the indexes of the reported frequency subbands specified in one or more examples described herein. That is, the indexes of the reported frequency subbands could be used to determine the indexes of the estimated TDD delays reported in the CSI report.

Yet for another example, when the CSI/beam reporting for FSBM is configured/enabled, e.g., when the UE 116 receives from the network 130, e.g., in the CSI reporting setting provided by CSI-ResportConfig, a higher layer parameter, e.g., denoted by FrequencySelectiveReporting or FreqSelectiveBeamReporting, that can turn on/off the CSI/beam reporting for FSBM, is configured or set to 'enabled', the UE 116 could report, e.g., in the CSI report, a set of values (e.g., a set of $N_k$ values for the k-th CSI-RS resource configured for frequency-selective beam measurement for FSBM). The UE 116 could report the one or more TTD delays estimated for the CSI-RS resource as one or more entries in the set, wherein the indexes of the one or more entries could be determined as the indexes of the reported TTD delays among all the estimated TTD delays for the CSI-RS resource. If a TTD delay estimated for the CSI-RS resource is not reported, the corresponding entry in the set is set to '0'—the index of the entry could be determined as the index of the estimated TTD delay among all the estimated TTD delays for the CSI-RS resource. As discussed herein, the one or more TTD delays estimated for the CSI-RS resource could correspond to (1) the exact values of the one or more TTD delays estimated for the CSI-RS resource or (2) indexes of one or more entries in a set of candidate TTD delay values, wherein the one or more entries are associated with or determined from the one or more TTD delays estimated for the CSI-RS resource.

Yet for another example, when the CSI/beam reporting for FSBM is configured/enabled, e.g., when the UE 116 receives from the network 130, e.g., in the CSI reporting setting provided by CSI-ResportConfig, a higher layer parameter, e.g., denoted by FrequencySelectiveReporting or FreqSelectiveBeamReporting, that can turn on/off the CSI/beam reporting for FSBM, is configured or set to 'enabled', the UE 116 could report, e.g., in the CSI report: (1) the exact values of the one or more TTD delays estimated for the CSI-RS resource or (2) indexes of one or more entries in a set of candidate TTD delay values, wherein the one or more entries are associated with or determined from the one or more TTD delays estimated for the CSI-RS resource. Furthermore, the UE 116 could report, e.g., in the CSI report, a bitmap (e.g., a bitmap of length $N_k$ for the k-th CSI-RS resource configured for frequency-selective beam measurement for FSBM). If a TTD delay estimate is reported, the corresponding bit position/entry in the bitmap is set to '1' (or '0')—the index of the bit position/entry in the bitmap could be determined as the index of the reported TTD delay estimate among all the estimated TTD delays for the CSI-RS resource. If a TTD delay estimate is not reported, the corresponding bit position/entry in the bitmap is set to '0' (or '1')—the index of the bit position/entry in the bitmap could be determined as the index of the TTD delay estimate among all the estimated TTD delays for the CSI-RS resource.

Yet for another example, when the CSI/beam reporting for FSBM is configured/enabled, e.g., when the UE 116 receives from the network 130, e.g., in the CSI reporting setting provided by CSI-ResportConfig, a higher layer parameter, e.g., denoted by FrequencySelectiveReporting or FreqSelectiveBeamReporting, that can turn on/off the CSI/beam reporting for FSBM, is configured or set to 'enabled', the UE 116 could report, e.g., in the CSI report, (a set of) all the estimated TTD delays for the CSI-RS resource. As discussed herein, each of the TTD delays estimated for the CSI-RS resource could correspond to (1) the exact value of the TTD delay estimated for the CSI-RS resource or (2) an index of an entry in a set of candidate TTD delay values, wherein the entry is associated with the TTD delay estimated for the CSI-RS resource. Furthermore, the UE 116 could also report, e.g., in the CSI report, one or more indexes of one or more estimated TTD delays among all the estimated TTD delays, wherein the indexes could also correspond to one or more frequency subband indexes pointing to one or more frequency subbands among all the frequency subbands configured for frequency-selective beam measurement for FSBM on the CSI-RS resource, from which the reported beam metric for the CSI-RS resource is derived/determined.

Yet for another example, when the CSI/beam reporting for FSBM is configured/enabled, e.g., when the UE 116 receives from the network 130, e.g., in the CSI reporting setting provided by CSI-ReportConfig, a higher layer parameter, e.g., denoted by FrequencySelectiveReporting or FreqSelectiveBeamReporting, that can turn on/off the CSI/beam reporting for FSBM, is configured or set to 'enabled', the UE 116 could report, e.g., in the CSI report, (a set of) all the estimated TTD delays for the CSI-RS resource. As discussed herein, each of the TTD delays estimated for the CSI-RS resource could correspond to (1) the exact value of the TTD delay estimated for the CSI-RS resource or (2) an index of an entry in a set of candidate TTD delay values, wherein the entry is associated with the TTD delay estimated for the CSI-RS resource. Furthermore, the UE 116 could also report, e.g., in the CSI report, a bitmap with each bit position/entry in the bitmap corresponding/associated to an estimated TTD delay among all the reported TTD delays estimated for the CSI-RS resource (or a frequency subband among all the frequency subbands configured for frequency-selective beam measurement for FSBM on the corresponding CSI-RS resource). If a bit position/entry in the bitmap is set to '1' (or '0'), the corresponding estimated TTD delay among all the TTD delays estimated for the CSI-RS resource is indicated (and therefore, the corresponding frequency subband among all the frequency subbands configured for frequency-selective beam measurement for FSBM on the corresponding CSI-RS resource is indicated, which is also used by the UE 116 to derive/determine the beam metric for the CSI-RS resource).

Yet for another example, when the CSI/beam reporting for FSBM is configured/enabled, e.g., when the UE 116 receives from the network 130, e.g., in the CSI reporting setting provided by CSI-ReportConfig, a higher layer parameter, e.g., denoted by FrequencySelectiveReporting or FreqSelectiveBeamReporting, that can turn on/off the CSI/beam reporting for FSBM, is configured or set to 'enabled', the UE 116 could use one or more examples described herein or combinations of one or more examples described herein to report the one or more TTD delays estimated for the corresponding CSI-RS resource.

One or more TDD delays estimated for one or more CSI-RS resources configured for frequency-selective beam measurement for FSBM: when the CSI/beam reporting for FSBM is configured/enabled, e.g., when the UE 116 receives from the network 130, e.g., in the CSI reporting setting provided by CSI-ReportConfig, a higher layer parameter, e.g., denoted by FrequencySelectiveReporting or FreqSelectiveBeamReporting, that can turn on/off the CSI/beam reporting for FSBM, is configured or set to 'enabled', the UE 116 could use one or more of the examples described herein or combinations of one or more of the examples described herein to report the one or more TTD delays estimated according to one or more of the CSI-RS resources configured for frequency-selective beam measurement for FSBM (e.g., the K CSI-RS resources configured in the CSI resource set for frequency-selective beam measurement for FSBM).

The UE 116 could receive from the network 130, e.g., in the CSI reporting setting provided by CSI-ReportConfig, a higher layer parameter, e.g., denoted by groupBasedFrequencySelectiveReporting or groupBasedFreqSelectiveBeamReporting, to turn on/off the group based CSI/beam reporting for FSBM. For instance, when the higher layer parameter(s) groupBasedFrequencySelectiveReporting or groupBasedFreqSelectiveBeamReporting is configured or set to 'enabled', the UE 116 could report, e.g., in a CSI report, more than one (e.g., P>1) pairs/groups of beam quantities such as resource indicators (e.g., SSBRIs/CRIs) and/or beam metrics (e.g., L1-RSRPs/L1-SINRs) and/or the corresponding/associated frequency subband information/ configuration for each of the CSI-RS resources corresponding/associated to the reported resource indicators and/or the corresponding/associated TTD delays estimated for each of the CSI-RS resources corresponding/associated to the reported resource indicators following those specified/discussed/described herein. Otherwise, for instance, when the higher layer parameter(s) groupBasedFrequencySelectiveReporting or groupBasedFreqSelectiveBeamReporting is configured or set to 'enabled', the UE 116 could report, e.g., in a CSI report, a single (e.g., P=1) pair/group of beam quantities such as resource indicator(s) (e.g., SSBRI(s)/CRI(s)) and/or beam metric(s) (e.g., L1-RSRP(s)/L1-SINR(s)) and/or the corresponding/associated frequency subband information/configuration for each of the CSI-RS resource(s) corresponding/associated to the reported resource indicator(s) and/or the corresponding/associated TTD delays estimated for each of the CSI-RS resource(s) corresponding/associated to the reported resource indicator(s) following those specified/discussed/described herein.

The UE 116 could measure one or more CSI-RS resources (each for a beam) configured in one or more CSI resource settings and/or CSI resource sets and/or CSI resource subsets/groups according to one or more examples described herein. When the CSI/beam reporting for FSBM is configured/enabled, e.g., when the UE 116 receives from the network 130, e.g., in the CSI reporting setting provided by CSI-ReportConfig, a higher layer parameter, e.g., denoted by FrequencySelectiveReporting or FreqSelectiveBeamReporting, that can turn on/off the CSI/beam reporting for FSBM, is configured or set to 'enabled', the UE 116 could report in a CSI report one or more of the following (e.g., when the CSI/beam reporting for FSBM is enabled/configured—according to one or more examples described herein).

One or more (e.g., P≥1) pairs/groups of one or more (e.g., L≥1) resource group indicators and one or more (e.g., M≥1) beam metrics (such as L1-RSRPs/L1-SINRs). Each reported pair/group could comprise at least one resource group indicator and the corresponding beam metric such as L1-RSRP/L1-SINR.

A resource group indicator could correspond to a CSI resource subset/group or a CSI resource set or a CSI resource setting (corresponding to a frequency-selective multi-beam) configured according to one or more examples described herein. For instance, for a CSI resource subset/group, a CSI resource set, or a CSI resource setting (corresponding to a frequency-selective multi-beam) configured according to one or more examples described herein, the corresponding resource group indicator corresponds to the index of the CSI resource subset/group among all the CSI resource subsets/groups configured for frequency-selective beam measurement for FSBM or the index of the CSI resource set among all the CSI resource sets configured for frequency-selective beam measurement for FSBM or the index of the CSI resource setting among all the CSI resource settings configured for frequency-selective beam measurement for FSBM.

One or more frequency subbands (or one or more resource indicators such as SSBRIs/CRIs) for a CSI resource subset/group or a CSI resource set or a CSI resource setting configured according to one or more examples described herein. For a configured CSI resource subset/group or CSI resource set or CSI resource setting, the UE 116 could derive the corresponding beam metric based on measurements from a subset of the frequency subband(s)/CSI-RS resource(s) configured for frequency-selective beam measurement for FSBM (e.g., the $N_k$ frequency subbands/CSI-RS resources for the k-th CSI resource subset/group for frequency-selective beam measurement for FSBM). When the CSI/beam reporting for FSBM is configured/enabled, e.g., when the UE 116 receives from the network 130, e.g., in the CSI reporting setting provided by CSI-ResportConfig, a higher layer parameter, e.g., denoted by FrequencySelectiveReporting or FreqSelectiveBeamReporting, that can turn on/off the CSI/beam reporting for FSBM, is configured or set to 'enabled', the UE 116 could report, e.g., in the CSI report, the subset of the frequency subband(s)/CSI-RS resource(s), from which the beam metric for the corresponding CSI resource subset/group or CSI resource set or CSI resource setting is derived/determined. The UE 116 could be config-ured/indicated/provided by the network 130, e.g., via higher layer RRC signaling and/or MAC CE command and/or dynamic DCI based signaling, one or more thresholds to determine the subset of frequency subband(s)/CSI-RS resource(s) to report. If the subset of frequency subband(s)/ CSI-RS resource(s), from which the beam metric for the corresponding CSI resource subset/group or CSI resource set or CSI resource setting is derived/determined, correspond to all the frequency subbands/CSI-RS resources con-figured for the CSI resource subset/group or CSI resource set or CSI resource setting for frequency-selective beam mea-surement for FSBM, the UE 116 could indicate to the network 130 (e.g., in the CSI report) that the beam metric for the CSI resource subset/group or CSI resource set or CSI resource setting is derived/determined from all the fre-quency subbands/CSI-RS resources configured for the CSI resource subset/group or CSI resource set or CSI resource setting for frequency-selective beam measurement for FSBM.

For example, when the CSI/beam reporting for FSBM is configured/enabled, e.g., when the UE 116 receives from the network 130, e.g., in the CSI reporting setting provided by CSI-ResportConfig, a higher layer parameter, e.g., denoted by FrequencySelectiveReporting or FreqSelectiveBeamRe-porting, that can turn on/off the CSI/beam reporting for FSBM, is configured or set to 'enabled', the UE 116 could report, e.g., in the CSI report, a set of one or more frequency subband indexes (or resource indicators such as SSBRIs/ CRIs), each pointing to a CSI-RS resource or a frequency subband among all the frequency subbands configured for the corresponding CSI-RS resources in a CSI resource subset/group or CSI resource set or CSI resource setting for frequency-selective beam measurement for FSBM. Each frequency subband index (or resource indicator) in the set indicates/provides a frequency subband (or a CSI-RS resource) in the subset of frequency subband(s) (or CSI-RS resource(s)), from which the reported beam metric for the reported resource group indicator corresponding to a CSI resource subset/group or CSI resource set or CSI resource setting is derived/determined.

For another example, when the CSI/beam reporting for FSBM is configured/enabled, e.g., when the UE 116 receives from the network 130, e.g., in the CSI reporting setting provided by CSI-ResportConfig, a higher layer parameter, e.g., denoted by FrequencySelectiveReporting or FreqSe-lectiveBeamReporting, that can turn on/off the CSI/beam reporting for FSBM, is configured or set to 'enabled', the UE 116 could report, e.g., in the CSI report, a bitmap with each bit position/entry in the bitmap corresponding to a frequency subband (or CSI-RS resource) among all the frequency subbands (or CSI-RS resources) configured for/in a CSI resource subset/group or CSI resource set or CSI resource setting for frequency-selective beam measurement for FSBM. If a bit position/entry of the bitmap is set to '1' (or '0'), the frequency subband (or CSI-RS resource) corresponding/associated with the bit position/entry belongs to the subset of frequency subband(s) (or CSI-RS resource(s)), from which the reported beam metric for the reported resource group indicator corresponding to a CSI resource subset/group or CSI resource set or CSI resource setting is derived/determined. The bitmap could have more than one bit positions/entries set to '1' (or '0') each corresponding to a frequency subband (or CSI-RS resource) in the subset of frequency subband(s) (or CSI-RS resource(s)).

Yet for another example, when the CSI/beam reporting for FSBM is configured/enabled, e.g., when the UE 116 receives from the network 130, e.g., in the CSI reporting setting provided by CSI-ResportConfig, a higher layer parameter, e.g., denoted by FrequencySelectiveReporting or FreqSe-lectiveBeamReporting, that can turn on/off the CSI/beam reporting for FSBM, is configured or set to 'enabled', the UE 116 could report, e.g., in the CSI report, the size of the subset of frequency subband(s) (or CSI-RS resource(s)), or equiva-lently, the number of frequency subband(s) (or CSI-RS resource(s)) in the subset of frequency subband(s) (or CSI-RS resource(s)), from which the reported beam metric for the reported resource group indicator corresponding to a CSI resource subset/group or CSI resource set or CSI resource setting is derived/determined.

Yet for another example, when the CSI/beam reporting for FSBM is configured/enabled, e.g., when the UE 116 receives from the network 130, e.g., in the CSI reporting setting provided by CSI-ResportConfig, a higher layer parameter, e.g., denoted by FrequencySelectiveReporting or FreqSe-lectiveBeamReporting, that can turn on/off the CSI/beam reporting for FSBM, is configured or set to 'enabled', the UE 116 could be indicated/configured by the network 130, e.g., via higher layer RRC signaling and/or MAC CE command and/or dynamic DCI based signaling, to use one or more examples described herein to report the subset of frequency subband(s) (or CSI-RS resource(s)), from which the reported beam metric for the reported resource group indi-cator corresponding to a CSI resource subset/group or CSI resource set or CSI resource setting is derived/determined.

One or more TTD delays estimated for one or more CSI-RS resources in a CSI resource subset/group or CSI resource set or CSI resource setting configured according to one or more examples described herein. For the $N_k$ CSI-RS resources in the k-th (k=1, . . . , K) CSI resource subset/ group or CSI resource set or CSI resource setting configured for frequency-selective beam measurement for FSBM, the corresponding $N_k$ TTD delays are $\tau_{1,k}, \tau_{2,k}, \ldots, \tau_{Nk,k}$ (see FIG. 8) each for a frequency subband/CSI-RS resource. Here, a TTD delay could also correspond to a scaling factor of a TTD delay with respect to a reference TTD delay, a difference between a TTD delay and a reference TTD delay, a scaling factor between any two adjacent TTD delays and/or a difference between any two adjacent TTD delays. The one or more TTD delays estimated for the k-th CSI resource subset/group or CSI resource set or CSI resource setting (and therefore, the corresponding CSI-RS resources configured therein) could correspond to all the estimated TTD delays for the corresponding CSI resource subset/ group or CSI resource set or CSI resource setting (and therefore, the corresponding CSI-RS resources configured therein), e.g., $\hat{\tau}_{1,k}, \hat{\tau}_{2,k} \ldots, \hat{\tau}_{Nk,k}$ for the k-th CSI resource subset/group in the resource set for frequency-selective beam measurement for FSBM. The one or more TTD delays estimated for the k-th CSI resource subset/group or CSI resource set or CSI resource setting (and therefore, the corresponding CSI-RS resources configured therein) could also correspond to a subset of all the estimated TTD delays for the k-th CSI resource subset/group or CSI resource set or CSI resource setting. For instance, the UE 116 could report two estimated TTD delays $\hat{\tau}_{1,k}$ and $\hat{\tau}_{2,k}$ which correspond to the first and second frequency subbands/CSI-RS resources for the k-th CSI resource subset/group in a CSI resource set for frequency-selective beam measurement for FSBM, respectively.

For example, when the CSI/beam reporting for FSBM is configured/enabled, e.g., when the UE 116 receives from the network 130, e.g., in the CSI reporting setting provided by CSI-ResportConfig, a higher layer parameter, e.g., denoted by FrequencySelectiveReporting or FreqSelectiveBeamReporting, that can turn on/off the CSI/beam reporting for FSBM, is configured or set to 'enabled', the UE 116 could report, e.g., in the CSI report: (1) the exact values of the one or more TTD delays estimated for one or more CSI-RS resources in the CSI resource subset/group or CSI resource set or CSI resource setting or (2) indexes of one or more entries in a set of candidate TTD delay values, wherein the one or more entries are associated with or determined from the one or more TTD delays estimated for the one or more CSI-RS resources in the CSI resource subset/group or CSI resource set or CSI resource setting. Furthermore, the UE 116 could also report, e.g., in the CSI report, indexes of the one or more TTD delays estimated for the CSI resource subset/group or CSI resource set or CSI resource setting among all the estimated TTD delays for the CSI resource subset/group or CSI resource set or CSI resource setting; here, each index could point to a (estimated) TTD delay among all the (estimated) TTD delays or a frequency subband (CSI-RS resource) among all the frequency subbands (CSI-RS resources) configured for frequency-selective beam measurement for FSBM. For instance, the UE 116 could report $n_k$ for the estimated TTD delay $\hat{\tau}_{nk,k}$ for the $n_k$-th CSI-RS resource configured in the k-th CSI resource subset/group for frequency-selective beam measurement for FSBM, where $n_k \in \{1, \ldots, N_k\}$.

For another example, when the CSI/beam reporting for FSBM is configured/enabled, e.g., when the UE 116 receives from the network 130, e.g., in the CSI reporting setting provided by CSI-ResportConfig, a higher layer parameter, e.g., denoted by FrequencySelectiveReporting or FreqSelectiveBeamReporting, that can turn on/off the CSI/beam reporting for FSBM, is configured or set to 'enabled', the UE 116 could report, e.g., in the CSI report: (1) the exact values of the one or more TTD delays estimated for the one or more CSI-RS resources in the CSI resource subset/group or CSI resource set or CSI resource setting or (2) indexes of one or more entries in a set of candidate TTD delay values, wherein the one or more entries are associated with or determined from the one or more TTD delays estimated for the one or more CSI-RS resources in the CSI resource subset/group or CSI resource set or CSI resource setting. For this design example, the UE 116 may not need to report to the network 130 indexes of the one or more TTD delays estimated for the CSI resource subset/group or CSI resource set or CSI resource setting. This is because the indexes of the one or more TTD delays estimated for the CSI resource subset/group or CSI resource set or CSI resource setting (and therefore, the corresponding one or more CSI-RS resources configured therein) could correspond to the indexes of the reported frequency subbands/resource indicators specified in one or more examples described herein. That is, the indexes of the reported frequency subbands or the reported resource indicators could be used to determine the indexes of the estimated TDD delays reported in the CSI report.

Yet for another example, when the CSI/beam reporting for FSBM is configured/enabled, e.g., when the UE 116 receives from the network 130, e.g., in the CSI reporting setting provided by CSI-ResportConfig, a higher layer parameter, e.g., denoted by FrequencySelectiveReporting or FreqSelectiveBeamReporting, that can turn on/off the CSI/beam reporting for FSBM, is configured or set to 'enabled', the UE 116 could report, e.g., in the CSI report, a set of values (e.g., a set of $N_k$ values for the $N_k$ CSI-RS resources in the k-th CSI resource subset/group configured for frequency-selective beam measurement for FSBM). The UE 116 could report the one or more TTD delays estimated for the one or more CSI-RS resources in the CSI resource subset/group or CSI resource set or CSI resource setting as one or more entries in the set, wherein the indexes of the one or more entries could be determined as the indexes of the reported TTD delays among all the estimated TTD delays for the CSI resource subset/group or CSI resource set or CSI resource setting. If a TTD delay estimated for a CSI-RS resource in the CSI resource subset/group or CSI resource set or CSI resource setting is not reported, the corresponding entry in the set is set to '0'—the index of the entry could be determined as the index of the estimated TTD delay among all the estimated TTD delays for the CSI resource subset/group or CSI resource set or CSI resource setting. As discussed herein, the one or more TTD delays estimated for the CSI resource subset/group or CSI resource set or CSI resource setting could correspond to (1) the exact values of the one or more TTD delays estimated for the CSI resource subset/group or CSI resource set or CSI resource setting or (2) indexes of one or more entries in a set of candidate TTD delay values, wherein the one or more entries are associated with or determined from the one or more TTD delays estimated for the CSI resource subset/group or CSI resource set or CSI resource setting.

Yet for another example, when the CSI/beam reporting for FSBM is configured/enabled, e.g., when the UE 116 receives from the network 130, e.g., in the CSI reporting setting provided by CSI-ResportConfig, a higher layer parameter, e.g., denoted by FrequencySelectiveReporting or FreqSelectiveBeamReporting, that can turn on/off the CSI/beam reporting for FSBM, is configured or set to 'enabled', the UE 116 could report, e.g., in the CSI report: (1) the exact values of the one or more TTD delays estimated for the one or more CSI-RS resources in the CSI resource subset/group or CSI resource set or CSI resource setting or (2) indexes of one or more entries in a set of candidate TTD delay values, wherein the one or more entries are associated with or determined from the one or more TTD delays estimated for the one or more CSI-RS resources in the CSI resource subset/group or CSI resource set or CSI resource setting. Furthermore, the UE 116 could report, e.g., in the CSI report, a bitmap (e.g., a bitmap of length $N_k$ for the $N_k$ CSI-RS resources in the k-th CSI resource subset/group configured for frequency-selective beam measurement for FSBM). If a TTD delay estimate is reported, the corresponding bit position/entry in the bitmap is set to '1' (or '0')—the index of the bit position/entry in the bitmap could be determined as the index of the reported TTD delay estimate among all the estimated TTD delays for the CSI resource subset/group or CSI resource set or CSI resource setting. If a TTD delay estimate is not reported, the corresponding bit position/entry in the bitmap is set to '0' (or '1')—the index of the bit position/entry in the bitmap could be determined as the index of the TTD delay estimate among all the estimated TTD delays for the CSI resource subset/group or CSI resource set or CSI resource setting.

Yet for another example, when the CSI/beam reporting for FSBM is configured/enabled, e.g., when the UE 116 receives from the network 130, e.g., in the CSI reporting setting provided by CSI-ResportConfig, a higher layer parameter, e.g., denoted by FrequencySelectiveReporting or FreqSelectiveBeamReporting, that can turn on/off the CSI/beam reporting for FSBM, is configured or set to 'enabled', the UE 116 could report, e.g., in the CSI report, (a set of) all the estimated TTD delays for the CSI resource subset/group or CSI resource set or CSI resource setting. As discussed herein, each of the TTD delays estimated for the CSI-RS resources in the CSI resource subset/group or CSI resource set or CSI resource setting could correspond to (1) the exact value of the TTD delay estimated for a CSI-RS resource in the CSI resource subset/group or CSI resource set or CSI resource setting or (2) an index of an entry in a set of candidate TTD delay values, wherein the entry is associated with the TTD delay estimated for a CSI-RS resource in the CSI resource subset/group or CSI resource set or CSI resource setting. Furthermore, the UE 116 could also report, e.g., in the CSI report, one or more indexes of one or more estimated TTD delays among all the estimated TTD delays, wherein the indexes could also correspond to one or more frequency subband indexes (or resource indicators) pointing to one or more frequency subbands (or CSI-RS resources)— from which the reported beam metric is derived/determined—among all the frequency subbands (or CSI-RS resources) configured for (or in) the corresponding CSI resource subset/group or CSI resource set or CSI resource setting for frequency-selective beam measurement for FSBM.

Yet for another example, when the CSI/beam reporting for FSBM is configured/enabled, e.g., when the UE 116 receives from the network 130, e.g., in the CSI reporting setting provided by CSI-ResportConfig, a higher layer parameter, e.g., denoted by FrequencySelectiveReporting or FreqSelectiveBeamReporting, that can turn on/off the CSI/beam reporting for FSBM, is configured or set to 'enabled', the UE 116 could report, e.g., in the CSI report, (a set of) all the estimated TTD delays for the CSI resource subset/group or CSI resource set or CSI resource setting. As discussed herein, each of the TTD delays estimated for the CSI-RS resources in the CSI resource subset/group or CSI resource set or CSI resource setting could correspond to (1) the exact value of the TTD delay estimated for a CSI-RS resource in the CSI resource subset/group or CSI resource set or CSI resource setting or (2) an index of an entry in a set of candidate TTD delay values, wherein the entry is associated with the TTD delay estimated for a CSI-RS resource in the CSI resource subset/group or CSI resource set or CSI resource setting. Furthermore, the UE 116 could also report, e.g., in the CSI report, a bitmap with each bit position/entry in the bitmap corresponding to an estimated TTD delay among all the reported TTD delays estimated for the CSI resource subset/group or CSI resource set or CSI resource setting (or a frequency band/CSI-RS resource among all the frequency subbands/CSI-RS resources configured for frequency-selective beam measurement for FSBM in the corresponding CSI resource subset/group or CSI resource set or CSI resource setting). If a bit position/entry in the bitmap is set to '1' (or '0'), the corresponding estimated TTD delay among all the TTD delays estimated for the CSI resource subset/group or CSI resource set or CSI resource setting is indicated (and therefore, the corresponding frequency subband/CSI-RS resource among all the frequency subbands/CSI-RS resources configured for frequency-selective beam measurement for FSBM in the corresponding CSI resource subset/group or CSI resource set or CSI resource setting is indicated, which is also used by the UE 116 to derive/determine the beam metric).

Yet for another example, when the CSI/beam reporting for FSBM is configured/enabled, e.g., when the UE 116 receives from the network 130, e.g., in the CSI reporting setting provided by CSI-ResportConfig, a higher layer parameter, e.g., denoted by FrequencySelectiveReporting or FreqSelectiveBeamReporting, that can turn on/off the CSI/beam reporting for FSBM, is configured or set to 'enabled', the UE 116 could use one or more of the examples described herein or combinations of one or more of the examples described herein to report the one or more TTD delays estimated for the one or more CSI-RS resources configured in the CSI resource subset/group or CSI resource set or CSI resource setting for frequency-selective beam measurement for FSBM.

The UE 116 could receive from the network 130, e.g., in the CSI reporting setting provided by CSI-ResportConfig, a higher layer parameter, e.g., denoted by groupBasedFrequencySelectiveReporting or groupBasedFreqSelectiveBeamReporting, to turn on/off the group based CSI/beam reporting for FSBM. For instance, when the higher layer parameter(s) groupBasedFrequencySelectiveReporting or groupBasedFreqSelectiveBeamReporting is configured or set to 'enabled', the UE 116 could report, e.g., in a CSI report, more than one (e.g., P>1) pairs/groups of resource group indicators and/or beam metrics (e.g., L1-RSRPs/L1-SINRs) and/or the corresponding/associated frequency subband information/configuration for each of the CSI resource subsets/groups or CSI resource sets or CSI resource settings corresponding/associated to the reported resource group indicators and/or the corresponding/associated TTD delays estimated for each of the CSI resource subsets/groups or CSI resource sets or CSI resource settings corresponding/associated to the reported resource group indicators following those specified/discussed/described herein. Otherwise, for instance, when the higher layer parameter(s) groupBasedFrequencySelectiveReporting or groupBasedFreqSelectiveBeamReporting is configured or set to 'enabled', the UE 116 could report, e.g., in a CSI report, a single (e.g., P=1) pair/group of resource group indicator(s) and/or beam metric(s) (e.g., L1-RSRP(s)/L1-SINR(s)) and/or the corresponding/associated frequency subband information/configuration for each of the CSI resource subset(s)/group(s) or CSI resource set(s) or CSI resource setting(s) corresponding/associated to the reported resource group indicator(s) and/or the corresponding/associated TTD delays estimated for each of the CSI resource subset(s)/group(s) or CSI resource set(s) or CSI resource setting(s) corresponding/associated to the reported resource group indicator(s) following those specified/discussed/described herein.

As discussed/described herein, a UE could report, e.g., in a CSI report, more than one group (i.e., P>1) of resource indicators and/or beam metrics with each group comprising at least one resource indicator (such as SSBRI/CRI) for a CSI-RS resource (corresponding to a frequency-selective multi-beam) or at least one resource group indicator for a CSI resource subset/group or CSI resource set or CSI resource setting (comprising one or more CSI-RS resources each corresponding to a beam) configured for frequency-selective beam measurement for FSBM and/or the corresponding beam metric(s) (such as L1-RSRP(s)/L1-SINR(s)). The value/number of P and/or the maximum value/number of P, e.g., denoted by $P_{max}$, could be determined/configured according to one or more of the examples described herein.

For example, the value/number of P or the maximum value/number of P (i.e., $P_{max}$) are fixed in the system specifications (e.g., P=2, 4, 8, 16, 32, 64, and $P_{max}$=2, 4, 8, 16, 32, 64).

For another example, the UE 116 could be indicated/configured/provided by the network 130, e.g., via higher layer RRC signaling (e.g., in a CSI reporting setting provided by CSI-ReportConfig) and/or MAC CE command and/or dynamic DCI based signaling, the value/number of P or the maximum value/number of P (i.e., $P_{max}$).

Yet for another example, the UE 116 could autonomously determine the value/number of P. For this case, the UE 116 could also report, e.g., in the CSI report, the value/number of P.

As discussed/described herein, a UE could report, e.g., in a reported pair/group of beam quantities of a CSI report, more than one (i.e., L>1) resource indicators such as SSBRIs/CRIs each for a CSI-RS resource (corresponding to a frequency-selective multi-beam) or more than one (i.e., L>1) resource group indicators each for a CSI resource subset/group or CSI resource set or CSI resource setting (comprising one or more CSI-RS resources each corresponding to a beam) configured for frequency-selective beam measurement for FSBM.

For example, the value/number of L or the maximum value/number of L (e.g., denoted by $L_{max}$) are fixed in the system specifications (e.g., L=2, 4, 8, 16, 32, 64, and $L_{max}$=2, 4, 8, 16, 32, 64).

For another example, the UE 116 could be indicated/configured/provided by the network 130, e.g., via higher layer RRC signaling (e.g., in a CSI reporting setting provided by CSI-ReportConfig) and/or MAC CE command and/or dynamic DCI based signaling, the value/number of L or the maximum value/number of L (e.g., denoted by $L_{max}$).

Yet for another example, the value/number of L could correspond/equal to the number of CSI-RS resources or the number of CSI resource subsets/groups or CSI resource sets or CSI resource settings configured according to one or more examples described herein for frequency-selective beam measurement for FSBM.

Yet for another example, the UE 116 could autonomously determine the value/number of L. For this case, the UE 116 could also report, e.g., in the CSI report, the value/number of L.

As discussed/described herein, a UE could report, e.g., in a reported pair/group of beam quantities of a CSI report, more than one (i.e., M>1) beam metrics such as L1-RSRPs/L1-SINRs each corresponding/associated to a resource indicator or resource group indicator in the same reported pair/group.

For example, the value/number of M or the maximum value/number of M (e.g., denoted by $M_{max}$) is fixed in the system specifications (e.g., M=2, 4, 8, 16, 32, 64, and $M_{max}$=2, 4, 8, 16, 32, 64).

For another example, the UE 116 could be indicated/configured/provided by the network 130, e.g., via higher layer RRC signaling (e.g., in a CSI reporting setting provided by CSI-ReportConfig) and/or MAC CE command and/or dynamic DCI based signaling, the value/number of M or the maximum value/number of M (e.g., denoted by $M_{max}$).

Yet for another example, the value/number of M could correspond/equal to the number of CSI-RS resources or the number of CSI resource subsets/groups or CSI resource sets or CSI resource settings configured according to one or more examples described herein for frequency-selective beam measurement for FSBM.

Yet for another example, the UE 116 could autonomously determine the value/number of M. For this case, the UE 116 could also report, e.g., in the CSI report, the value/number of M.

Based on the discussed/described design examples herein, when the higher layer parameter, e.g., FrequencySelectiveReporting or FreqSelectiveBeamReporting, is configured and/or set to 'enabled', and/or when the higher layer parameter, e.g., groupBasedFrequencySelectiveReporting or groupBasedFreqSelectiveBeamReporting, is configured and/or set to 'enabled', and/or when the value/number of P—determined/configured according to one or more examples described herein—is greater than one, the UE 116 could use differential (RSRP/SINR) reporting for one or more of the beam metrics in each of the one or more of the reported pairs/groups.

In one example, the differential (RSRP/SINR) reporting is applied/enabled per reported pair/group of beam quantities.

For differential RSRP reporting per reported pair/group of beam quantities, the largest measured value of L1-RSRP in a reported pair/group of beam quantities is quantized to a 7-bit value in the range [−140,−44] dBm with 1 dB step size, and a differential L1-RSRP in a reported pair/group of beam quantities is quantized to a 4-bit value. The differential L1-RSRP value is computed with a 2 dB step size with a reference to the largest measured L1-RSRP value which is part of the same pair/group of beam quantities and L1-RSRP reporting instance.

For Differential SINR reporting per pair/group of beam quantities, the largest measured value of L1-SINR in a reported pair/group of beam quantities is quantized to a 7-bit value in the range [−23,−40] dBm with 0.5 dB step size, and a differential L1-SINR in a reported pair/group of beam quantities is quantized to a 4-bit value. The differential L1-SINR value is computed with 1 dB step size with a reference to the largest measured L1-SINR value which is part of the same reported pair/group of beam quantities and L1-SINR reporting instance.

In another example, the differential (RSRP/SINR) reporting is applied/enabled across one or more reported pairs/groups of beam quantities.

For differential RSRP reporting across one or more reported pairs/groups of beam quantities, the largest measured value of L1-RSRP in the one or more reported pairs/groups of beam quantities is quantized to a 7-bit value in the range [−140,−44] dBm with 1 dB step size, and a differential L1-RSRP in the one or more reported pairs/groups of beam quantities is quantized to a 4-bit value. The differential L1-RSRP value is computed with a 2 dB step size with a reference to the largest measured L1-RSRP value in the one or more reported pairs/groups of beam quantities which is part of the same L1-RSRP reporting instance.

For differential SINR reporting across one or more reported pairs/groups of beam quantities, the largest measured value of L1-SINR in the one or more reported pairs/groups of beam quantities is quantized to a 7-bit value in the range [−23,−40] dBm with 0.5 dB step size, and a differential L1-SINR in the one or more reported pairs/groups of beam quantities is quantized to a 4-bit value. The differential L1-SINR value is computed with 1 dB step size with a reference to the largest measured L1-SINR value in the one or more reported pairs/groups of beam quantities which is part of the same L1-SINR reporting instance.

Furthermore, the UE 116 could be indicated/configured/provided by the network 130, e.g., via higher layer RRC signaling/parameter (e.g., in a CSI reporting setting provided by CSI-ReportConfig) and/or MAC CE command and/or dynamic DCI based signaling, the differential (RSRP/SINR) reporting format(s)—i.e., those specified in one or more examples described herein—to use/apply for the CSI/beam reporting for FSBM. Alternatively, the UE 116 could autonomously determine the differential (RSRP/SINR) reporting format(s) to use/apply—i.e., follow one or more examples described herein; for this case, the UE 116 could also indicate to the network 130, e.g., in part of the CSI report, the differential (RSRP/SINR) reporting format(s) applied/used at the UE 116 side.

A UE could be indicated/configured by the network 130, e.g., via higher layer RRC signaling/parameter and/or MAC CE command and/or dynamic DCI based signaling, to report, e.g., in one or more CSI reports, one or more CSI/beam reporting metrics/quantities for FSBM and one or more CSI/beam reporting metrics/quantities for non-FSBM.

In one example, the UE 116 could receive from the network 130, e.g., in the CSI reporting setting provided by CSI-ResportConfig, a higher layer parameter, e.g., denoted by MixedReporting or MixedFSBMnonFSBMReporting, to turn on/off mixing/reporting, in the same CSI report/CSI reporting instance, one or more report quantities for FSBM and one or more report quantities for non-FSBM. For instance, when the higher layer parameter (e.g., MixedReporting or MixedFSBMnonFSBMReporting) in the CSI reporting setting provided by CSI-ReportConfig is configured or set to 'enabled', the UE 116 could report, e.g., in the same CSI report/CSI reporting instance, one or more CSI/beam reporting metrics/quantities for FSBM, e.g., determined according to the measurement RS resource(s) configured for FSBM (according to one or more examples described herein), and one or more CSI/beam reporting metrics/quantities for non-FSBM, e.g., determined according to the measurement RS resource(s) configured for non-FSBM (according to one or more examples described herein).

In another example, the UE 116 could report, e.g., in the same CSI report/CSI reporting instance, one or more CSI/beam reporting metrics/quantities for FSBM, e.g., determined according to the measurement RS resource(s) configured for FSBM (according to one or more examples described herein), and one or more CSI/beam reporting metrics/quantities for non-FSBM, e.g., determined according to the measurement RS resource(s) configured for non-FSBM (according to one or more examples described herein), if the measurement RS resources configured for both FSBM and non-FSBM are configured/indicated/provided in the same CSI resource subset/group or CSI resource set or CSI resource setting.

Yet in another example, a new report quantity could be specified for reporting in the same CSI report/CSI reporting instance mixed reporting quantities for both FSBM and non-FSBM (e.g., the new report quantity could be denoted by 'mixedFSBMnonFSBMreport'). For this case, the UE 116 could report, e.g., in the same CSI report/CSI reporting instance, one or more CSI/beam reporting metrics/quantities for FSBM, e.g., determined according to the measurement RS resource(s) configured for FSBM (according to one or more examples described herein), and one or more CSI/beam reporting metrics/quantities for non-FSBM, e.g., determined according to the measurement RS resource(s) configured for non-FSBM (according to one or more examples described herein) if the UE 116 receives, in a CSI reporting setting provided by CSI-ReportConfig, the 'reportQuantity' set to 'mixedFSBMnonFSBMreport'.

Yet in another example, the UE 116 could report, e.g., in the same CSI report/CSI reporting instance, one or more CSI/beam reporting metrics/quantities for FSBM, e.g., determined according to the measurement RS resource(s) configured for FSBM (according to one or more examples described herein), and one or more CSI/beam reporting metrics/quantities for non-FSBM, e.g., determined according to the measurement RS resource(s) configured for non-FSBM (according to one or more examples described herein) if the UE 116 is configured/indicated by the network 130 that the (beam) measurement for FSBM is enabled—e.g., the UE 116 receives, in a CSI resource setting provided by CSI-ResourceConfig, a higher layer parameter FreqSelectiveBeamMeasurement set to 'enabled'.

As discussed described herein, when mixing/reporting, in the same CSI report/CSI reporting instance, one or more report quantities for FSBM and one or more report quantities for non-FSBM is configured/enabled (e.g., according to one or more examples described herein), e.g., when the UE 116 receives from the network 130, e.g., in the CSI reporting setting provided by CSI-ResportConfig, a higher layer parameter, e.g., denoted by MixedReporting or MixedFSBMnonFSBMReporting, that can turn on/off mixing/reporting, in the same CSI report/CSI reporting instance, one or more report quantities for FSBM and one or more report quantities for non-FSBM, is configured or set to 'enabled', a UE could report, e.g., in the same CSI report, one or more report quantities (including one or more resource indicators, resource group indicators, beam metrics, TTD delay estimates, frequency subband indexes and/or etc.) for CSI/beam reporting for FSBM and one or more report quantities (including resource indicators, beam metrics and/or etc.) for non-FSBM CSI/beam reporting.

In one example, the UE 116 could report, e.g., in the CSI report, a bitmap to indicate one or more reporting quantities for FSBM. Each bit position/entry of the bitmap could correspond to a reporting quantity in the same report. If a bit position/entry of the bitmap is set to '1' (or '0'), the corresponding reporting quantity (e.g., a resource indicator, a resource group indicator, a beam metric, a TTD delay estimate, a frequency subband index and/or etc.) is for FSBM. Otherwise, if a bit position/entry of the bitmap is set to '0' (or '1'), the corresponding reporting quantity (e.g., a resource indicator, a beam metric, and/or etc.) is for non-FSBM CSI/beam reporting.

In another example, the UE 116 could report, e.g., in the same CSI report, one or more report quantities determined according to the RS resource(s) configured for frequency-selective beam measurement for FSBM according to one or more examples described herein and one or more report quantities determined according to the RS resource(s) configured for non-FSBM beam measurement according to one or more examples described herein.

A UE could be indicated/configured/provided by the network 130, e.g., via higher layer RRC signaling/parameter and/or MAC CE command and/or dynamic DCI based signaling, that frequency-selective beam management (FSBM) is enabled (or not enabled/disabled).

In one example, the UE 116 could receive from the network 130, e.g., in the higher layer parameter CSI-ResportConfig that configures a CSI reporting setting, CSI-ResourceConfig that configures a CSI resource setting, CSI-SSB-ResourceSet/NZP-CSI-RS-ResourceSet that configures a CSI resource set, NZP-CSI-RS-Resource that configures a NZP CSI-RS resource, TCI-State/QCL-Info/DLor-JointTCI-State/UL-TCIState that configures a TCI state, a higher layer parameter, e.g., denoted by FreqSelectiveBeamManagement, set to 'enabled'/'disabled' to turn on/off frequency selective or frequency subband specific/dependent beam management. When/if the higher layer parameter FreqSelectiveBeamManagement that is configured/provided in the higher layer parameter(s) CSI-ReportConfig, CSI-ResourceConfig, CSI-SSB-ResourceSet/NZP-CSI-RS-ResourceSet or NZP-CSI-RS-Resource is set to 'enabled', the corresponding CSI reporting setting, CSI resource setting, CSI resource set (e.g., SSB resource set or NZP CSI-RS resource set) or NZP CSI-RS resource could be referred to as the CSI reporting setting for FSBM, CSI resource setting for FSBM, CSI resource set (e.g., SSB resource set or NZP CSI-RS resource set) for FSBM, or NZP CSI-RS resource for FSBM.

In another example, the UE 116 could receive from the network 130, e.g., a MAC CE activation/deactivation command, to activate and/or deactivate the FSBM or the frequency selective/frequency subband specific/dependent beam management.

In yet another example, one or more new/dedicated DCI fields could be introduced in a DCI format (e.g., DCI format 1_1 or 1_2) or one or more bits/codepoints of one or more existing/reserved DCI fields in a DCI format (e.g., DCI format 1_1 or 1_2) could be repurposed to indicate that the FSBM or the frequency selective/frequency subband specific/dependent beam management is enabled. For instance, the UE 116 could receive, e.g., in a DCI, a one-bit indicator set to '1' (or '0') indicating that the FSBM or the frequency selective/frequency subband specific/dependent beam management is enabled, and/or '0' (or '1') indicating that the FSBM or the frequency selective/frequency subband specific/dependent beam management is not enabled/disabled. As discussed herein, the one-bit indicator could be indicated in a DCI by introducing one or more new/dedicated DCI fields in a DCI format (e.g., DCI format 1_1 or 1_2) or repurposing one or more bits/codepoints of one or more existing/reserved DCI fields in a DCI format (e.g., DCI format 1_1 or 1_2).

When the FSBM or frequency selective/frequency subband specific/dependent beam management is enabled (according to one or more examples described herein), a UE could be configured/indicated/provided by the network 130, e.g., via higher layer RRC signaling/parameter and/or MAC CE command and/or dynamic DCI based signaling, one or more (e.g., $N_{meas} \geq 1$) frequency subbands each comprising one or more PRBs for frequency-selective beam measurement for FSBM—referred to as $N_{meas}$ FSBM measurement subbands in the present disclosure. The one or more PRBs in each FSBM measurement subband could be continuous, e.g., continuously indexed in frequency, or non-continuous. The UE 116 could be configured/indicated/provided by the network 130, e.g., via higher layer RRC signaling/parameter and/or MAC CE command and/or dynamic DCI based signaling, the FSBM measurement subband size—in number of PRBs (or size of each of the FSBM measurement subbands in number of PRBs).

For instance, the UE 116 could be first indicated/configured/provided by the network 130 (e.g., through higher layer RRC signaling/parameters, MAC CE commands, dynamic DCI based signaling) with a BWP, and consequently, the corresponding BWP size in terms of the number of PRBs, etc., for FSBM.

For another instance, the UE 116 could be provided by the network 130, e.g., in a CSI resource setting provided by CSI-ResourceConfig or a CSI reporting setting provided by CSI-ReportConfig, a higher layer parameter subbandsize-forFSBMmeas set to either 'value1' or 'value2'.

For another instance, if the higher layer parameter sub-bandsizeforFSBMmeas is set to 'value1', the first value/ number of subband size corresponding/associated to the BWP is used/determined as the FSBM measurement subband size; if the higher layer parameter subbandsize-forFSBMmeas is set to 'value2', the second value/number of subband size corresponding/associated to the BWP is used/determined as the FSBM measurement subband size.

For another instance, the association/mapping between the potential/candidate subband size(s) and BWP(s) could be fixed in the system specifications (e.g., documents and standards description [4])—see TABLE 1 in the present disclosure—and known to both the network 130 and UE sides a prior. As can be seen from TABLE 1 in the present disclosure, each BWP could correspond to two candidate values/numbers of (FSBM) subband size. Alternatively, the UE 116 could be configured/indicated/provided by the network 130, e.g., via higher layer RRC signaling/parameter and/or MAC CE command and/or dynamic DCI based signaling, the potential/candidate subband size(s) for a BWP or the association/mapping between the potential/candidate subband size(s) and BWP(s). Optionally, the potential/candidate subband size(s) could be a multiple (e.g., $m \geq 1$) of the subband size(s) shown/provided in TABLE 1: e.g., 4 m PRBs subband size and 8 m PRBs subband size for 24-72 PRBs BWP, 8 m PRBs subband size and 16 m PRBs subband size for 73-144 PRBs BWP, and 16 m PRBs subband size and 32 m PRBs subband size for 145-275 PRBs BWP. In the present disclosure, the UE 116 could be configured/provided/indicated by the network 130, e.g., via higher layer RRC signaling/parameter and/or MAC CE command and/or dynamic DCI based L1 signaling, the value/number of m.

TABLE 1

| Bandwidth part (BWP) - PRBs | Subband size (PRBs) |
|---|---|
| <24 | N/A |
| 24-72 | 4, 8 |
| 73-144 | 8, 16 |
| 145-275 | 16, 32 |

Furthermore, the UE 116 could be indicated/configured/provided by the network 130, e.g., via higher layer RRC signaling/parameter and/or MAC CE command and/or dynamic DCI based signaling, a bitmap with each bit position/entry in the bitmap corresponding/associated to a subband within the BWP. For instance, the UE 116 could receive from the network 130, e.g., in a CSI resource setting provided by CSI-ResourceConfig or a CSI resource set provided by CSI-SSB-ResourceSet/NZP-CSI-RS-Resource-Set or a CSI-RS resource provided by NZP-CSI-RS-Resource or a CSI reporting setting provided by CSI-ReportConfig, the bitmap. If a bit position/entry of the bitmap is set to '1' (or '0'), the frequency subband corresponding/associated to the bit position/entry is used/determined as a FSBM measurement subband. For this case, the bitmap could contain/comprise $N_{meas}$ bit positions/entries set to '1's (or '0's) indicating/configuring a total of $N_{meas}$ FSBM measurement subbands.

In the present disclosure, when the FSBM or frequency selective/frequency subband specific/dependent beam management is enabled (according to one or more examples described herein), a UE could be configured by the network 130 with one or more RS resources for frequency-selective beam measurement for FSBM, and report to the network 130, e.g., in a CSI report, one or more beam/report quantities for one or more of the RS resources configured for the frequency-selective beam measurement for FSBM, wherein one RS resource (e.g., corresponding to a SSB resource index or a NZP CSI-RS resource configuration index) could correspond to one or more FSBM measurement subbands, and each of the reported beam/report quantities (e.g., comprising at least one resource indicator such as SSBRI/CRI and/or one beam metric such as L1-RSRP/L1-SINR) could correspond to one or more FSBM measurement subbands.

In one example, when the FSBM or frequency selective/frequency subband specific/dependent beam management is enabled (according to one or more examples described herein), the UE 116 could be configured by the network 130 with one or more CSI-RS resources such as NZP CSI-RS resources (each provided by NZP-CSI-RS-Resource)—also referred to as CSI-RS resources for FSBM, in a CSI resource subset/group (e.g., provided by NZP-CSI-RS-ResourceSubSet)—also referred to as a CSI resource subset/group for FSBM, or a CSI resource set (e.g., provided by NZP-CSI-RS-ResourceSet)—also referred to as a CSI resource set for FSBM, or a CSI resource setting (e.g., provided by CSI-ResourceConfig)—also referred to as a CSI resource setting for FSBM, each configured/associated with one or more (e.g., $1 \leq M_{meas} \leq N_{meas}$) of the total configured $N_{meas} \geq 1$ FSBM measurement subbands. In particular, for a CSI-RS resource (e.g., a NZP CSI-RS resource provided by NZP-CSI-RS-Resource) or each of the CSI-RS resources configured for frequency-selective beam measurement for FSBM, the corresponding frequency subbands active/used for frequency-selective beam measurement/reporting could be determined or identified according to one or more of the followings.

For example, all of the configured $N_{meas}$ FSBM measurement subbands could be active/used for frequency-selective beam measurement/reporting for the corresponding CSI-RS resource. For this case, $M_{meas}=N_{meas}$. The UE 116 could also be indicated/configured/provided by the network 130, e.g., via higher layer RRC signaling and/or MAC CE command and/or dynamic DCI based signaling, that $M_{meas}=N_{meas}$.

For another example, the UE 116 could be configured/indicated/provided by the network 130, e.g., via higher layer RRC signaling/parameter and/or MAC CE command and/or dynamic DCI based signaling, a bitmap of length $N_{meas}$ for the CSI-RS resource with each bit position/entry of the bitmap corresponding/associated to a FSBM measurement subband. For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the bitmap. If a bit position/entry of the bitmap is set to '1' (or '0'), the FSBM measurement subband corresponding/associated with the bit position/entry is active/used for frequency-selective beam measurement/reporting for the corresponding CSI-RS resource. For this example, the bitmap could contain/comprise $1 \leq M_{meas} \leq N_{meas}$ bit positions/entries set to '1's (or '0's) indicating that a total of $M_{meas}$ FSBM measurement subbands—out of the total $N_{meas}$ configured FSBM measurement subbands—could be active/used for the frequency-selective beam measurement/reporting for the corresponding CSI-RS resource. Furthermore, the UE 116 could be configured/indicated/provided by the network 130, e.g., via higher layer RRC signaling/parameter (e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting) and/or MAC CE command and/or dynamic DCI based signaling, $K \geq 1$ such bitmaps each associated/mapped to a CSI-RS resource configured therein—e.g., the first bitmap could be associated/mapped to the first CSI-RS resource, the second bitmap could be associated/mapped to the second CSI-RS resource, and so on. Different bitmaps could have the same bit position(s)/entry(s) set to '1' (or '0').

Yet for another example, the UE 116 could be configured/indicated/provided by the network 130, e.g., via higher layer RRC signaling/parameter and/or MAC CE command and/or dynamic DCI based signaling, a set of $1 \leq M_{meas} \leq N_{meas}$ (subband) indexes for the CSI-RS resource with each (subband) index corresponding/pointing to a FSBM measurement subband—e.g., the (subband) indexes $1, 2, \ldots, M_{meas}$ could correspond/point to the first FSBM measurement subband, the second FSBM measurement subband, . . . , the $M_{meas}$-th FSBM measurement subband, respectively, among all the configured $N_{meas}$ FSBM measurement subbands. For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the set of (subband) indexes. For this case, the $M_{meas}$ FSBM measurement subband(s) corresponding/associated to the indicated/provided/configured (subband) index(es) could be active/used for the frequency-selective beam measurement/reporting for the corresponding CSI-RS resource. Furthermore, the UE 116 could be configured/indicated/provided by the network 130, e.g., via higher layer RRC signaling/parameter (e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting) and/or MAC CE command and/or dynamic DCI based signaling, $K \geq 1$ such sets of (subband) indexes each associated/mapped to a CSI-RS resource configured therein—e.g., the first set could be associated/mapped to the first CSI-RS resource, the second set could be associated/mapped to the second CSI-RS resource, and so on. Different sets of (subband) indexes could contain/comprise the same (subband) indexes.

In another example, when the FSBM or frequency selective/frequency subband specific/dependent beam management is enabled (according to one or more examples described herein), the UE 116 could be configured by the network 130 one or more (e.g., $K \geq 1$) CSI-RS resources such as NZP CSI-RS resources (each provided by NZP-CSI-RS-Resource)—also referred to as CSI-RS resources for FSBM, in a CSI resource subset/group (e.g., provided by NZP-CSI-RS-ResourceSubSet)—also referred to as a CSI resource subset/group for FSBM, or a CSI resource set (e.g., provided by NZP-CSI-RS-ResourceSet)—also referred to as a CSI resource set for FSBM, or a CSI resource setting (e.g., provided by CSI-ResourceConfig)—also referred to as a CSI resource setting for FSBM, each configured/associated with a FSBM measurement subband. In particular, for the one or more (e.g., K≥1) CSI-RS resources (e.g., K≥1 NZP CSI-RS resources each provided by NZP-CSI-RS-Resource) configured in the same CSI resource subset/group (e.g., provided by NZP-CSI-RS-ResourceSubSet), the same CSI resource set (e.g., provided by NZP-CSI-RS-ResourceSet), or the same CSI resource setting (e.g., provided by CSI-ResourceConfig) for frequency-selective beam measurement for FSBM, the mapping/association between the CSI-RS resource(s) and the FSBM measurement subband(s) could be determined or identified according to one or more of the followings.

For example, the first configured CSI-RS resource (e.g., the first NZP CSI-RS resource) could be associated/mapped to the first configured FSBM measurement subband, the second configured CSI-RS resource (e.g., the second NZP CSI-RS resource) could be associated/mapped to the second configured FSBM measurement subband, and so on, and the K-th configured CSI-RS resource (e.g., the K-th NZP CSI-RS resource) could be associated/mapped to the $N_{meas}$-th configured FSBM measurement subband. For this case, $K=N_{meas}$.

For another example, the UE 116 could be configured/indicated/provided by the network 130, e.g., via higher layer RRC signaling/parameter and/or MAC CE command and/or dynamic DCI based signaling, a bitmap of length $N_{meas}$ for the one or more (e.g., K≥1) CSI-RS resources configured in the same CSI resource subset/group or the same CSI resource set or the same CSI resource setting with each bit position/entry of the bitmap corresponding/associated to a FSBM measurement subband. For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the bitmap. If a bit position/entry of the bitmap is set to '1' (or '0'), the FSBM measurement subband corresponding/associated to the bit position/entry is active/used for frequency-selective beam measurement/reporting for one of the one or more (e.g., K≥1) CSI-RS resources (e.g., one of the K≥1 NZP CSI-RS resources). For this example, the bitmap could contain/comprise $1≤M_{meas}≤N_{meas}$ bit positions/entries set to '1's (or '0's) indicating that a total of $M_{meas}$ FSBM measurement subbands—out of the total $N_{meas}$ configured FSBM measurement subbands—could be active/used for the frequency-selective beam measurement/reporting for the one or more (e.g., K≥1) CSI-RS resources (or the K≥1 NZP CSI-RS resources)—e.g., the first bit position/entry in the bitmap set to '1' (or '0')—and therefore, the corresponding FSBM measurement subband—could be associated/mapped to the first CSI-RS resource (or the first NZP CSI-RS resource), the second bit position/entry in the bitmap set to '1' (or '0')—and therefore, the corresponding FSBM measurement subband—could be associated/mapped to the second CSI-RS resource (or the second NZP CSI-RS resource), and so on, and the $M_{meas}$-th bit position/entry set to '1' (or '0')—and therefore, the corresponding FSBM measurement subband—could be associated/mapped to the K-th CSI-RS resource (or the K-th NZP CSI-RS resource). For this case, $M_{meas}=K$. Alternatively, the higher layer parameter NZP-CSI-RS-Resource that configures a NZP CSI-RS resource could contain/comprise/provide a bitmap of length $N_{meas}$ for the corresponding NZP CSI-RS resource with each bit position/entry of the bitmap corresponding/associated to a FSBM measurement subband. For instance, if a bit position/entry of the bitmap is set to '1' (or '0'), the FSBM measurement subband corresponding/associated with the bit position/entry could be used/active for the frequency-selective beam measurement/reporting for the corresponding NZP CSI-RS resource.

Yet for another example, the UE 116 could be configured/indicated/provided by the network 130, e.g., via higher layer RRC signaling/parameter and/or MAC CE command and/or dynamic DCI based signaling, a set of $1≤M_{meas}≤N_{meas}$ (subband) indexes for the one or more (e.g., K≥1) CSI-RS resources configured in the same CSI resource subset/group or the same CSI resource set or the same CSI resource setting with each (subband) index corresponding/pointing to a FSBM measurement subband—e.g., the (subband) indexes 1, 2, . . . , $M_{meas}$ could correspond/point to the first FSBM measurement subband, the second FSBM measurement subband, . . . , the $M_{meas}$-th FSBM measurement subband, respectively, among all the configured $N_{meas}$ FSBM measurement subbands. For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the set of (subband) indexes. For this case, each of the $M_{meas}$ FSBM measurement subband(s) corresponding/associated to the indicated/provided/configured (subband) index(es) could be active/used for the frequency-selective beam measurement/reporting for one of the one or more (e.g., K≥1) CSI-RS resources (e.g., one of the K≥1 NZP CSI-RS resources)—e.g., the first (subband) index in the set—and therefore, the corresponding FSBM measurement subband—could be associated/mapped to the first CSI-RS resource (or the first NZP CSI-RS resource), the second (subband) index in the set—and therefore, the corresponding FSBM measurement subband—could be associated/mapped to the second CSI-RS resource (or the second NZP CSI-RS resource), and so on, and the $M_{meas}$-th (subband) index in the set—and therefore, the corresponding FSBM measurement subband—could be associated/mapped to the K-th CSI-RS resource (or the K-th NZP CSI-RS resource). For this case, $M_{meas}=K$. Alternatively, the higher layer parameter NZP-CSI-RS-Resource that configures a NZP CSI-RS resource could contain/comprise/provide a (subband) index for the corresponding NZP CSI-RS resource. For instance, the FSBM measurement subband corresponding/associated with the (subband) index could be used/active for the frequency-selective beam measurement/reporting for the corresponding NZP CSI-RS resource.

When the FSBM or frequency selective/frequency subband specific/dependent beam management is enabled (according to one or more examples described herein), a UE could be configured/indicated/provided by the network 130, e.g., via higher layer RRC signaling/parameter and/or MAC CE command and/or dynamic DCI based signaling, one or more (e.g., $N_{report}≥1$) frequency subbands each comprising one or more PRBs for frequency-selective beam reporting for FSBM—referred to as $N_{report}$ FSBM reporting subbands in the present disclosure. The one or more PRBs in each FSBM reporting subband could be continuous, e.g., continuously indexed in frequency, or non-continuous. The UE 116 could be configured/indicated/provided by the network 130, e.g., via higher layer RRC signaling/parameter and/or MAC CE command and/or dynamic DCI based signaling, the FSBM reporting subband size—in number of PRBs (or size of each of the FSBM reporting subbands in number of PRBs). For instance: the UE 116 could be first indicated/configured/provided by the network 130, e.g., via higher layer RRC signaling/parameter and/or MAC CE command and/or dynamic DCI based signaling, a BWP (and therefore, the corresponding BWP size in number of PRBs and etc.) for FSBM; the UE 116 could be provided by the network 130, e.g., in a CSI resource setting provided by CSI-ResourceConfig or a CSI reporting setting provided by CSI-ReportConfig, a higher layer parameter subbandsize-forFSBMreport set to either 'value1' or 'value2'; if the higher layer parameter subbandsizeforFSBMreport is set to 'value1', the first value/number of subband size corresponding/associated to the BWP is used/determined as the FSBM reporting subband size; if the higher layer parameter subbandsizeforFSBMreport is set to 'value2', the second value/number of subband size corresponding/associated to the BWP is used/determined as the FSBM reporting subband size; the association/mapping between the potential/candidate subband size(s) and BWP(s) could be fixed in the system specifications (e.g., documents and standards description [4])—see TABLE 1 in the present disclosure, and known to both the network 130 and UE sides a prior. As can be seen from TABLE 1 in the present disclosure, each BWP could correspond to two candidate values/numbers of (FSBM) subband size. Alternatively, the UE 116 could be configured/indicated/provided by the network 130, e.g., via higher layer RRC signaling/parameter and/or MAC CE command and/or dynamic DCI based signaling, the potential/candidate subband size(s) for a BWP or the association/mapping between the potential/candidate subband size(s) and BWP(s). Optionally, the potential/candidate subband size(s) could be a multiple (e.g., m≥1) of the subband size(s) shown/provided in TABLE 1: e.g., 4 m PRBs subband size and 8 m PRBs subband size for 24-72 PRBs BWP, 8 m PRBs subband size and 16 m PRBs subband size for 73-144 PRBs BWP, and 16 m PRBs subband size and 32 m PRBs subband size for 145-275 PRBs BWP. In the present disclosure, the UE 116 could be configured/provided/indicated by the network 130, e.g., via higher layer RRC signaling/parameter and/or MAC CE command and/or dynamic DCI based L1 signaling, the value/number of m.

Furthermore, the UE 116 could be indicated/configured/provided by the network 130, e.g., via higher layer RRC signaling/parameter and/or MAC CE command and/or dynamic DCI based signaling, a bitmap with each bit position/entry in the bitmap corresponding/associated to a subband within the BWP. For instance, the UE 116 could receive from the network 130, e.g., in a CSI resource setting provided by CSI-ResourceConfig or a CSI resource set provided by CSI-SSB-ResourceSet/NZP-CSI-RS-ResourceSet or a CSI-RS resource provided by ZP-CSI-RS-Resource or a CSI reporting setting provided by CSI-ReportConfig, the bitmap. If a bit position/entry of the bitmap is set to '1' (or '0'), the frequency subband corresponding/associated to the bit position/entry is used/determined as a FSBM reporting subband. For this case, the bitmap could contain/comprise $N_{report}$ bit positions/entries set to '1's (or '0's) indicating/configuring a total of $N_{report}$ FSBM reporting subbands.

In the present disclosure, when the FSBM or frequency selective/frequency subband specific/dependent beam management is enabled (according to one or more examples described herein), a UE could be configured by the network 130 with one or more RS resources for frequency-selective beam measurement for FSBM, and report to the network 130, e.g., in a CSI report, one or more beam/report quantities for one or more of the RS resources configured for the frequency-selective beam measurement for FSBM, wherein one RS resource (e.g., corresponding to a SSB resource index or a NZP CSI-RS resource configuration index) could correspond to one or more FSBM reporting subbands, and each of the reported beam/report quantities (e.g., comprising at least one resource indicator such as SSBRI/CRI and/or one beam metric such as L1-RSRP/L1-SINR) could correspond to one or more FSBM reporting subbands.

In one example, when the FSBM or frequency selective/frequency subband specific/dependent beam management is enabled (according to one or more examples described herein), the UE 116 could be configured by the network 130 with one or more CSI-RS resources such as NZP CSI-RS resources (each provided by NZP-CSI-RS-Resource)—also referred to as CSI-RS resources for FSBM, in a CSI resource subset/group (e.g., provided by NZP-CSI-RS-ResourceSub-Set)—also referred to as a CSI resource subset/group for FSBM, or a CSI resource set (e.g., provided by NZP-CSI-RS-ResourceSet)—also referred to as a CSI resource set for FSBM, or a CSI resource setting (e.g., provided by CSI-ResourceConfig)—also referred to as a CSI resource setting for FSBM, each configured/associated with one or more (e.g., $1 \le M_{report} \le N_{report}$) of the total configured $N_{report} \ge 1$ FSBM reporting subbands. In particular, for a CSI-RS resource (e.g., a NZP CSI-RS resource provided by NZP-CSI-RS-Resource) or each of the CSI-RS resources configured for frequency-selective beam measurement for FSBM, the corresponding frequency subbands active/used for frequency-selective beam measurement/reporting could be determined or identified according to one or more of the followings.

For example, all of the configured $N_{report}$ FSBM reporting subbands could be active/used for frequency-selective beam measurement/reporting for the corresponding CSI-RS resource. For this case, $M_{report} = N_{report}$. The UE 116 could also be indicated/configured/provided by the network 130, e.g., via higher layer RRC signaling and/or MAC CE command and/or dynamic DCI based signaling, that $M_{report} = N_{report}$.

For another example, the UE 116 could be configured/indicated/provided by the network 130, e.g., via higher layer RRC signaling/parameter and/or MAC CE command and/or dynamic DCI based signaling, a bitmap of length $N_{report}$ for the CSI-RS resource with each bit position/entry of the bitmap corresponding/associated to a FSBM reporting subband. For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the bitmap. If a bit position/entry of the bitmap is set to '1' (or '0'), the FSBM reporting subband corresponding/associated with the bit position/entry is active/used for frequency-selective beam measurement/reporting for the corresponding CSI-RS resource. For this example, the bitmap could contain/comprise $1 \leq M_{report} \leq N_{report}$ bit positions/entries set to '1's (or '0's) indicating that a total of $M_{report}$ FSBM reporting subbands—out of the total $N_{report}$ configured FSBM reporting subbands—could be active/used for the frequency-selective beam measurement/reporting for the corresponding CSI-RS resource. Furthermore, the UE 116 could be configured/indicated/provided by the network 130, e.g., via higher layer RRC signaling/parameter (e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting) and/or MAC CE command and/or dynamic DCI based signaling, $K \geq 1$ such bitmaps each associated/mapped to a CSI-RS resource configured therein—e.g., the first bitmap could be associated/mapped to the first CSI-RS resource, the second bitmap could be associated/mapped to the second CSI-RS resource, and so on. Different bitmaps could have the same bit position(s)/entry(s) set to '1' (or '0').

Yet for another example, the UE 116 could be configured/indicated/provided by the network 130, e.g., via higher layer RRC signaling/parameter and/or MAC CE command and/or dynamic DCI based signaling, a set of $1 \leq M_{report} \leq N_{report}$ (subband) indexes for the CSI-RS resource with each (subband) index corresponding/pointing to a FSBM reporting subband—e.g., the (subband) indexes $1, 2, \ldots, M_{report}$ could correspond/point to the first FSBM reporting subband, the second FSBM reporting subband, . . . , the $M_{report}$-th FSBM reporting subband, respectively, among all the configured $N_{report}$ FSBM reporting subbands. For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the set of (subband) indexes. For this case, the $M_{report}$ FSBM reporting subband(s) corresponding/associated to the indicated/provided/configured (subband) index(es) could be active/used for the frequency-selective beam measurement/reporting for the corresponding CSI-RS resource. Furthermore, the UE 116 could be configured/indicated/provided by the network 130, e.g., via higher layer RRC signaling/parameter (e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting) and/or MAC CE command and/or dynamic DCI based signaling, $K \geq 1$ such sets of (subband) indexes each associated/mapped to a CSI-RS resource configured therein—e.g., the first set could be associated/mapped to the first CSI-RS resource, the second set could be associated/mapped to the second CSI-RS resource, and so on. Different sets of (subband) indexes could contain/comprise the same (subband) indexes.

In another example, when the FSBM or frequency selective/frequency subband specific/dependent beam management is enabled (according to one or more examples described herein), the UE 116 could be configured by the network 130 one or more (e.g., $K \geq 1$) CSI-RS resources such as NZP CSI-RS resources (each provided by NZP-CSI-RS-Resource)—also referred to as CSI-RS resources for FSBM, in a CSI resource subset/group (e.g., provided by NZP-CSI-RS-ResourceSubSet)—also referred to as a CSI resource subset/group for FSBM, or a CSI resource set (e.g., provided by NZP-CSI-RS-ResourceSet)—also referred to as a CSI resource set for FSBM, or a CSI resource setting (e.g., provided by CSI-ResourceConfig)—also referred to as a CSI resource setting for FSBM, each configured/associated with a FSBM reporting subband. In particular, for the one or more (e.g., $K \geq 1$) CSI-RS resources (e.g., $K \geq 1$ NZP CSI-RS resources each provided by NZP-CSI-RS-Resource) configured in the same CSI resource subset/group (e.g., provided by NZP-CSI-RS-ResourceSubSet) or the same CSI resource set (e.g., provided by NZP-CSI-RS-ResourceSet) or the same CSI resource setting (e.g., provided by CSI-ResourceConfig) for frequency-selective beam measurement for FSBM, the mapping/association between the CSI-RS resource(s) and the FSBM reporting subband(s) could be determined or identified according to one or more of the followings.

For example, the first configured CSI-RS resource (e.g., the first NZP CSI-RS resource) could be associated/mapped to the first configured FSBM reporting subband, the second configured CSI-RS resource (e.g., the second NZP CSI-RS resource) could be associated/mapped to the second configured FSBM reporting subband, and so on, and the K-th configured CSI-RS resource (e.g., the K-th NZP CSI-RS resource) could be associated/mapped to the $N_{report}$-th configured FSBM reporting subband. For this case, $K = N_{report}$.

For another example, the UE 116 could be configured/indicated/provided by the network 130, e.g., via higher layer RRC signaling/parameter and/or MAC CE command and/or dynamic DCI based signaling, a bitmap of length $N_{report}$ for the one or more (e.g., $K \geq 1$) CSI-RS resources configured in the same CSI resource subset/group or the same CSI resource set or the same CSI resource setting with each bit position/entry of the bitmap corresponding/associated to a FSBM reporting subband. For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the bitmap. If a bit position/entry of the bitmap is set to '1' (or '0'), the FSBM reporting subband corresponding/associated to the bit position/entry is active/used for frequency-selective beam measurement/reporting for one of the one or more (e.g., $K \geq 1$) CSI-RS resources (e.g., one of the $K \geq 1$ NZP CSI-RS resources). For this example, the bitmap could contain/comprise $1 \leq M_{report} \leq N_{report}$ bit positions/entries set to '1's (or '0's) indicating that a total of $M_{report}$ FSBM measurement subbands—out of the total $N_{report}$ configured FSBM reporting subbands—could be active/used for the frequency-selective beam measurement/reporting for the one or more (e.g., $K \geq 1$) CSI-RS resources (or the $K \geq 1$ NZP CSI-RS resources)—e.g., the first bit position/entry in the bitmap set to '1' (or '0')—and therefore, the corresponding FSBM reporting subband—could be associated/mapped to the first CSI-RS resource (or the first NZP CSI-RS resource), the second bit position/entry in the bitmap set to '1' (or '0')—and therefore, the corresponding FSBM reporting subband—could be associated/mapped to the second CSI-RS resource (or the second NZP CSI-RS resource), and so on, and the $M_{report}$-th bit position/entry set to '1' (or '0')—and therefore, the corresponding FSBM reporting subband—could be associated/mapped to the K-th CSI-RS resource (or the K-th NZP CSI-RS resource). For this case, $M_{report}$=K. Alternatively, the higher layer parameter NZP-CSI-RS-Resource that configures a NZP CSI-RS resource could contain/comprise/provide a bitmap of length $N_{report}$ for the corresponding NZP CSI-RS resource with each bit position/entry of the bitmap corresponding/associated to a FSBM reporting subband. For instance, if a bit position/entry of the bitmap is set to '1' (or '0'), the FSBM reporting subband corresponding/associated with the bit position/entry could be used/active for the frequency-selective beam measurement/reporting for the corresponding NZP CSI-RS resource.

Yet for another example, the UE 116 could be configured/indicated/provided by the network 130, e.g., via higher layer RRC signaling/parameter and/or MAC CE command and/or dynamic DCI based signaling, a set of $1 \leq M_{report} \leq N_{report}$ (subband) indexes for the one or more (e.g., K≥1) CSI-RS resources configured in the same CSI resource subset/group or the same CSI resource set or the same CSI resource setting with each (subband) index corresponding/pointing to a FSBM reporting subband—e.g., the (subband) indexes 1, 2, . . . , $M_{report}$ could correspond/point to the first FSBM reporting subband, the second FSBM reporting subband, . . . , the $M_{report}$-th FSBM reporting subband, respectively, among all the configured $N_{report}$ FSBM reporting subbands. For instance, the UE 116 could receive from the network 130, e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting, the set of (subband) indexes. For this case, each of the $M_{report}$ FSBM reporting subband(s) corresponding/associated to the indicated/provided/configured (subband) index(es) could be active/used for the frequency-selective beam measurement/reporting for one of the one or more (e.g., K≥1) CSI-RS resources (e.g., one of the K≥1 NZP CSI-RS resources)—e.g., the first (subband) index in the set—and therefore, the corresponding FSBM reporting subband—could be associated/mapped to the first CSI-RS resource (or the first NZP CSI-RS resource), the second (subband) index in the set—and therefore, the corresponding FSBM reporting subband—could be associated/mapped to the second CSI-RS resource (or the second NZP CSI-RS resource), and so on, and the $M_{report}$-th (subband) index in the set—and therefore, the corresponding FSBM reporting subband—could be associated/mapped to the K-th CSI-RS resource (or the K-th NZP CSI-RS resource). For this case, $M_{report}$=K. Alternatively, the higher layer parameter NZP-CSI-RS-Resource that configures a NZP CSI-RS resource could contain/comprise/provide a (subband) index for the corresponding NZP CSI-RS resource. For instance, the FSBM reporting subband corresponding/associated with the (subband) index could be used/active for the frequency-selective beam measurement/reporting for the corresponding NZP CSI-RS resource.

Figure 10:
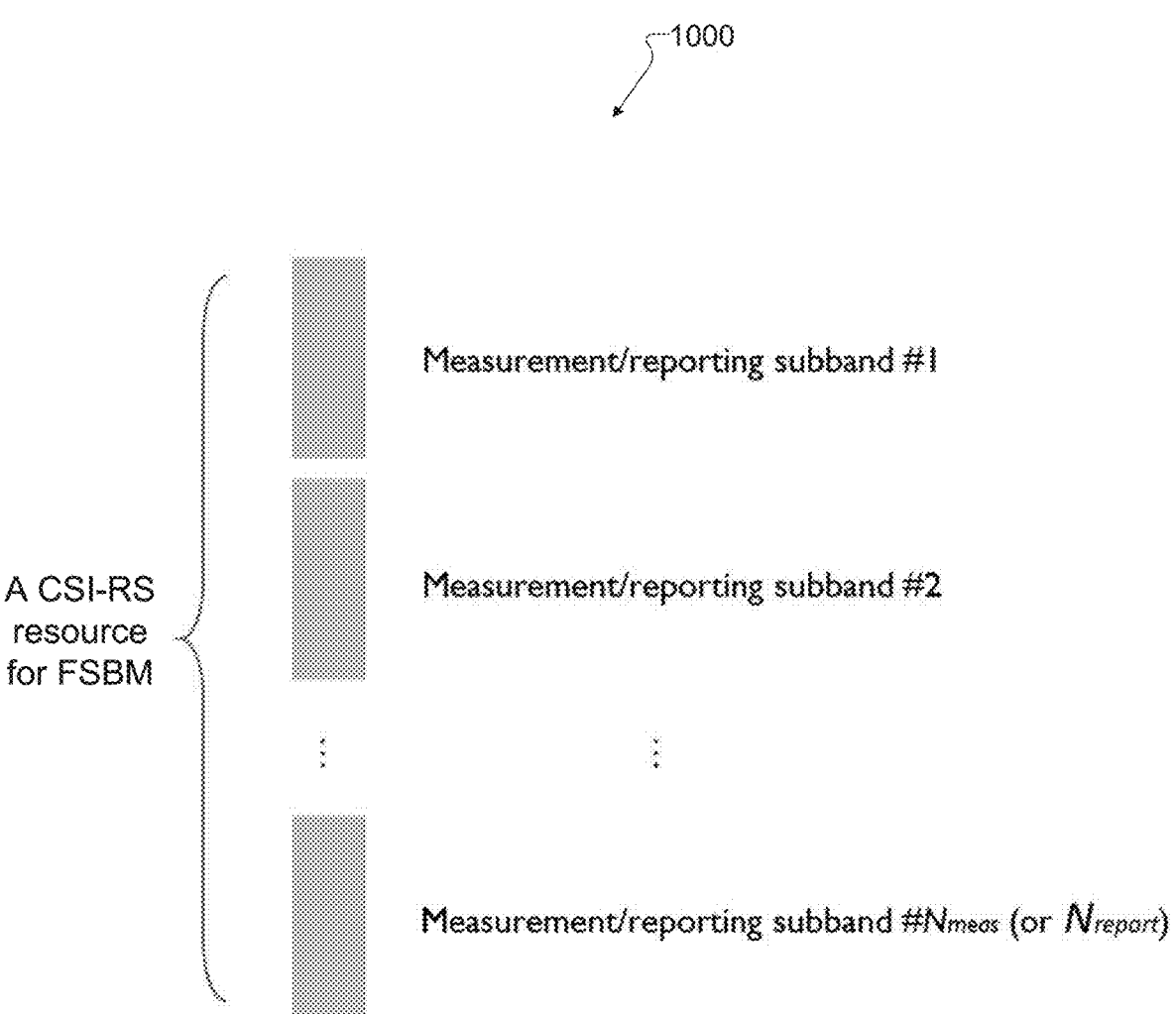
FIG. 10 illustrates an example of a Channel State Information Reference Signal (CSI-RS) resource for "frequency-selective" beam management (FSBM) according to embodiments of the present disclosure.

FIG. 10 illustrates an example of a CSI-RS resource 1000 for FSBM according to embodiments of the present disclosure. For example, the CS-RS resource 1000 may be implemented in gNB 102 and, more particularly, in one or more of the antennas 205 and its associated systems or transceivers 210. This example is for illustration only and other embodiments can be used without departing from the scope of the present disclosure.

When the FSBM or frequency selective/frequency subband specific/dependent beam management is enabled (according to one or more examples described herein), the FSBM measurement subband(s) and the FSBM reporting subband(s) could be the same or different (i.e., $N_{meas}=N_{report}$, $N_{meas} \geq N_{report}$ or $N_{meas} \leq N_{report}$).

For example, when the FSBM or frequency selective/frequency subband specific/dependent beam management is enabled (according to one or more examples described herein), the UE 116 could be configured/indicated/provided by the network 130, e.g., via higher layer RRC signaling/parameter and/or MAC CE command and/or dynamic DCI based signaling, the same frequency subband(s) for both frequency-selective beam measurement and reporting (i.e., $N_{meas}=N_{report}$). For this case, the UE 116 could only be configured/indicated/provided by the network 130, e.g., via higher layer RRC signaling/parameter and/or MAC CE command and/or dynamic DCI based signaling, either the FSBM measurement subband(s) or the FSBM reporting subband(s) according to one or more examples described herein. The UE 116 could be further indicated by the network 130 that the FSBM measurement subband(s) is the same as the FSBM reporting subband(s) or vice versa. This indication could be via higher layer RRC signaling/parameter and/or MAC CE command and/or dynamic DCI based signaling.

For another example, when the FSBM or frequency selective/frequency subband specific/dependent beam management is enabled (according to one or more examples described herein), the FSBM measurement subband(s) could be a subset of the FSBM reporting subband(s), or vice versa.

In one example, when the FSBM or frequency selective/frequency subband specific/dependent beam management is enabled (according to one or more examples described herein), the association/mapping between the FSBM measurement subband(s) and the FSBM reporting subband(s) could be fixed in the system specification(s)—e.g., the first FSBM measurement subband could correspond to the first FSBM reporting subband, the second FSBM measurement subband could correspond to the second FSBM reporting subband, and so on.

In another example, when the FSBM or frequency selective/frequency subband specific/dependent beam management is enabled (according to one or more examples described herein), the UE 116 could be indicated/configured/provided by the network 130, e.g., via higher layer RRC signaling/parameter and/or MAC CE command and/or dynamic DCI based signaling, the association/mapping between one or more of the FSBM measurement subband(s) and one or more of the FSBM reporting subband(s).

Furthermore, when the FSBM or frequency selective/frequency subband specific/dependent beam management is enabled (according to one or more examples described herein), the FSBM measurement subband(s) that is active/used for frequency-selective beam measurement/reporting for one or more CSI-RS resources—referred to as active FSBM measurement subband(s) in the present disclosure (configured according to one or more examples described herein) and the FSBM reporting subband(s) that is active/used for frequency-selective beam measurement/reporting for one or more CSI-RS resources—referred to as active FSBM reporting subband(s) in the present disclosure (configured according to one or more examples described herein) could be the same or different (i.e., $M_{meas}=M_{report}$, $M_{meas}\geq M_{report}$ or $M_{meas}\leq M_{report}$).

For example, when the FSBM or frequency selective/frequency subband specific/dependent beam management is enabled (according to one or more examples described herein), the UE 116 could be configured/indicated/provided by the network 130, e.g., via higher layer RRC signaling/parameter and/or MAC CE command and/or dynamic DCI based signaling, the same frequency subband(s) for both active FSBM measurement subband(s) and active FSBM reporting subband(s) (i.e., $M_{meas}=M_{report}$). For this case, the UE 116 could only be configured/indicated/provided by the network 130, e.g., via higher layer RRC signaling/parameter and/or MAC CE command and/or dynamic DCI based signaling, either the active FSBM measurement subband(s)—following one or more examples described herein, or the active FSBM reporting subband(s)—following one or more examples described herein. The UE 116 could be further indicated by the network 130 that the active FSBM measurement subband(s) is the same as the active FSBM reporting subband(s) or vice versa; this indication could be via higher layer RRC signaling/parameter and/or MAC CE command and/or dynamic DCI based signaling.

For another example, when the FSBM or frequency selective/frequency subband specific/dependent beam management is enabled (according to one or more examples described herein), the active FSBM measurement subband(s) could be a subset of the active FSBM reporting subband(s), or vice versa.

In one example, when the FSBM or frequency selective/frequency subband specific/dependent beam management is enabled (according to one or more examples described herein), the association/mapping between the active FSBM measurement subband(s) and the active FSBM reporting subband(s) could be fixed in the system specification(s)—e.g., the first active FSBM measurement subband could correspond to the first active FSBM reporting subband, the second active FSBM measurement subband could correspond to the second active FSBM reporting subband, and so on.

In another example, when the FSBM or frequency selective/frequency subband specific/dependent beam management is enabled (according to one or more examples described herein), the UE 116 could be indicated/configured/provided by the network 130, e.g., via higher layer RRC signaling/parameter and/or MAC CE command and/or dynamic DCI based signaling, the association/mapping between one or more of the active FSBM measurement subband(s) and one or more of the active FSBM reporting subband(s).

As discussed herein, when the FSBM or frequency selective/frequency subband specific/dependent beam management is enabled (according to one or more examples described herein), a UE could report to the network 130, e.g., in a CSI report (provided/configured by a CSI reporting setting CSI-ReportConfig—also referred to as a CSI reporting setting for FSBM), one or more (e.g., $K_{report}\geq 1$) beam/report quantities for one or more of the RS resources configured for the frequency-selective beam measurement for FSBM, wherein each of the reported beam/report quantities (e.g., comprising at least one resource indicator such as SSBRI/CRI and/or one beam metric such as L1-RSRP/L1-SINR) could correspond to one or more FSBM measurement/reporting subbands.

In one example, when the FSBM or frequency selective/frequency subband specific/dependent beam management is enabled (according to one or more examples described herein), the UE 116 could report, e.g., in a CSI report (provided/configured by a CSI reporting setting CSI-ReportConfig—also referred to as a CSI reporting setting for FSBM), $K_{report}\geq 1$ beam/report quantities each for a FSBM measurement subband or a FSBM reporting subband configured according to one or more examples described herein.

For example, when the FSBM or frequency selective/frequency subband specific/dependent beam management is enabled (according to one or more examples described herein), the association/mapping between the beam/report quantity(s) and the FSBM measurement/reporting subband(s) is fixed in the system specification(s)—e.g., the first reported beam/report quantity could correspond to the first FSBM measurement/reporting subband, the second reported beam/report quantity could correspond to the second FSBM measurement/reporting subband, and so on.

For another example, when the FSBM or frequency selective/frequency subband specific/dependent beam management is enabled (according to one or more examples described herein), the UE 116 could be indicated/configured/provided by the network 130, e.g., via higher layer RRC signaling/parameter and/or MAC CE command and/or dynamic DCI based signaling, the association/mapping between one or more of the beam/report quantity(s) and one or more of the FSBM measurement/reporting subband(s).

In another example, when the FSBM or frequency selective/frequency subband specific/dependent beam management is enabled (according to one or more examples described herein), the UE 116 could report, e.g., in a CSI report (provided/configured by a CSI reporting setting CSI-ReportConfig—also referred to as a CSI reporting setting for FSBM), $K_{report}\geq 1$ beam/report quantities each for an active FSBM measurement subband or an active FSBM reporting subband configured according to one or more examples described herein.

For example, when the FSBM or frequency selective/frequency subband specific/dependent beam management is enabled (according to one or more examples described herein), the association/mapping between the beam/report quantity(s) and the active FSBM measurement/reporting subband(s) is fixed in the system specification(s)—e.g., the first reported beam/report quantity could correspond to the first active FSBM measurement/reporting subband, the second reported beam/report quantity could correspond to the second active FSBM measurement/reporting subband, and so on.

For another example, when the FSBM or frequency selective/frequency subband specific/dependent beam management is enabled (according to one or more examples described herein), the UE 116 could be indicated/configured/provided by the network 130, e.g., via higher layer RRC signaling/parameter and/or MAC CE command and/or dynamic DCI based signaling, the association/mapping between one or more of the beam/report quantity(s) and one or more of the active FSBM measurement/reporting subband(s).

In yet another example, when the FSBM or frequency selective/frequency subband specific/dependent beam management is enabled (according to one or more examples described herein), the UE 116 could report, e.g., in a CSI report (configured/provided by a CSI reporting setting CSI-ReportConfig—also referred to as a CSI reporting setting for FSBM), $K_{report}\geq 1$ beam/report quantities each for a subset of the total configured $N_{meas}$ FSBM measurement subbands (the subset could comprise one or more FSBM measurement subbands) or a subset of the total configured $N_{report}$ FSBM reporting subbands (the subset could comprise one or more FSBM reporting subbands) configured according to one or more examples described herein. The UE 116 could be configured/indicated/provided by the network 130, e.g., via higher layer RRC signaling/parameter and/or MAC CE command and/or dynamic DCI based signaling, one or more subsets of the total configured $N_{meas}$ FSBM measurement subbands or how the ($N_{meas}$) FSBM measurement subbands are partitioned into one or more subsets of FSBM measurement subbands and/or one or more subsets of the total configured $N_{report}$ FSBM reporting subbands or how the ($N_{report}$) FSBM reporting subbands are partitioned into one or more subsets of FSBM reporting subbands.

For example, when the FSBM or frequency selective/frequency subband specific/dependent beam management is enabled (according to one or more examples described herein), the association/mapping between the beam/report quantity(s) and the subset(s) of FSBM measurement/reporting subband(s) is fixed in the system specification(s)—e.g., the first reported beam/report quantity could correspond to the first subset of FSBM measurement/reporting subband(s), the second reported beam/report quantity could correspond to the second subset of FSBM measurement/reporting subband(s), and so on.

For another example, when the FSBM or frequency selective/frequency subband specific/dependent beam management is enabled (according to one or more examples described herein), the UE 116 could be indicated/configured/provided by the network 130, e.g., via higher layer RRC signaling/parameter and/or MAC CE command and/or dynamic DCI based signaling, the association/mapping between one or more of the beam/report quantity(s) and one or more of the subset(s) of FSBM measurement/reporting subband(s).

In yet another example, when the FSBM or frequency selective/frequency subband specific/dependent beam management is enabled (according to one or more examples described herein), the UE 116 could report, e.g., in a CSI report (configured/provided by a CSI reporting setting CSI-ReportConfig—also referred to as a CSI reporting setting for FSBM), $K_{report}\geq 1$ beam/report quantities each for a subset of the total configured $M_{meas}$ active FSBM measurement subbands (the subset could comprise one or more active FSBM measurement subbands) or a subset of the total configured $M_{report}$ active FSBM reporting subbands (the subset could comprise one or more active FSBM reporting subbands) configured according to one or more examples described herein. The UE 116 could be configured/indicated/provided by the network 130, e.g., via higher layer RRC signaling/parameter and/or MAC CE command and/or dynamic DCI based signaling, one or more subsets of the total configured $M_{meas}$ active FSBM measurement subbands or how the ($M_{meas}$) active FSBM measurement subbands are partitioned into one or more subsets of active FSBM measurement subbands and/or one or more subsets of the total configured $M_{report}$ active FSBM reporting subbands or how the ($M_{report}$) active FSBM reporting subbands are partitioned into one or more subsets of active FSBM reporting subbands.

For example, when the FSBM or frequency selective/frequency subband specific/dependent beam management is enabled (according to one or more examples described herein), the association/mapping between the beam/report quantity(s) and the subset(s) of active FSBM measurement/reporting subband(s) is fixed in the system specification(s)—e.g., the first reported beam/report quantity could correspond to the first subset of active FSBM measurement/reporting subband(s), the second reported beam/report quantity could correspond to the second subset of active FSBM measurement/reporting subband(s), and so on.

For another example, when the FSBM or frequency selective/frequency subband specific/dependent beam management is enabled (according to one or more examples described herein), the UE 116 could be indicated/configured/provided by the network 130, e.g., via higher layer RRC signaling/parameter and/or MAC CE command and/or dynamic DCI based signaling, the association/mapping between one or more of the beam/report quantity(s) and one or more of the subset(s) of active FSBM measurement/reporting subband(s).

FIG. 11 illustrates an example of a flowchart of method 1100 for reporting quantities for a configured reporting subband or subset of reporting subbands according to embodiments of the present disclosure. For example, method 1100 may be performed in network 130 by the UE 116 in FIG. 1. The method 1100 is for illustration only and other embodiments can be used without departing from the scope of the present disclosure.

In another embodiment, when the FSBM or frequency selective/frequency subband specific/dependent beam management is enabled (according to one or more examples described herein), the UE 116 could be configured/indicated/provided by the network 130, e.g., via higher layer RRC signaling/parameter (e.g., in the higher layer parameter NZP-CSI-RS-Resource that configures a NZP CSI-RS resource, the higher layer parameter NZP-CSI-RS-ResourceSubSet that configures a CSI resource subset/group, the higher layer parameter NZP-CSI-RS-ResourceSet that configures a CSI resource set, the higher layer parameter CSI-ResourceConfig that configures a CSI resource setting, or the higher layer parameter CSI-ReportConfig that configures a CSI reporting setting).

The process begins in step 1101, the UE 116 is configured by the network 130 with one or more reporting subbands. The UE 116 then reports one or more beam/report quantities in step 1102.

In another embodiment, the UE 116 could be configured/indicated/provided by the network 130, e.g., via higher layer RRC signaling/parameter such as a MAC CE command and/or dynamic DCI based signaling, to report, e.g., in a CSI report, $K_{report}\geq 1$ beam/report quantities each for a FSBM measurement subband or a FSBM reporting subband following one or more examples described herein, or $K_{report}\geq 1$ beam/report quantities each for an active FSBM measurement subband or an active FSBM reporting subband following one or more examples described herein, or $K_{report}\geq 1$ beam/report quantities each for a subset of the total configured $M_{meas}$ FSBM measurement subbands (the subset could comprise one or more active FSBM measurement subbands) or a subset of the total configured $M_{report}$ FSBM reporting subbands (the subset could comprise one or more active FSBM reporting subbands) following one or more examples described herein, or $K_{report}\geq 1$ beam/report quantities each for a subset of the total configured $M_{meas}$ active FSBM measurement subbands (the subset could comprise one or more active FSBM measurement subbands) or a subset of the total configured $M_{report}$ active FSBM reporting subbands (the subset could comprise one or more active FSBM reporting subbands) following one or more examples described herein. The UE 116 could be indicated/provided/configured by the network 130, e.g., via higher layer RRC signaling/parameter (e.g., in the higher layer parameter NZP-CSI-RS-Resource that configures a NZP CSI-RS resource or the higher layer parameter NZP-CSI-RS-ResourceSubSet that configures a CSI resource subset/group or the higher layer parameter NZP-CSI-RS-ResourceSet that configures a CSI resource set or the higher layer parameter CSI-ResourceConfig that configures a CSI resource setting or the higher layer parameter CSI-ReportConfig that configures a CSI reporting setting) and/or MAC CE command and/or dynamic DCI based signaling, the value/number of $K_{report}$.

When the FSBM or frequency selective/frequency subband specific/dependent beam management is enabled (according to one or more examples described herein), a UE could be configured/indicated/provided by the network 130, e.g., via higher layer RRC signaling/parameter and/or MAC CE command and/or dynamic DCI based signaling, one or more (e.g., $N_{tx} \geq 1$) frequency subbands each comprising one or more PRBs for frequency-selective transmission(s) of one or more DL/UL control/data channels/signals for FSBM—referred to as $N_{tx}$ FSBM transmission subbands in the present disclosure. The one or more PRBs in each FSBM transmission subband could be continuous, e.g., continuously indexed in frequency, or non-continuous. The UE 116 could be configured/indicated/provided by the network 130, e.g., via higher layer RRC signaling/parameter and/or MAC CE command and/or dynamic DCI based signaling, the FSBM transmission subband size—in number of PRBs (or size of each of the FSBM transmission subbands in number of PRBs)—for one or more DL/UL control/data channels/signals. For instance: the UE 116 could be first indicated/configured/provided by the network 130, e.g., via higher layer RRC signaling/parameter and/or MAC CE command and/or dynamic DCI based signaling, a BWP (and therefore, the corresponding BWP size in number of PRBs and etc.) for FSBM; the UE 116 could be provided/configured/indicated by the network 130, e.g., via higher layer RRC signaling/parameter (e.g., in PDCCH-Config/PDSCH-Config or in a CSI resource setting provided by CSI-ResourceConfig or a CSI reporting setting provided by CSI-ReportConfig) and/or MAC CE command and/or dynamic DCI based signaling (e.g., in DCI format 1_1 or 1_2 with or without DL assignment), a parameter/field subbandsizeforFSBMtransmission—for one or more DL/UL control/data channels/signals—set to either 'value1' or 'value2'; if the parameter/field subbandsizeforFSBMtransmission is set to 'value1', the first value/number of subband size corresponding/associated to the BWP is used/determined as the FSBM transmission subband size for the one or more DL/UL control/data channels/signals; if the parameter/field subbandsizeforFSBMtransmission is set to 'value2', the second value/number of subband size corresponding/associated to the BWP is used/determined as the FSBM transmission subband size for the one or more DL/UL control/data channels/signals; the association/mapping between the potential/candidate subband size(s) and BWP(s)—e.g., for one or more DL/UL control/data channels/signals—could be fixed in the system specifications (e.g., in document and standard [4])—see TABLE 1 in the present disclosure, and known to both the network 130 and UE sides a prior. As can be seen from TABLE 1 in the present disclosure, each BWP could correspond to two candidate values/numbers of (FSBM) subband size. Alternatively, the UE 116 could be configured/indicated/provided by the network 130, e.g., via higher layer RRC signaling/parameter and/or MAC CE command and/or dynamic DCI based signaling, the potential/candidate subband size(s) for a BWP for the one or more DL/UL control/data channels/signals or the association/mapping between the potential/candidate subband size(s) and BWP(s) for the one or more DL/UL control/data channels/signals. Optionally, the potential/candidate subband size(s) could be a multiple (e.g., $m \geq 1$) of the subband size(s) shown/provided in TABLE 1: e.g., 4 m PRBs subband size and 8 m PRBs subband size for 24-72 PRBs BWP, 8 m PRBs subband size and 16 m PRBs subband size for 73-144 PRBs BWP, and 16 m PRBs subband size and 32 m PRBs subband size for 145-275 PRBs BWP. In the present disclosure, the UE 116 could be configured/provided/indicated by the network 130, e.g., via higher layer RRC signaling/parameter and/or MAC CE command and/or dynamic DCI based L1 signaling, the value/number of m.

The indicated/configured/provided FSBM transmission subband size could be for all DL/UL control/data channels/signals (e.g., PDCCH, PDSCH, PUCCH, and PUSCH). Optionally, the UE 116 could be indicated/configured/provided by the network 130, e.g., via higher layer RRC signaling/parameter and/or MAC CE command and/or dynamic DCI based signaling as discussed/described herein, a set of one or more subband sizes with each subband size corresponding/associated to a channel/signal (e.g., PDCCH, PDSCH, PUCCH or PUSCH) or a subset of one or more channels/signals (e.g., PDCCH and PDSCH).

In one example, when the FSBM or frequency selective/frequency subband specific/dependent beam management is enabled (according to one or more examples described herein), the association/mapping between the (set of) one or more subband sizes and the channels/signals are fixed in the system specifications. For example, the first subband size could be indicated/configured for PDCCH, the second subband size could be indicated/configured for PDSCH, the third subband size could be indicated/configured for PUCCH, and the fourth subband size could be indicated/configured for PUSCH. For another example, the first subband size could be indicated/configured for DL control/data channels/signals such as PDCCH and PDSCH, and the second subband size could be indicated/configured for UL control/data channels/signals such as PUCCH and PUSCH. Yet for another example, the first subband size could be indicated/configured for control channels/signals such as PDCCH and PUCCH, and the second subband size could be indicated/configured for data channels/signals such as PDSCH and PUSCH.

In another example, when the FSBM or frequency selective/frequency subband specific/dependent beam management is enabled (according to one or more examples described herein), the UE 116 could be indicated/configured/provided by the network 130, e.g., via higher layer RRC signaling/parameter and/or MAC CE command and/or dynamic DCI based signaling, the association/mapping between the (set of) one or more subband sizes and the channels/signals. For example, the subband size(s) for a channel/signal or a subset of one or more channels/signals could be indicated/configured/provided in the higher layer parameter(s)—e.g., PDCCH-Config, PDSCH-Config, ControlResourceSet, PUCCH-Config, PUSCH-Config, etc.—that configures the corresponding channel/signal or the corresponding subset of one or more channels/signals. For another example, the subband size(s) for a channel/signal or a subset of one or more channels/signals could be indicated in one or more DCIs (e.g., in DCI format 1_1 or 1_2); the indication could be via one or more new/dedicated DCI fields in the DCI format(s) or repurposing one or more bits/codepoints of one or more existing/reserved DCI fields in the DCI format(s). Furthermore, the DCI(s)/DCI format(s)—e.g., DCI format 1_1 or 1_2 with or without DL assignment—that indicates the subband size(s) for a channel/signal or a subset of one or more channels/signals could also provide/indicate one or more TCI states/TCI state IDs for the corresponding channel/signal or the corresponding subset of channels/signals; alternatively, the DCI(s)/DCI format(s)—e.g., DCI format 1_1 or 1_2—that indicates the subband size(s) for a channel/signal or a subset of one or more channels/signals could also provide/indicate resource assignment/allocation/scheduling for the corresponding channel/signal or the corresponding subset of channels/signals.

Furthermore, when the FSBM or frequency selective/frequency subband specific/dependent beam management is enabled (according to one or more examples described herein), the UE 116 could be indicated/configured/provided by the network 130, e.g., via higher layer RRC signaling/parameter (e.g., in PDCCH-Config, PDSCH-Config, CSI-ResourceConfig, CSI-ReportConfig, TCI-State, QCL-Info, DLorJointTCI-State or ULTCI-State) and/or MAC CE command and/or dynamic DCI based signaling (e.g., in DCI format 1_1 or 1_2 with or without DL assignment), a bitmap—for one or more DL/UL control/data channels/signals—with each bit position/entry in the bitmap corresponding/associated to a subband within the BWP. For instance, the UE 116 could be indicated by the network 130, e.g., in a DCI (e.g., DCI format 1_1 or 1_2), the bitmap; for this case, one or more new/dedicated DCI fields could be introduced in the corresponding DCI format(s) and/or one or more bits/codepoints of one or more existing/reserved DCI fields in the corresponding DCI format(s) could be repurposed to indicate the bitmap. If a bit position/entry of the bitmap is set to '1' (or '0'), the frequency subband corresponding/associated to the bit position/entry is used/determined as a FSBM transmission subband for the one or more DL/UL control/data channels/signals. For this case, the bitmap could contain/comprise $N_{fx}$ bit positions/entries set to '1's (or '0's) indicating/configuring a total of $N_{fx}$ FSBM transmission subbands for the one or more DL/UL control/data channels/signals. The bitmap, and therefore, the corresponding indicated/configured $N_{fx}$ FSBM transmission subbands, could be for all DL/UL control/data channels/signals such as PDCCH, PDSCH, PUCCH, and PUSCH. Optionally, the UE 116 could be indicated/configured/provided by the network 130, e.g., via higher layer RRC signaling/parameter and/or MAC CE command and/or dynamic DCI based signaling as discussed/described herein, a set of one or more such bitmaps with each bitmap corresponding/associated to a channel/signal (e.g., PDCCH, PDSCH, PUCCH or PUSCH) or a subset of one or more channels/signals (e.g., PDCCH and PDSCH).

In one example, when the FSBM or frequency selective/frequency subband specific/dependent beam management is enabled (according to one or more examples described herein), the association/mapping between the (set of) one or more bitmaps and the channels/signals are fixed in the system specifications. For example, the first bitmap could be indicated/configured for PDCCH, the second bitmap could be indicated/configured for PDSCH, the third bitmap could be indicated/configured for PUCCH, and the fourth bitmap could be indicated/configured for PUSCH. For another example, the first bitmap could be indicated/configured for DL control/data channels/signals such as PDCCH and PDSCH, and the second bitmap could be indicated/configured for UL control/data channels/signals such as PUCCH and PUSCH. Yet for another example, the first bitmap could be indicated/configured for control channels/signals such as PDCCH and PUCCH, and the second bitmap could be indicated/configured for data channels/signals such as PDSCH and PUSCH.

In another example, when the FSBM or frequency selective/frequency subband specific/dependent beam management is enabled (according to one or more examples described herein), the UE 116 could be indicated/configured/provided by the network 130, e.g., via higher layer RRC signaling/parameter and/or MAC CE command and/or dynamic DCI based signaling, the association/mapping between the (set of) one or more bitmaps and the channels/signals. For example, the bitmap(s) for a channel/signal or a subset of one or more channels/signals could be indicated/configured/provided in the higher layer parameter(s)—e.g., PDCCH-Config, PDSCH-Config, ControlResourceSet, PUCCH-Config, PUSCH-Config, etc.—that configures the corresponding channel/signal or the corresponding subset of one or more channels/signals. For another example, the bitmap(s) for a channel/signal or a subset of one or more channels/signals could be indicated in one or more DCIs (e.g., in DCI format 1_1 or 1_2); the indication could be via one or more new/dedicated DCI fields in the DCI format(s) or repurposing one or more bits/codepoints of one or more existing/reserved DCI fields in the DCI format(s). Furthermore, the DCI(s)/DCI format(s)—e.g., DCI format 1_1 or 1_2 with or without DL assignment—that indicates the bitmap(s) for a channel/signal or a subset of one or more channels/signals could also provide/indicate one or more TCI states/TCI state IDs for the corresponding channel/signal or the corresponding subset of channels/signals; alternatively, the DCI(s)/DCI format(s)—e.g., DCI format 1_1 or 1_2—that indicates the bitmap(s) for a channel/signal or a subset of one or more channels/signals could also provide/indicate resource assignment/allocation/scheduling for the corresponding channel/signal or the corresponding subset of channels/signals.

In the present disclosure, when the FSBM or frequency selective/frequency subband specific/dependent beam management is enabled (according to one or more examples described herein), a UE could be indicated by the network 130, e.g., via MAC CE and/or DCI (e.g., DCI format 1_1 or 1_2 with or without DL assignment), one or more TCI states/TCI state IDs for frequency-selective transmission(s) for FSBM, wherein each TCI state could comprise/indicate/contain one or more QCL source RSs with the same or different QCL types—e.g., QCL-TypeD; each TCI state and/or each QCL source RS indicated in/by a TCI state could correspond to one or more FSBM transmission subbands. For DCI based TCI state/beam indication, the one or more TCI states/TCI state IDs could be indicated via one or more TCI codepoints in one or more TCI fields of the corresponding DCI format. Furthermore, a TCI state could correspond to a joint DL and UL TCI state provided by the higher layer parameter DLorJointTCI-State, a separate DL TCI state provided by the higher layer parameter DLorJointTCI-State, a separate UL TCI state provided by the higher layer parameter ULTCI-State or a Rel-15/16 TCI state provided by TCI-State. In the present disclosure, a TCI state could be indicated for UE-dedicated reception on PDSCH/PDCCH or dynamic-grant/configured-grant based PUSCH and all dedicated PUCCH resources.

In one example, when the FSBM or frequency selective/frequency subband specific/dependent beam management is enabled (according to one or more examples described herein), the UE 116 could be indicated by the network 130, e.g., via MAC CE and/or DCI (e.g., DCI format 1_1 or 1_2 with or without DL assignment), one or more TCI states/TCI state IDs each indicating/comprising/containing one or more QCL source RSs with the same or different QCL types— e.g., QCL-TypeD. Each of the indicated TCI states (and therefore, the QCL source RS(s) indicated therein) could be configured/associated with one or more (e.g., $1 \leq M_{tx} \leq N_{tx}$) of the total configured $N_{tx} \geq 1$ FSBM transmission subbands. Specifically, the UE 116 could receive, in a TCI state, one or more (e.g., $L \geq 1$) QCL source RSs (e.g., SSB resource indexes or NZP CSI-RS resource configuration indexes) with the same or different QCL types—e.g., QCL-TypeD, each configured/associated with a FSBM transmission subband. In particular, for the one or more (e.g., $L \geq 1$) QCL source RSs indicated in a TCI state for frequency-selective transmission(s) for FSBM.

For example, when the FSBM or frequency selective/ frequency subband specific/dependent beam management is enabled (according to one or more examples described herein), the TCI state could be indicated for all of the configured $N_{tx}$ FSBM transmission subbands. For this case, $M_{tx} = N_{tx}$. The UE 116 could also be indicated/configured/ provided by the network 130, e.g., via higher layer RRC signaling and/or MAC CE command and/or dynamic DCI based signaling, that $M_{tx} = N_{tx}$. In one example, the association/mapping between the one or more (e.g., $L \geq 1$) QCL source RSs indicated in the TCI state and the $N_{tx}$ FSBM transmission subbands is fixed in the system specifications—e.g., the first QCL source RS indicated in the TCI state could be for the first FSBM transmission subband, the second QCL source RS indicated in the TCI state could be for the second FSBM transmission subband, and so on, and the L-th QCL source RS indicated in the TCI state could be for the $N_{tx}$-th FSBM transmission subband; for this case, $L = N_{tx}$ or $L = M_{tx}$. Alternatively, the UE 116 could be indicated/configured/provided by the network 130, e.g., via higher layer RRC signaling/parameter and/or MAC CE command and/or dynamic DCI based signaling, the association/mapping between the one or more (e.g., $L \geq 1$) QCL source RSs indicated in the TCI state and the $N_{tx}$ FSBM transmission subbands.

For another example, when the FSBM or frequency selective/frequency subband specific/dependent beam management is enabled (according to one or more examples described herein), the UE 116 could be configured/indicated/provided by the network 130, e.g., via higher layer RRC signaling/parameter and/or MAC CE command and/or dynamic DCI based signaling, a bitmap of length $N_{tx}$ for the indicated TCI state (comprising the one or more—e.g., $L \geq 1$—QCL source RSs) with each bit position/entry of the bitmap corresponding/associated to a FSBM transmission subband. For instance, the UE 116 could receive from the network 130, e.g., in the higher layer parameter(s) TCI-State, DLorJointTCI-State, ULTCI-State or QCL-Info, that configures the TCI state or in a DCI (e.g., DCI format 1_1 or 1_2), the bitmap. In particular, one or more new/dedicated DCI fields could be introduced in the corresponding DCI format(s) and/or one or more bits/codepoints of one or more existing/reserved DCI fields in the corresponding DCI format(s) could be repurposed to indicate the bitmap. Furthermore, the DCI(s) that indicates the bitmap could also indicate the corresponding TCI state. If a bit position/entry of the bitmap is set to '1' (or '0'), the FSBM transmission subband corresponding/associated with the bit position/entry could be active for the corresponding TCI state. For this example, the bitmap could contain/comprise $1 \leq M_{tx} \leq N_{tx}$ bit positions/ entries set to '1's (or '0's) indicating that a total of $M_{tx}$ FSBM transmission subbands—out of the total $N_{tx}$ configured FSBM transmission subbands—could be active for the corresponding TCI state. In one example, the association/ mapping between the one or more (e.g., $L \geq 1$) QCL source RSs indicated in the TCI state and the $M_{tx}$ FSBM transmission subbands is fixed in the system specifications—e.g., the first QCL source RS indicated in the TCI state could be for the first FSBM transmission subband, the second QCL source RS indicated in the TCI state could be for the second FSBM transmission subband, and so on, and the L-th QCL source RS indicated in the TCI state could be for the $M_{tx}$-th FSBM transmission subband; for this case, $L = M_{tx}$. Alternatively, the UE 116 could be indicated/configured/provided by the network 130, e.g., via higher layer RRC signaling/ parameter and/or MAC CE command and/or dynamic DCI based signaling, the association/mapping between the one or more (e.g., $L \geq 1$) QCL source RSs indicated in the TCI state and the $M_{tx}$ FSBM transmission subbands active for the corresponding TCI state.

Yet for another example, when the FSBM or frequency selective/frequency subband specific/dependent beam management is enabled (according to one or more examples described herein), the UE 116 could be configured/indicated/provided by the network 130, e.g., via higher layer RRC signaling/parameter and/or MAC CE command and/or dynamic DCI based signaling, a set of $1 \leq M_{tx} \leq N_{tx}$ (subband) indexes for the indicated TCI state (comprising the one or more—e.g., $L \geq 1$—QCL source RSs) with each (subband) index corresponding/pointing to a FSBM transmission subband—e.g., the (subband) indexes 1, 2, . . . , $M_{tx}$ could correspond/point to the first FSBM transmission subband, the second FSBM transmission subband, . . . , the $M_{tx}$-th FSBM transmission subband, respectively, among all the configured $N_{tx}$ FSBM transmission subbands. For instance, the UE 116 could receive from the network 130, e.g., in the higher layer parameter(s) TCI-State, DLorJointTCI-State, ULTCI-State or QCL-Info, that configures the TCI state or in a DCI (e.g., DCI format 1_1 or 1_2), the set of (subband) indexes. In particular, one or more new/dedicated DCI fields could be introduced in the corresponding DCI format(s) and/or one or more bits/codepoints of one or more existing/ reserved DCI fields in the corresponding DCI format(s) could be repurposed to indicate the set of (subband) indexes. Furthermore, the DCI(s) that indicates the set of (subband) indexes could also indicate the corresponding TCI state. For this case, the $M_{tx}$ FSBM transmission subband(s) corresponding/associated to the indicated/provided/configured (subband) index(es) could be active for the corresponding TCI state. In one example, the association/mapping between the one or more (e.g., $L \geq 1$) QCL source RSs indicated in the TCI state and the $M_{tx}$ FSBM transmission subbands is fixed in the system specifications—e.g., the first QCL source RS indicated in the TCI state could be for the first FSBM transmission subband, the second QCL source RS indicated in the TCI state could be for the second FSBM transmission subband, and so on, and the L-th QCL source RS indicated in the TCI state could be for the $M_{tx}$-th FSBM transmission subband; for this case, $L = M_{tx}$. Alternatively, the UE 116 could be indicated/configured/provided by the network 130, e.g., via higher layer RRC signaling/parameter and/or MAC CE command and/or dynamic DCI based signaling, the association/mapping between the one or more (e.g., $L \geq 1$) QCL source RSs indicated in the TCI state and the $M_{tx}$ FSBM transmission subbands active for the corresponding TCI state.

In another example, when the FSBM or frequency selective/frequency subband specific/dependent beam management is enabled (according to one or more examples described herein), the UE 116 could be indicated by the network 130, e.g., via MAC CE and/or DCI (e.g., DCI format 1_1 or 1_2 with or without DL assignment), one or more (e.g., Q≥1) TCI states/TCI state IDs each indicating/comprising/containing one or more QCL source RSs with the same or different QCL types—e.g., QCL-TypeD. Each of the indicated TCI states (and therefore, the QCL source RS(s) indicated therein) could be configured/associated with a FSBM transmission subband. In particular, for the one or more (e.g., Q≥1) TCI states for frequency-selective transmission(s) for FSBM, the mapping/association between the TCI state(s) and the frequency subband(s) could be determined or identified according to one or more of the followings.

For example, when the FSBM or frequency selective/frequency subband specific/dependent beam management is enabled (according to one or more examples described herein), the first TCI state (e.g., indicated in a DCI—DCI format 1_1 or 1_2 with or without DL assignment) could be indicated for the first configured FSBM transmission subband, the second TCI state (e.g., indicated in the DCI—DCI format 1_1 or 1_2 with or without DL assignment) could be indicated for the second configured FSBM transmission subband, and so on, and the Q-th TCI state (e.g., indicated in the DCI—DCI format 1_1 or 1_2 with or without DL assignment) could be indicated for the $N_{fx}$-th configured FSBM transmission subband. For this case, $Q=N_{fx}$.

For another example, when the FSBM or frequency selective/frequency subband specific/dependent beam management is enabled (according to one or more examples described herein), the UE 116 could be configured/indicated/provided by the network 130, e.g., via higher layer RRC signaling/parameter and/or MAC CE command and/or dynamic DCI based signaling, a bitmap of length $N_{fx}$ for the one or more (e.g., Q≥1) TCI states (and therefore, the corresponding QCL source RSs indicated therein) indicated in a MAC CE/DCI with each bit position/entry of the bitmap corresponding/associated to a FSBM transmission subband. For instance, the UE 116 could receive from the network 130, e.g., in the higher layer parameter(s) TCI-State, DLorJointTCI-State, ULTCI-State or QCL-Info, that configures a TCI state or in a DCI (e.g., DCI format 1_1 or 1_2), the bitmap. In particular, one or more new/dedicated DCI fields could be introduced in the corresponding DCI format(s) and/or one or more bits/codepoints of one or more existing/reserved DCI fields in the corresponding DCI format(s) could be repurposed to indicate the bitmap. Furthermore, the DCI(s) that indicates the bitmap could also indicate the corresponding one or more (e.g., Q≥1) TCI states. If a bit position/entry of the bitmap is set to '1' (or '0'), the FSBM transmission subband corresponding/associated to the bit position/entry is active for one of the one or more (e.g., Q≥1) indicated TCI states. For this example, the bitmap could contain/comprise $1≤M_{fx}≤N_{fx}$ bit positions/entries set to '1's (or '0's) indicating that a total of $M_{fx}$ FSBM transmission subbands—out of the total $N_{fx}$ configured FSBM transmission subbands—could be active for the one or more (e.g., Q≥1) indicated TCI states—e.g., the first bit position/entry in the bitmap set to '1' (or '0')—and therefore, the corresponding FSBM transmission subband—could be for the first TCI state (e.g., indicated in a DCI—DCI format 1_1 or 1_2 with or without DL assignment), the second bit position/entry in the bitmap set to '1' (or '0')—and therefore, the corresponding FSBM transmission subband—could be for the second TCI state (e.g., indicated in the DCI—DCI format 1_1 or 1_2 with or without DL assignment), and so on, and the $M_{fx}$-th bit position/entry set to '1' (or '0')—and therefore, the corresponding FSBM transmission subband—could be for the Q-th TCI state (e.g., indicated in the DCI—DCI format 1_1 or 1_2 with or without DL assignment). For this case, $M_{fx}=Q$. Alternatively, the higher layer parameter(s) TCI-State, DLorJointTCI-State, ULTCI-State, or QCL-Info, that configures a TCI state could contain/comprise/provide a bitmap of length $N_{fx}$ for the corresponding TCI state with each bit position/entry of the bitmap corresponding/associated to a FSBM transmission subband. For instance, if a bit position/entry of the bitmap is set to '1' (or '0'), the FSBM transmission subband corresponding/associated with the bit position/entry could be active for the corresponding TCI state.

Yet for another example, when the FSBM or frequency selective/frequency subband specific/dependent beam management is enabled (according to one or more examples described herein), the UE 116 could be configured/indicated/provided by the network 130, e.g., via higher layer RRC signaling/parameter and/or MAC CE command and/or dynamic DCI based signaling, a set of $1≤M_{fx}≤N_{fx}$ (subband) indexes for the one or more (e.g., Q≥1) TCI states (and therefore, the corresponding QCL source RSs indicated therein) indicated in a MAC CE/DCI with each (subband) index corresponding/pointing to a FSBM transmission subband—e.g., the (subband) indexes 1, 2, . . . , $M_{fx}$ could correspond/point to the first FSBM transmission subband, the second FSBM transmission subband, . . . , the $M_{fx}$-th FSBM transmission subband, respectively, among all the configured $N_{fx}$ FSBM transmission subbands. For instance, the UE 116 could receive from the network 130, e.g., in the higher layer parameter(s) TCI-State, DLorJointTCI-State, ULTCI-State or QCL-Info, that configures a TCI state or in a DCI (e.g., DCI format 1_1 or 1_2), the set of (subband) indexes. In particular, one or more new/dedicated DCI fields could be introduced in the corresponding DCI format(s) and/or one or more bits/codepoints of one or more existing/reserved DCI fields in the corresponding DCI format(s) could be repurposed to indicate the set of (subband) indexes. Furthermore, the DCI(s) that indicates the set of (subband) indexes could also indicate the corresponding one or more (e.g., Q≥1) TCI states. For this case, each of the $M_{fx}$ FSBM transmission subband(s) corresponding/associated to the indicated/provided/configured (subband) index(es) could be active for one of the one or more (e.g., Q≥1) indicated TCI states—e.g., the first (subband) index in the set—and therefore, the corresponding FSBM transmission subband—could be for the first TCI state (e.g., indicated in a DCI—DCI format 1_1 or 1_2 with or without DL assignment), the second (subband) index in the set—and therefore, the corresponding FSBM transmission subband—could be for the second TCI state (e.g., indicated in the DCI—DCI format 1_1 or 1_2 with or without DL assignment), and so on, and the $M_{fx}$-th (subband) index in the set—and therefore, the corresponding FSBM transmission subband—could be for the Q-th TCI state (e.g., indicated in the DCI—DCI format 1_1 or 1_2 with or without DL assignment). For this case, $M_{fx}=Q$. Alternatively, the higher layer parameter(s) TCI-State, DLorJointTCI-State, ULTCI-State or QCL-Info, that configures a TCI state could contain/comprise/provide a (subband) index for the corresponding TCI state. For instance, the FSBM transmission subband corresponding/associated with the (subband) index could be active for the corresponding TCI state.

The bitmap configured/indicated according to one or more examples described herein, and therefore, the corresponding indicated/configured $M_{tx}$ FSBM transmission subbands, could be for all DL/UL control/data channels/signals such as PDCCH, PDSCH, PUCCH, and PUSCH. Optionally, the UE 116 could be indicated/configured/provided by the network 130, e.g., via higher layer RRC signaling/parameter and/or MAC CE command and/or dynamic DCI based signaling as discussed/described herein, a set of one or more bitmaps with each bitmap configured/indicated according to one or more examples described herein and corresponding/associated to a channel/signal (e.g., PDCCH, PDSCH, PUCCH or PUSCH) or a subset of one or more channels/signals (e.g., PDCCH and PDSCH).

In one example, when the FSBM or frequency selective/frequency subband specific/dependent beam management is enabled (according to one or more examples described herein), the association/mapping between the (set of) one or more bitmaps and the channels/signals are fixed in the system specifications. For example, the first bitmap could be indicated/configured for PDCCH, the second bitmap could be indicated/configured for PDSCH, the third bitmap could be indicated/configured for PUCCH, and the fourth bitmap could be indicated/configured for PUSCH. For another example, the first bitmap could be indicated/configured for DL control/data channels/signals such as PDCCH and PDSCH, and the second bitmap could be indicated/configured for UL control/data channels/signals such as PUCCH and PUSCH. Yet for another example, the first bitmap could be indicated/configured for control channels/signals such as PDCCH and PUCCH, and the second bitmap could be indicated/configured for data channels/signals such as PDSCH and PUSCH.

In another example, when the FSBM or frequency selective/frequency subband specific/dependent beam management is enabled (according to one or more examples described herein), the UE 116 could be indicated/configured/provided by the network 130, e.g., via higher layer RRC signaling/parameter and/or MAC CE command and/or dynamic DCI based signaling, the association/mapping between the (set of) one or more bitmaps and the channels/signals. For example, the bitmap(s) for a channel/signal or a subset of one or more channels/signals could be indicated/configured/provided in the higher layer parameter(s)—e.g., PDCCH-Config, PDSCH-Config, ControlResourceSet, PUCCH-Config, PUSCH-Config, etc.—that configures the corresponding channel/signal or the corresponding subset of one or more channels/signals. For another example, the bitmap(s) for a channel/signal or a subset of one or more channels/signals could be indicated in one or more DCIs (e.g., in DCI format 1_1 or 1_2); the indication could be via one or more new/dedicated DCI fields in the DCI format(s) or repurposing one or more bits/codepoints of one or more existing/reserved DCI fields in the DCI format(s). Furthermore, the DCI(s)/DCI format(s)—e.g., DCI format 1_1 or 1_2 with or without DL assignment—that indicates the bitmap(s) for a channel/signal or a subset of one or more channels/signals could also provide/indicate one or more TCI states/TCI state IDs for the corresponding channel/signal or the corresponding subset of channels/signals; alternatively, the DCI(s)/DCI format(s)—e.g., DCI format 1_1 or 1_2—that indicates the bitmap(s) for a channel/signal or a subset of one or more channels/signals could also provide/indicate resource assignment/allocation/scheduling for the corresponding channel/signal or the corresponding subset of channels/signals.

The set of (subband) indexes configured/indicated according to one or more examples described herein, and therefore, the corresponding indicated/configured $M_{tx}$ FSBM transmission subbands, could be for all DL/UL control/data channels/signals such as PDCCH, PDSCH, PUCCH, and PUSCH. Optionally, the UE 116 could be indicated/configured/provided by the network 130, e.g., via higher layer RRC signaling/parameter and/or MAC CE command and/or dynamic DCI based signaling as discussed/described herein, a list/pool of one or more sets of (subband) indexes with each set configured/indicated according to one or more examples described herein and corresponding/associated to a channel/signal (e.g., PDCCH, PDSCH, PUCCH or PUSCH) or a subset of one or more channels/signals (e.g., PDCCH and PDSCH).

In one example, when the FSBM or frequency selective/frequency subband specific/dependent beam management is enabled (according to one or more examples described herein), the association/mapping between the (list/pool of) one or more sets of (subband) indexes and the channels/signals are fixed in the system specifications. For example, the first set of (subband) indexes could be indicated/configured for PDCCH, the second set of (subband) indexes could be indicated/configured for PDSCH, the third set of (subband) indexes could be indicated/configured for PUCCH, and the fourth set of (subband) indexes could be indicated/configured for PUSCH. For another example, the first set of (subband) indexes could be indicated/configured for DL control/data channels/signals such as PDCCH and PDSCH, and the second set of (subband) indexes could be indicated/configured for UL control/data channels/signals such as PUCCH and PUSCH. Yet for another example, the first set of (subband) indexes could be indicated/configured for control channels/signals such as PDCCH and PUCCH, and the second set of (subband) indexes could be indicated/configured for data channels/signals such as PDSCH and PUSCH.

In another example, when the FSBM or frequency selective/frequency subband specific/dependent beam management is enabled (according to one or more examples described herein), the UE 116 could be indicated/configured/provided by the network 130, e.g., via higher layer RRC signaling/parameter and/or MAC CE command and/or dynamic DCI based signaling, the association/mapping between the (list/pool of) one or more sets of (subband) indexes and the channels/signals. For example, the set(s) of (subband) indexes for a channel/signal or a subset of one or more channels/signals could be indicated/configured/provided in the higher layer parameter(s)—e.g., PDCCH-Config, PDSCH-Config, ControlResourceSet, PUCCH-Config, PUSCH-Config, etc.—that configures the corresponding channel/signal or the corresponding subset of one or more channels/signals. For another example, the set(s) of (subband) indexes for a channel/signal or a subset of one or more channels/signals could be indicated in one or more DCIs (e.g., in DCI format 1_1 or 1_2); the indication could be via one or more new/dedicated DCI fields in the DCI format(s) or repurposing one or more bits/codepoints of one or more existing/reserved DCI fields in the DCI format(s). Furthermore, the DCI(s)/DCI format(s)—e.g., DCI format 1_1 or 1_2 with or without DL assignment—that indicates the set(s) of (subband) indexes for a channel/signal or a subset of one or more channels/signals could also provide/indicate one or more TCI states/TCI state IDs for the corresponding channel/signal or the corresponding subset of channels/signals; alternatively, the DCI(s)/DCI format(s)—e.g., DCI format 1_1 or 1_2—that indicates the set(s) of (subband) indexes for a channel/signal or a subset of one or more channels/signals could also provide/indicate resource assignment/allocation/scheduling for the corresponding channel/signal or the corresponding subset of channels/signals.

When the FSBM or frequency selective/frequency subband specific/dependent beam management is enabled (according to one or more examples described herein), the FSBM transmission subband(s) and the FSBM measurement/reporting subband(s) could be the same or different (i.e., $N_{tx}=N_{meas}$ (or $N_{report}$), $N_{tx} \geq N_{meas}$ (or $N_{report}$) or $N_{tx} \leq N_{meas}$ (or $N_{report}$)).

For example, when the FSBM or frequency selective/frequency subband specific/dependent beam management is enabled (according to one or more examples described herein), the UE 116 could be configured/indicated/provided by the network 130, e.g., via higher layer RRC signaling/parameter and/or MAC CE command and/or dynamic DCI based signaling, the same frequency subband(s) for frequency-selective transmission(s) and frequency-selective beam measurement/reporting (i.e., $N_{tx}=N_{meas}$ (or $N_{report}$)). For this case, the UE 116 could only be configured/indicated/provided by the network 130, e.g., via higher layer RRC signaling/parameter and/or MAC CE command and/or dynamic DCI based signaling, the FSBM transmission subband(s) or the FSBM measurement subband(s) or the FSBM reporting subband(s) according to one or more examples described herein. The UE 116 could be further indicated by the network 130 that the FSBM transmission subband(s) is the same as the FSBM measurement/reporting subband(s) or vice versa; this indication could be via higher layer RRC signaling/parameter and/or MAC CE command and/or dynamic DCI based signaling.

For another example, when the FSBM or frequency selective/frequency subband specific/dependent beam management is enabled (according to one or more examples described herein), the FSBM transmission subband(s) could be a subset of the FSBM measurement/reporting subband(s), or vice versa.

In one example, when the FSBM or frequency selective/frequency subband specific/dependent beam management is enabled (according to one or more examples described herein), the association/mapping between the FSBM transmission subband(s) and the FSBM measurement/reporting subband(s) could be fixed in the system specification(s)—e.g., the first FSBM transmission subband could correspond to the first FSBM measurement/reporting subband, the second FSBM transmission subband could correspond to the second FSBM measurement/reporting subband, and so on.

In another example, when the FSBM or frequency selective/frequency subband specific/dependent beam management is enabled (according to one or more examples described herein), the UE 116 could be indicated/configured/provided by the network 130, e.g., via higher layer RRC signaling/parameter and/or MAC CE command and/or dynamic DCI based signaling, the association/mapping between one or more of the FSBM transmission subband(s) and one or more of the FSBM measurement/reporting subband(s).

Furthermore, when the FSBM or frequency selective/frequency subband specific/dependent beam management is enabled (according to one or more examples described herein), the FSBM transmission subband(s) that is active for one or more TCI states (and therefore, the corresponding QCL source RS(s) indicated therein) indicated in a MAC CE/DCI—referred to as active FSBM transmission subband(s) in the present disclosure (configured according to one or more examples described herein), the FSBM measurement subband(s) that is active/used for frequency-selective beam measurement/reporting for one or more CSI-RS resources—referred to as active FSBM measurement subband(s) in the present disclosure (configured according to one or more examples described herein) and the FSBM reporting subband(s) that is active/used for frequency-selective beam measurement/reporting for one or more CSI-RS resources—referred to as active FSBM reporting subband(s) in the present disclosure (configured according to one or more examples described herein) could be the same or different (i.e., $M_{tx}=M_{meas}$ (or $M_{report}$), $M_{tx} \leq M_{meas}$ (or $M_{report}$) or $M_{tx} \leq M_{meas}$ (or $M_{report}$)).

For example, when the FSBM or frequency selective/frequency subband specific/dependent beam management is enabled (according to one or more examples described herein), the UE 116 could be configured/indicated/provided by the network 130, e.g., via higher layer RRC signaling/parameter and/or MAC CE command and/or dynamic DCI based signaling, the same frequency subband(s) for both active FSBM transmission subband(s) and active FSBM measurement/reporting subband(s) (i.e., $M_{tx}=M_{meas}$ (or $M_{report}$)). For this case, the UE 116 could only be configured/indicated/provided by the network 130, e.g., via higher layer RRC signaling/parameter and/or MAC CE command and/or dynamic DCI based signaling, the active FSBM transmission subband(s)—following one or more examples described herein, the active FSBM measurement subband(s)—following one or more examples described herein, or the active FSBM reporting subband(s)—following one or more examples described herein. The UE 116 could be further indicated by the network 130 that the active FSBM transmission subband(s) is the same as the active FSBM measurement/reporting subband(s) or vice versa; this indication could be via higher layer RRC signaling/parameter and/or MAC CE command and/or dynamic DCI based signaling.

For another example, when the FSBM or frequency selective/frequency subband specific/dependent beam management is enabled (according to one or more examples described herein), the active FSBM transmission subband(s) could be a subset of the active FSBM measurement/reporting subband(s), or vice versa.

In one example, when the FSBM or frequency selective/frequency subband specific/dependent beam management is enabled (according to one or more examples described herein), the association/mapping between the active FSBM transmission subband(s) and the active FSBM measurement/reporting subband(s) could be fixed in the system specification(s)—e.g., the first active FSBM transmission subband could correspond to the first active FSBM measurement/reporting subband, the second active FSBM transmission subband could correspond to the second active FSBM measurement/reporting subband, and so on.

In another example, when the FSBM or frequency selective/frequency subband specific/dependent beam management is enabled (according to one or more examples described herein), the UE 116 could be indicated/configured/provided by the network 130, e.g., via higher layer RRC signaling/parameter and/or MAC CE command and/or dynamic DCI based signaling, the association/mapping between one or more of the active FSBM transmission subband(s) and one or more of the active FSBM measurement/reporting subband(s).

Furthermore, when the FSBM or frequency selective/frequency subband specific/dependent beam management is enabled (according to one or more examples described herein), the (active) FSBM transmission subband(s) and the subband(s) for frequency domain resource assignment/allocation indicated in/by the frequency domain resource assignment (FD-RA) field in a DCI (e.g., DCI formats 0_0, 0_1, 1_0, 1_1 or 1_2) could be the same as different.

For example, when the FSBM or frequency selective/frequency subband specific/dependent beam management is enabled (according to one or more examples described herein), the UE 116 could be configured/indicated/provided by the network 130, e.g., via higher layer RRC signaling/parameter and/or MAC CE command and/or dynamic DCI based signaling, that the (active) FSBM transmission subband(s) is identical to the subband(s) indicated by/in the FD-RA field in a DCI.

For another example, when the FSBM or frequency selective/frequency subband specific/dependent beam management is enabled (according to one or more examples described herein), the (active) FSBM transmission subband(s) could be a subset of the subband(s) indicated by/in the FD-RA field in a DCI, or vice versa.

In one example, when the FSBM or frequency selective/frequency subband specific/dependent beam management is enabled (according to one or more examples described herein), the association/mapping between the FSBM transmission subband(s) and the subband(s) indicated by/in the FD-RA field in a DCI could be fixed in the system specification(s)—e.g., the first FSBM transmission subband could correspond to the first subband indicated by/in the FD-RA field in a DCI, the second FSBM transmission subband could correspond to the second subband indicated by/in the FD-RA field in the DCI, and so on.

In another example, when the FSBM or frequency selective/frequency subband specific/dependent beam management is enabled (according to one or more examples described herein), the UE 116 could be indicated/configured/provided by the network 130, e.g., via higher layer RRC signaling/parameter and/or MAC CE command and/or dynamic DCI based signaling, the association/mapping between one or more of the FSBM transmission subband(s) and one or more of the subband(s) indicated by/in the FD-RA field in a DCI.

When the FSBM or frequency selective/frequency subband specific/dependent beam management is enabled (according to one or more examples described herein), the association/mapping relationship between the following (i) and (ii) could follow or be determined/configured according to one or more examples described herein: (i) active FSBM measurement subband(s) and (ii) FSBM reporting subband(s); (i) active FSBM measurement subband(s) and (ii) FSBM transmission subband(s); (i) FSBM measurement subband(s) and (ii) subband(s) indicated by/in the FD-RA field in a DCI; (i) active FSBM measurement subband(s) and (ii) subband(s) indicated by/in the FD-RA field in a DCI; (i) active FSBM reporting subband(s) and (ii) FSBM measurement subband(s); (i) active FSBM reporting subband(s) and (ii) FSBM transmission subband(s); (i) FSBM reporting subband(s) and (ii) subband(s) indicated by/in the FD-RA field in a DCI; (i) active FSBM reporting subband(s) and (ii) subband(s) indicated by/in the FD-RA field in a DCI; (i) active FSBM transmission subband(s) and (ii) FSBM measurement subband(s); (i) active FSBM transmission subband(s) and (ii) FSBM reporting subband(s).

As discussed herein, when the FSBM or frequency selective/frequency subband specific/dependent beam management is enabled (according to one or more examples described herein), the UE 116 could be configured/indicated/provided by the network 130, e.g., via higher layer RRC signaling/parameter and/or MAC CE command and/or dynamic DCI based signaling, the FSBM measurement subband size—in number of PRBs (or size of each of the FSBM measurement subbands in number of PRBs), the FSBM reporting subband size—in number of PRBs (or size of each of the FSBM reporting subbands in number of PRBs), and/or the FSBM transmission subband size—in number of PRBs (or size of each of the FSBM transmission subbands in number of PRBs)—for one or more DL/UL control/data channels/signals.

In one example for the FSBM measurement size, the FSBM measurement subband size could be the same as the FSBM reporting subband size, the FSBM transmission subband size, or the subband size indicated in/by the frequency domain resource assignment (FD-RA) field in a DCI (e.g., DCI formats 0_0, 0_1, 1_0, 1_1 or 1_2).

In another example, the FSBM measurement subband size is related to the FSBM reporting subband size or the FSBM transmission subband size or the subband size indicated in/by the frequency domain resource assignment (FD-RA) field in a DCI (e.g., DCI formats 0_0, 0_1, 1_0, 1_1 or 1_2) by a fixed (mapping/association) relationship. For instance, the FSBM measurement subband size is a multiple (e.g., a multiple/scaling factor k) of the FSBM reporting subband size, the FSBM transmission subband size, or the subband size indicated in/by the frequency domain resource assignment (FD-RA) field in a DCI (e.g., DCI formats 0_0, 0_1, 1_0, 1_1 or 1_2). The multiple/scaling factor k could be fixed in the system specifications and/or indicated/configured/provided to the UE 116 via higher layer RRC signaling/parameter and/or MAC CE command and/or dynamic DCI based signaling.

In yet another example, the FSBM measurement subband size is independently/separately configured/indicated relative to the FSBM reporting subband size or the FSBM transmission subband size or the subband size indicated in/by the frequency domain resource assignment (FD-RA) field in a DCI (e.g., DCI formats 0_0, 0_1, 1_0, 1_1 or 1_2).

In one example for the FSBM reporting subband size, the FSBM reporting subband size could be the same as the FSBM measurement subband size or the FSBM transmission subband size or the subband size indicated in/by the frequency domain resource assignment (FD-RA) field in a DCI (e.g., DCI formats 0_0, 0_1, 10, 1_1 or 1_2).

In another example, the FSBM reporting subband size is related to the FSBM measurement subband size or the FSBM transmission subband size or the subband size indicated in/by the frequency domain resource assignment (FD-RA) field in a DCI (e.g., DCI formats 0_0, 0_1, 1_0, 1_1 or 1_2) by a fixed (mapping/association) relationship. For instance, the FSBM reporting subband size is a multiple (e.g., a multiple/scaling factor k) of the FSBM measurement subband size or the FSBM transmission subband size or the subband size indicated in/by the frequency domain resource assignment (FD-RA) field in a DCI (e.g., DCI formats 0_0, 0_1, 1_0, 1_1 or 1_2). The multiple/scaling factor k could be fixed in the system specifications and/or indicated/configured/provided to the UE 116 via higher layer RRC signaling/parameter and/or MAC CE command and/or dynamic DCI based signaling.

In yet another example, the FSBM reporting subband size is independently/separately configured/indicated relative to the FSBM measurement subband size, the FSBM transmission subband size, or the subband size indicated in/by the frequency domain resource assignment (FD-RA) field in a DCI (e.g., DCI formats 0_0, 0_1, 1_0, 1_1 or 1_2).

In one example for the FSBM transmission subband size, the FSBM transmission subband size could be the same as the FSBM measurement subband size or the FSBM reporting subband size or the subband size indicated in/by the frequency domain resource assignment (FD-RA) field in a DCI (e.g., DCI formats 0_0, 0_1, 10, 1_1 or 1_2).

In another example, the FSBM transmission subband size is related to the FSBM measurement subband size or the FSBM reporting subband size or the subband size indicated in/by the frequency domain resource assignment (FD-RA) field in a DCI (e.g., DCI formats 0_0, 0_1, 1_0, 1_1 or 1_2) by a fixed (mapping/association) relationship. For instance, the FSBM transmission subband size is a multiple (e.g., a multiple/scaling factor k) of the FSBM measurement subband size, the FSBM reporting subband size, or the subband size indicated in/by the frequency domain resource assignment (FD-RA) field in a DCI (e.g., DCI formats 0_0, 0_1, 1_0, 1_1 or 1_2). The multiple/scaling factor k could be fixed in the system specifications and/or indicated/configured/provided to the UE 116 via higher layer RRC signaling/parameter and/or MAC CE command and/or dynamic DCI based signaling.

In yet another example, the FSBM transmission subband size is independently/separately configured/indicated relative to the FSBM measurement subband size or the FSBM reporting subband size or the subband size indicated in/by the frequency domain resource assignment (FD-RA) field in a DCI (e.g., DCI formats 0_0, 0_1, 1_0, 1_1 or 1_2). As discussed herein, when the FSBM or frequency selective/frequency subband specific/dependent beam management is enabled (according to one or more examples described herein), a UE could report to the network 130, e.g., in a CSI report (provided/configured by a CSI reporting setting CSI-ReportConfig—also referred to as a CSI reporting setting for FSBM), one or more (e.g., $K_{group} \geq 1$) groups of beam/report quantities with each group comprising one or more (e.g., $K_{report} \geq 1$) beam/report quantities for one or more of the RS resources configured for the frequency-selective beam measurement for FSBM, wherein each of the reported beam/report quantities (e.g., comprising at least one resource indicator such as SSBRI/CRI and/or one beam metric such as L1-RSRP/L1-SINR) in a reported group could correspond to one or more FSBM measurement/reporting subbands.

As specified/discussed herein, when the FSBM or frequency selective/frequency subband specific/dependent beam management is enabled (according to one or more examples described herein), the UE 116 could report, e.g., in a CSI report (provided/configured by a CSI reporting setting CSI-ReportConfig—also referred to as a CSI reporting setting for FSBM), one or more (e.g., $K_{group} \geq 1$) groups of beam/report quantities with the g-th group comprising $K_{report,g} \geq 1$ beam/report quantities each for a (active) FSBM measurement subband or a (active) FSBM reporting subband, where the $K_{report,g}$ beam/report quantities in the g-th reported group could comprise one or more (e.g., $P_{report,g} \geq 1$) resource indicators such as SSBRIs/CRIs and/or one or more (e.g., $Q_{report,g} \geq 1$) beam metrics such as L1-RSPRs/L1-SINRs; here, $g=1, \ldots, K_{group}$ or $g \in \{1, \ldots, K_{group}\}$.

As specified/discussed in one or more examples herein, when the FSBM or frequency selective/frequency subband specific/dependent beam management is enabled (according to one or more examples described herein), the UE 116 could report, e.g., in a CSI report (provided/configured by a CSI reporting setting CSI-ReportConfig—also referred to as a CSI reporting setting for FSBM), one or more (e.g., $K_{group} \geq 1$) groups of beam/report quantities with the g-th group comprising $K_{report,g} \geq 1$ beam/report quantities each for a subset of the total configured $N_{meas}$ FSBM measurement subbands (or a subset of the total configured $M_{meas}$ active FSBM measurement subbands) or a subset of the total configured $N_{report}$ FSBM reporting subbands (or a subset of the total configured $M_{report}$ active FSBM reporting subbands), where a subset could comprise one or more (active) FSBM measurement/reporting subbands, and the $K_{report,g}$ beam/report quantities in the g-th reported group could comprise one or more (e.g., $P_{report,g} \geq 1$) resource indicators such as SSBRIs/CRIs and/or one or more (e.g., $Q_{report,g} \geq 1$) beam metrics such as L1-RSPRs/L1-SINRs; here, $g=1, \ldots, K_{group}$ or $g \in \{1, \ldots, K_{group}\}$.

In the present disclosure, the number of beam/report quantities in each of the reported groups could be equal, i.e., $K_{report} = K_{report,1} = \ldots = K_{report,g} = \ldots = K_{report,Kgroup}$, where $g \in \{1, \ldots, K_{group}\}$, and/or the number of resource indicators in each of the reported groups could be equal, i.e., $P_{report} = P_{report} = \ldots = P_{report,g} = \ldots = P_{report,Kgroup}$, where $g \in \{1, \ldots, K_{group}\}$, and/or the number of beam metrics in each of the reported groups could be equal, i.e., $Q_{report} = Q_{report,1} = \ldots = Q_{report,g} = \ldots = Q_{report,Kgroup}$, where $g \in \{1, \ldots, K_{group}\}$.

For the g-th ($g \in \{1, \ldots, K_{group}\}$) reported group of beam/report quantities in a CSI report/CSI reporting instance discussed herein: in one example, the number of resource indicator(s) reported in the g-th group of beam/report quantities in the CSI report/CSI reporting instance is one, i.e., $P_{report,g}=1$, and the number of beam metric(s) reported in the g-th reported group of beam/report quantities in the CSI report/CSI reporting instance is one, i.e., $Q_{report,g}=1$; in another example, the number of resource indicator(s) reported in the g-th group of beam/report quantities in the CSI report/CSI reporting instance is one, i.e., $P_{report,g}=1$, and the number of beam metric(s) reported in the g-th group of beam/report quantities in the CSI report/CSI reporting instance is greater than one, i.e., $Q_{report,g}>1$; in yet another example, the number of resource indicator(s) reported in the g-th group of beam/report quantities in the CSI report/CSI reporting instance is greater than one, i.e., $P_{report,g}>1$, and the number of beam metric(s) reported in the g-th group of beam/report quantities in the CSI report/CSI reporting instance is greater than one, i.e., $Q_{report,g}>1$.

For example, the number of resource indicator(s) reported in the g-th group of beam/report quantities in the CSI report/CSI reporting instance could be equal to the number of beam metric(s) reported in the g-th group of beam/report quantities in the CSI report/CSI reporting instance, i.e., $P_{report,g}=Q_{report,g}$.

For another example, the number of resource indicator(s) reported in the g-th group of beam/report quantities in the CSI report/CSI reporting instance could be greater than the number of beam metric(s) reported in the g-th group of beam/report quantities in the CSI report/CSI reporting instance, i.e., $P_{report,g}>Q_{report,g}$.

Yet for another example, the number of beam metric(s) reported in the g-th group of beam/report quantities in the CSI report/CSI reporting instance could be greater than the number of resource indicator(s) reported in the g-th group of beam/report quantities in the CSI report/CSI reporting instance, i.e., $Q_{report,g}>P_{report,g}$.

Based on one or more examples described herein, when the FSBM or frequency selective/frequency subband specific/dependent beam management is enabled (according to one or more examples described herein), and/or when the number of (reported) groups of beam/report quantities, i.e., $K_{group}$, is greater than one, and/or when the number of beam metrics in at least one reported group, e.g., $Q_{report,g}$ with $g \in \{1, \ldots, K_{group}\}$, is greater than one, and/or when the total number of beam metrics in all the reported groups, i.e., $Q_{report,1}+Q_{report,2}+ \ldots +Q_{report,Kgroup}$, is greater than one, the UE 116 could use differential (RSRP/SINR) reporting for one or more of the beam metrics in one or more of the reported groups.

In one example (differential reporting format 1), the differential (RSRP/SINR) reporting is applied/enabled per reported group. For the differential RSRP reporting per reported group, the largest measured value of L1-RSRP in a reported group (e.g., the g-th reported group with $g \in \{1, \ldots, K_{group}\}$) is quantized to a 7-bit value in the range [−140,−44] dBm with 1 dB step size, and a differential L1-RSRP in a reported group (e.g., the g-th reported group with $g \in \{1, \ldots, K_{group}\}$) is quantized to a 4-bit value. The differential L1-RSRP value is computed with a 2 dB step size with a reference to the largest measured L1-RSRP value which is part of the same reported group and L1-RSRP reporting instance. For the differential SINR reporting per reported group, the largest measured value of L1-SINR in a reported group (e.g., the g-th reported group with $g \in \{1, \ldots, K_{group}\}$) is quantized to a 7-bit value in the range [−23,−40] dBm with 0.5 dB step size, and a differential L1-SINR in a reported group (e.g., the g-th reported group with $g \in \{1, \ldots, K_{group}\}$) is quantized to a 4-bit value. The differential L1-SINR value is computed with 1 dB step size with a reference to the largest measured L1-SINR value which is part of the same reported group and L1-SINR reporting instance.

In another example (differential reporting format 2), the differential (RSRP/SINR) reporting is applied/enabled across one or more (e.g., $K_{group}$) reported groups. For this case, the UE 116 may also indicate to the network 130, e.g., in the CSI/beam report, the one or more groups—e.g., in the form of their group indexes—across which the differential (RSRP/SINR) reporting is applied.

For differential RSRP reporting across one or more (e.g., $K_{group}$) reported groups, the largest measured value of L1-RSRP in the one or more (e.g., $K_{group}$) reported groups is quantized to a 7-bit value in the range [−140,−44] dBm with 1 dB step size, and a differential L1-RSRP in the one or more (e.g., $K_{group}$) reported groups is quantized to a 4-bit value. The differential L1-RSRP value is computed with a 2 dB step size with a reference to the largest measured L1-RSRP value in the one or more (e.g., $K_{group}$) reported groups which is part of the same L1-RSRP reporting instance.

For differential SINR reporting across one or more (e.g., $K_{group}$) reported groups, the largest measured value of L1-SINR in the one or more (e.g., $K_{group}$) reported groups is quantized to a 7-bit value in the range [−23,−40] dBm with 0.5 dB step size, and a differential L1-SINR in the one or more (e.g., $K_{group}$) reported groups is quantized to a 4-bit value. The differential L1-SINR value is computed with 1 dB step size with a reference to the largest measured L1-SINR value in the one or more (e.g., $K_{group}$) reported groups which is part of the same L1-SINR reporting instance.

Furthermore, the UE 116 could be indicated/configured/provided by the network 130, e.g., via higher layer RRC signaling/parameter (e.g., in a CSI reporting setting provided by CSI-ReportConfig) and/or MAC CE command and/or dynamic DCI based signaling, which differential (RSRP/SINR) reporting format(s)—i.e., the differential reporting format 1 or the differential reporting format 2—to use/apply for the frequency-selective beam reporting for FSBM. Alternatively, the UE 116 could autonomously determine which differential (RSRP/SINR) reporting format(s) to use/apply—i.e., follow the differential reporting format 1 or the differential reporting format 2; for this case, the UE 116 could also indicate to the network 130, e.g., in part of the CSI report, the differential (RSRP/SINR) reporting format(s)—i.e., the differential reporting format 1 or the differential reporting format 2—applied/used at the UE 116 side.

Based on one or more examples described herein, when the FSBM or frequency selective/frequency subband specific/dependent beam management is enabled (according to one or examples described herein), the UE 116 could be indicated/configured/provided by the network 130, e.g., via higher layer RRC signaling/parameter (e.g., in the higher layer parameter CSI-ReportConfig that configures a CSI reporting setting or in the higher layer parameter CSI-ResourceConfig that configures a CSI resource setting) and/or MAC CE command and/or dynamic DCI based L1 signaling, the number of groups of beam/report quantities—i.e., $K_{group}$—to be reported in a CSI report/CSI reporting instance, and/or the number(s) of beam/report quantities—e.g., $K_{report,g}$ for the g-th group of beam/report quantities with $g \in \{1, \ldots, K_{group}\}$—for one or more (e.g., $K_{group}$) groups of beam/report quantities, and/or the number(s) of resource indicators—e.g., $P_{report,g}$ for the g-th group of beam/report quantities with $g \in \{1, \ldots, K_{group}\}$—for one or more (e.g., $K_{group}$) groups of beam/report quantities, and/or the number(s) of beam metrics—e.g., $Q_{report,g}$ for the g-th group of beam/report quantities with $g \in \{1, \ldots, K_{group}\}$—for one or more (e.g., $K_{group}$) groups of beam/report quantities. Furthermore, when the number of beam/report quantities is identical across all the $K_{group}$ groups of beam/report quantities, and/or when the number of resource indicators is identical across all the $K_{group}$ groups of beam/report quantities, and/or when the number of beam metrics is identical across all the $K_{group}$ groups of beam/report quantities, the UE 116 could be indicated/configured/provided by the network 130, e.g., via higher layer RRC signaling/parameter (e.g., in the higher layer parameter CSI-ReportConfig that configures a CSI reporting setting or in the higher layer parameter CSI-ResourceConfig that configures a CSI resource setting) and/or MAC CE command and/or dynamic DCI based L1 signaling, the number of beam/report quantities—i.e., $K_{report}$—in each group of beam/report quantities, and/or the number of resource indicators—e.g., $P_{report}$—in each group of beam/report quantities, and/or the number of beam metrics—e.g., $Q_{report}$—in each group of beam/report quantities.

Based on one or more examples described herein, when the FSBM or frequency selective/frequency subband specific/dependent beam management is enabled (according to one or examples described herein), the UE 116 could determine the number(s) of beam/report quantities—e.g., $K_{report,g}$ for the g-th group of beam/report quantities with $g \in \{1, \ldots, K_{group}\}$—for one or more (e.g., $K_{group}$) groups of beam/report quantities, and/or the number(s) of resource indicators—e.g., $P_{report,g}$ for the g-th group of beam/report quantities with $g \in \{1, \ldots, K_{group}\}$—for one or more (e.g., $K_{group}$) groups of beam/report quantities, and/or the number(s) of beam metrics—e.g., $Q_{report,g}$ for the g-th group of beam/report quantities with $g \in \{1, \ldots, K_{group}\}$—for one or more (e.g., $K_{group}$) groups of beam/report quantities, as the number of FSBM measurement subbands $N_{meas}$, and/or the number of active FSBM measurement subbands $M_{meas}$, and/or the number of FSBM reporting subbands $N_{report}$, and/or the number of active FSBM reporting subbands $M_{report}$. Furthermore, when the number of beam/report quantities is identical across all the $K_{group}$ groups of beam/report quantities, and/or when the number of resource indicators is identical across all the $K_{group}$ groups of beam/report quantities, and/or when the number of beam metrics is identical across all the $K_{group}$ groups of beam/report quantities, the UE 116 could determine the number of beam/report quantities—i.e., $K_{report}$— in each group of beam/report quantities, and/or the number of resource indicators—e.g., $P_{report}$— in each group of beam/report quantities, and/or the number of beam metrics—e.g., $Q_{report}$—in each group of beam/report quantities, as the number of FSBM measurement subbands $N_{meas}$, and/or the number of active FSBM measurement subbands $M_{meas}$, and/or the number of FSBM reporting subbands $N_{report}$, and/or the number of active FSBM reporting subbands $M_{report}$. As discussed herein, when the FSBM or frequency selective/frequency subband specific/dependent beam management is enabled (according to one or more examples described herein), the UE 116 could report, e.g., in a two-part UCI/CSI, one or more (e.g., $K_{group} \geq 1$) groups of beam/report quantities with the g-th group comprising $K_{report,g} \geq 1$ beam/report quantities each for a (active) FSBM measurement subband or a (active) FSBM reporting subband or a subset of (active) FSBM measurement subbands or a subset of (active) FSBM reporting subbands, where the $K_{report,g}$ beam/report quantities in the g-th reported group could comprise one or more (e.g., $P_{report,g} \geq 1$) resource indicators such as SSBRIs/CRIs and/or one or more (e.g., $Q_{report,g} \geq 1$) beam metrics such as L1-RSPRs/L1-SINRs; here, $g=1, \ldots, K_{group}$ or $g \in \{1, \ldots, K_{group}\}$.

FIG. 12 illustrates an example architecture 1200 for a two-part UCI/CSI for FSBM according to embodiments of the present disclosure. In one embodiment, the UE 116 of FIG. 3 could include the architecture 1200. This example is for illustration only and other embodiments can be used without departing from the scope of the present disclosure.

Part 1 of the two-part UCI/CSI for FSBM could provide/indicate/contain/comprise one or more of the following components:

Component 1—one or more resource indicators in a group of beam/report quantities (e.g., the g-th group of beam/report quantities with $g \in \{1, \ldots, K_{group}\}$). For example, component 1 may include the first/last resource indicator in a group and/or the resource indicator with the highest/lowest measured beam metric such as L1-RSRP/L1-SINR in a group and/or the p-th resource indicator in the g-th group of beam/report quantities and/or the resource indicator with the p-th highest/lowest beam metric such as L1-RSRP/L1-SINR in the g-th group, where $p \in \{1, \ldots, P_{group,g}\}$ and $g \in \{1, \ldots, K_{group}\}$.

For another example, for $K_{group}=1$, component 1 may include the first/last resource indicator in the group and/or the resource indicator with the highest/lowest measured beam metric such as L1-RSRP/L1-SINR in the group and/or the p-th resource indicator in the group and/or the resource indicator with the p-th highest/lowest beam metric such as L1-RSRP/L1-SINR in the group, where $p \in \{1, \ldots, P_{group,g}\}$. In the present disclosure, the UE 116 could be indicated/provided/configured by the network 130, e.g., via higher layer RRC signaling/parameter and/or MAC CE command and/or dynamic DCI based L1 signaling, the value(s)/number(s) of p and/or g. Alternatively, the UE 116 could autonomously determine the value(s)/number(s) of p and/or g, and report them, e.g., in part 1 (or part 2) of the UCI/CSI, to the network 130.

Component 2—one or more resource indicators in one or more (e.g., $K_{group}$) groups of beam/report quantities. For example, component 2 may include the first/last resource indicator in/among the one or more (e.g., $K_{group}$) groups of beam/report quantities and/or the resource indicator with the highest/lowest measured beam metric such as L1-RSRP/L1-SINR in/among the one or more (e.g., $K_{group}$) groups of beam/report quantities.

For another example, component 2 may include the p'-th resource indicator in/among the one or more (e.g., $K_{group}$) groups of beam/report quantities and/or the resource indicator with the p'-th highest/lowest beam metric such as L1-RSRP/L1-SINR in/among the one or more (e.g., $K_{group}$) groups of beam/report quantities. In the present disclosure, the UE 116 could be indicated/provided/configured by the network 130, e.g., via higher layer RRC signaling/parameter and/or MAC CE command and/or dynamic DCI based L1 signaling, the value(s)/number(s) of p'. Alternatively, the UE 116 could autonomously determine the value(s)/number(s) of p', and report it, e.g., in part 1 (or part 2) of the UCI/CSI for FSBM, to the network 130.

Component 3—one or more beam metrics such as L1-RSRPs/L1-SINRs in a group of beam/report quantities (e.g., the g-th group of beam/report quantities with $g \in \{1, \ldots, K_{group}\}$). For example, component 3 may include the first/last beam metric in a group and/or the highest/lowest measured beam metric such as L1-RSRP/L1-SINR in a group and/or the p-th beam metric in the g-th group of beam/report quantities and/or the p-th highest/lowest beam metric such as L1-RSRP/L1-SINR in the g-th group, where $p \in \{1, \ldots, P_{group,g}\}$ and $g \in \{1, \ldots, K_{group}\}$.

For another example, component 3 may include for $K_{group}=1$, the first/last beam metric in the group and/or the highest/lowest measured beam metric such as L1-RSRP/L1-SINR in the group and/or the p-th beam metric in the group and/or the p-th highest/lowest beam metric such as L1-RSRP/L1-SINR in the group, where $p \in \{1, \ldots, P_{group,g}\}$. In the present disclosure, the UE 116 could be indicated/provided/configured by the network 130, e.g., via higher layer RRC signaling/parameter and/or MAC CE command and/or dynamic DCI based L1 signaling, the value(s)/number(s) of p and/or g. Alternatively, the UE 116 could autonomously determine the value(s)/number(s) of p and/or g, and report them, e.g., in part 1 (or part 2) of the UCI/CSI for FSBM, to the network 130.

Component 4—one or more beam metrics such as L1-RSRPs/L1-SINRs in one or more (e.g., $K_{group}$) groups of beam/report quantities. For example, component 4 may include the first/last beam metric in/among the one or more (e.g., $K_{group}$) groups of beam/report quantities and/or the highest/lowest measured beam metric such as L1-RSRP/L1-SINR in/among the one or more (e.g., $K_{group}$) groups of beam/report quantities.

For another example, component 4 may include the p'-th beam metric in/among the one or more (e.g., $K_{group}$) groups of beam/report quantities and/or the p'-th highest/lowest beam metric such as L1-RSRP/L1-SINR in/among the one or more (e.g., $K_{group}$) groups of beam/report quantities. In the present disclosure, the UE 116 could be indicated/provided/configured by the network 130, e.g., via higher layer RRC signaling/parameter and/or MAC CE command and/or dynamic DCI based L1 signaling, the value(s)/number(s) of p'. Alternatively, the UE 116 could autonomously determine the value(s)/number(s) of p', and report it, e.g., in part 1 (or part 2) of the UCI/CSI for FSBM, to the network 130.

Component 5—one or more groups of beam/report quantities: for example, the (single) first/last group of beam/report quantities. For another example, component 5 may include the group of beam/report quantities with/having the highest/lowest measured beam metric such as L1-RSRP/L1-SINR in/among all the $K_{group}$ groups of beam/report quantities.

Yet for another example, component 5 may include the group of beam/report quantities with the lowest/highest group ID/index in/among all the $K_{group}$ groups of beam/report quantities.

Yet for another example, component 5 may include the g-th group of beam/report quantities with $g \in \{1, \ldots, K_{group}\}$. Yet for another example, the group of beam/report quantities with/having the p'-th highest/lowest beam metric such as L1-RSRP/L1-SINR in/among all the $K_{group}$ groups of beam/report quantities. yet for another example, the group of beam/report quantities with the p''-th lowest/highest group ID/index in/among all the $K_{group}$ groups of beam/report quantities. In the present disclosure, the UE 116 could be indicated/provided/configured by the network 130, e.g., via higher layer RRC signaling/parameter and/or MAC CE command and/or dynamic DCI based L1 signaling, the value(s)/number(s) of p' and/or p'' and/or g'. Alternatively, the UE 116 could autonomously determine the value(s)/number(s) of p' and/or p''' and/or g', and report them, e.g., in part 1 (or part 2) of the UCI/CSI for FSBM, to the network 130.

Component 6—a number of group(s), e.g., denoted by $L_{group}$, of beam/report quantities reported in part 2 of the UCI/CSI for FSBM. For example, component 6 may include $L_{group} = K_{group} - 1$, where $l \in \{1, \ldots, K_{group}\}$ (e.g., l=1) is the number of group(s) of beam/report quantities reported in part 1 of the UCI/CSI for FSBM.

Component 7—a set of index(es)/ID(s), e.g., denoted by Lg, of the $L_{group}$ group(s) of beam/report quantities reported in part 2 of the UCI/CSI for FSBM. For example, component 7 may include $Lg = \{1, \ldots, K_{group}\} \setminus \{Kg\}$, where Kg represents the set of index(es)/ID(s) of the $K_{group}$ group(s) of beam/report quantities reported in part 1 of the UCI/CSI for FSBM (e.g., Kg=g with $g \in \{1, \ldots, K_{group}\}$) and '{x}\{y}' denotes that {y} is not in {x}.

Component 8—a number of resource indicators, e.g., denoted by $N_{2,l}$ with $l \in \{1, \ldots, L_{group}\}$, reported in part 2 of the UCI/CSI for FSBM for a group of beam/report quantities reported in part 2 of the UCI/CSI for FSBM (e.g., the 1-th group of beam/report quantities with $l \in \{1, \ldots, L_{group}\}$). For example, for the 1-th group of beam/report quantities with $l \in \{1, \ldots, L_{group}\}$, $N_{2,l} = N_{tot,l} - N_{1,l}$, where $N_{tot,l}$ is the total number of resource indicators in the 1-th group of beam/report quantities reported in both part 1 and part 2 of the UCI/CSI for FSBM, and $N_{1,l}$ is the number of resource indicators in the 1-th group of beam/report quantities reported in part 1 of the UCI/CSI for FSBM—e.g., when $N_{1,l} = 1$, the first/last resource indicator and/or the resource indicator with the highest/lowest beam metric such as L1-RSRP/L1-SINR in the 1-th group could be reported in part 1 of the UCI/CSI for FSBM, and the rest $N_{2,l} = N_{tot,l} - 1$ resource indicators in the 1-th group could be reported in part 2 of the UCI/CSI for FSBM.

For another example, for $K_{group} = 1$, $N_2 = N_{tot} - N_1$, where $N_{tot}$ is the total number of resource indicators reported in both part 1 and part 2 of the UCI/CSI for FSBM. $N_1$ is the number of resource indicators reported in part 1 of the UCI/CSI for FSBM; e.g., if $N_1 = 1$, the first/last resource indicator and/or the resource indicator with the highest/lowest beam metric such as L1-RSRP/L1-SINR could be reported in part 1 of the UCI/CSI for FSBM, and the rest $N_2 = N_{tot} - 1$ resource indicators could be reported in part 2 of the UCI/CSI for FSBM.

Component 9—a number of resource indicators, e.g., denoted by $N_2$, reported in part 2 of the UCI/CSI for FSBM for one or more (e.g., $L_{group}$) groups of beam/report quantities reported in part 2 of the UCI/CSI for FSBM. For example, component 9 may include $N_2 = N_{tot} - N_1$, where $N_{tot}$ is the total number of resource indicators in $L_{group}'$ group(s) of beam/report quantities reported in both part 1 and part 2 of the UCI/CSI for FSBM, and $N_1$ is the number of resource indicators in $L_{group}'$ group(s) of beam/report quantities reported in part 1 of the UCI/CSI for FSBM. For this case, part 1 of the UCI/CSI for FSBM could also contain/comprise the number/value of $L_{group}'$ and/or the index(es)/ID(s) of the $L_{group}'$ group(s) of beam/report quantities.

For another example, $N_2$ could be the total number of resource indicators—e.g., in all the $L_{group}$ groups of beam/report quantities reported in part 2 of the UCI/CSI for FSBM—reported in part 2 of the UCI/CSI for FSBM.

Component 10—a number(s) of resource indicators, e.g., denoted by $N_{2,1}, \ldots, N_{2,l}, \ldots, N_{2,Lgroup}$ with $l \in \{1, \ldots, L_{group}\}$, reported in part 2 of the UCI/CSI for FSBM for each of the one or more groups of beam/report quantities reported in part 2 of the UCI/CSI for FSBM (e.g., the 1-st, ..., 1-th, ..., $L_{group}$-th group of beam/report quantities with $l \in \{1, \ldots, L_{group}\}$).

Component 11—number of resource indicators, e.g., denoted by $N_2$, reported in part 2 of the UCI/CSI for FSBM. For example, $N_2 = N_{tot} - N_1$, where $N_{tot}$ is the total number resource indicators reported in both part 1 and part 2 of the UCI/CSI for FSBM, and $N_1$ is the number of resource indicators reported in part 1 of the UCI/CSI for FSBM.

For another example, for $K_{group} = 1$, $N_2 = P_{report} - N_1$, where $P_{report}$ is the total number of resource indicators reported in the UCI/CSI, and $N_1$ is the number of resource indicators reported in part 1 of the UCI/CSI for FSBM; e.g., if $N_1 = 1$, the first/last resource indicator and/or the resource indicator with the highest/lowest beam metric such as L1-RSRP/L1-SINR could be reported in part 1 of the UCI/CSI for FSBM, and the rest $N_2 = P_{report} - 1$ resource indicators could be reported in part 2 of the UCI/CSI for FSBM.

Component 12—number of beam metrics, e.g., denoted by $M_{2,l}$ with $l \in \{1, \ldots, L_{group}\}$, reported in part 2 of the UCI/CSI for FSBM for a group of beam/report quantities reported in part 2 of the UCI/CSI for FSBM (e.g., the 1-th group of beam/report quantities with $i \in \{1, \ldots, L_{group}\}$). For example, for the 1-th group of beam/report quantities with $l \in \{1, \ldots, L_{group}\}$, $M_{2,l} = M_{tot,l} - M_{1,l}$, where $M_{tot,l}$ is the total number of beam metrics in the 1-th group of beam/report quantities reported in both part 1 and part 2 of the UCI/CSI for FSBM, and $M_{1,l}$ is the number of beam metrics in the 1-th group of beam/report quantities reported in part 1 of the UCI/CSI for FSBM. When $M_{1,l} = 1$, the first/last beam metric and/or the highest/lowest beam metric such as L1-RSRP/L1-SINR in the l-th group could be reported in part 1 of the UCI/CSI for FSBM, and the rest $M_{2,l}=M_{tot,l}-1$ beam metrics in the l-th group could be reported in part 2 of the UCI/CSI for FSBM.

For another example, for $K_{group}=1$, $M_2=M_{tot}-M_1$, where $M_{tot}$ is the total number of beam metrics reported in both part 1 and part 2 of the UCI/CSI for FSBM, and $M_1$ is the number of beam metrics reported in part 1 of the UCI/CSI for FSBM. If $M_1=1$, the first/last beam metric and/or the highest/lowest beam metric such as L1-RSRP/L1-SINR could be reported in part 1 of the UCI/CSI for FSBM, and the rest $M_2=M_{tot}-1$ beam metrics could be reported in part 2 of the UCI/CSI for FSBM.

Component 13—number of beam metrics, e.g., denoted by $M_2$, reported in part 2 of the UCI/CSI for FSBM for one or more (e.g., $L_{group}$) groups of beam/report quantities reported in part 2 of the UCI/CSI for FSBM. For example, $M_2=M_{tot}-M_1$, where $M_{tot}$ is the total number of beam metrics in $L_{group}'$ group(s) of beam/report quantities reported in both part 1 and part 2 of the UCI/CSI for FSBM, and $M_1$ is the number of beam metrics in $L_{group}'$ group(s) of beam/report quantities reported in part 1 of the UCI/CSI for FSBM. For this case, part 1 of the UCI/CSI for FSBM could also contain/comprise the number/value of $L_{group}'$ and/or the index(es)/ID(s) of the $L_{group}'$ group(s) of beam/report quantities; for another example, $M_2$ could be the total number of beam metrics—e.g., in all the $L_{group}$ groups of beam/report quantities reported in part 2 of the UCI/CSI for FSBM—reported in part 2 of the UCI/CSI for FSBM.

Component 14—a number(s) of beam metrics, e.g., denoted by $M_{2,1}, \ldots, M_{2,l}, \ldots, M_{2,Lgroup}$ with $l \in \{1, \ldots, L_{group}\}$, reported in part 2 of the UCI/CSI for FSBM for each of the one or more groups of beam/report quantities reported in part 2 of the UCI/CSI for FSBM (e.g., the 1-st, $\ldots$, l-th, $\ldots$, $L_{group}$-th group of beam/report quantities with $l \in \{1, \ldots, L_{group}\}$).

Component 15—number of beam metrics, e.g., denoted by $M_2$, reported in part 2 of the UCI/CSI for FSBM. For example, $M_2=M_{tot}-M_1$, where $M_{tot}$ is the total number beam metrics reported in both part 1 and part 2 of the UCI/CSI for FSBM, and $M_1$ is the number of beam metrics reported in part 1 of the UCI/CSI for FSBM. For another example, for $K_{group}=1$, $M_2=Q_{report}-M_1$, where $Q_{report}$ is the total number of beam metrics reported in the UCI/CSI, and $M_1$ is the number of beam metrics reported in part 1 of the UCI/CSI for FSBM; e.g., if $M_1=1$, the first/last beam metric and/or the highest/lowest beam metric such as L1-RSRP/L1-SINR could be reported in part 1 of the UCI/CSI for FSBM, and the rest $M_2=Q_{report}-1$ beam metrics could be reported in part 2 of the UCI/CSI for FSBM.

Part 2 of the two-part UCI/CSI for FSBM could provide/indicate/contain/comprise one or more of the following components:

Component A—one or more resource indicators in a group of beam/report quantities (e.g., the g-th group of beam/report quantities with $g \in \{1, \ldots, K_{group}\}$). For example, component A may include the resource indicator(s) in a group other than the resource indicator(s) in the same group reported in part 1 of the UCI/CSI for FSBM (e.g., the first/last resource indicator in the group and/or the resource indicator with the highest/lowest measured beam metric such as L1-RSRP/L1-SINR in the group and/or the p-th resource indicator in the g-th group of beam/report quantities and/or the resource indicator with the p-th highest/lowest beam metric such as L1-RSRP/L1-SINR in the g-th group, where $p \in \{1, \ldots, P_{group,g}\}$ and $g \in \{1, \ldots, K_{group}\}$).

For another example, for $K_{group}=1$, component A may include the resource indicator(s) other than the resource indicator(s) reported in part 1 of the UCI/CSI for FSBM (e.g., the first/last resource indicator and/or the resource indicator with the highest/lowest measured beam metric such as L1-RSRP/L1-SINR and/or the p-th resource indicator and/or the resource indicator with the p-th highest/lowest beam metric such as L1-RSRP/L1-SINR, where $p \in \{1, \ldots, P_{group,g}\}$). In the present disclosure, the UE 116 could be indicated/provided/configured by the network 130, e.g., via higher layer RRC signaling/parameter and/or MAC CE command and/or dynamic DCI based L1 signaling, the value(s)/number(s) of p and/or g; alternatively, the UE 116 could autonomously determine the value(s)/number(s) of p and/or g, and report them, e.g., in part 1 (or part 2) of the UCI/CSI, to the network 130.

Component B—one or more resource indicators in one or more (e.g., $K_{group}$) groups of beam/report quantities. For example, component B may include the resource indicator(s) in/among the one or more (e.g., $K_{group}$) groups of beam/report quantities other than the resource indicator(s) in/among the one or more (e.g., $K_{group}$) groups of beam/report quantities reported in part 1 of the UCI/CSI for FSBM (e.g., the first/last resource indicator in/among the one or more (e.g., $K_{group}$) groups of beam/report quantities and/or the resource indicator with the highest/lowest measured beam metric such as L1-RSRP/L1-SINR in/among the one or more (e.g., $K_{group}$) groups of beam/report quantities and/or the p'-th resource indicator in/among the one or more (e.g., $K_{group}$) groups of beam/report quantities and/or the resource indicator with the p'-th highest/lowest beam metric such as L1-RSRP/L1-SINR in/among the one or more (e.g., $K_{group}$) groups of beam/report quantities). In the present disclosure, the UE 116 could be indicated/provided/configured by the network 130, e.g., via higher layer RRC signaling/parameter and/or MAC CE command and/or dynamic DCI based L1 signaling, the value(s)/number(s) of p'. Alternatively, the UE 116 could autonomously determine the value(s)/number(s) of p', and report it, e.g., in part 1 (or part 2) of the UCI/CSI for FSBM, to the network 130.

Component C—one or more beam metrics in a group of beam/report quantities (e.g., the g-th group of beam/report quantities with $g \in \{1, \ldots, K_{group}\}$). For example, component C may include the beam metric(s) in a group other than the beam metric(s) in the same group reported in part 1 of the UCI/CSI for FSBM (e.g., the first/last beam metric in the group and/or the highest/lowest measured beam metric such as L1-RSRP/L1-SINR in the group and/or the p-th beam metric in the g-th group of beam/report quantities and/or the p-th highest/lowest beam metric such as L1-RSRP/L1-SINR in the g-th group, where $p \in \{1, \ldots, P_{group,g}\}$ and $g \in \{1, \ldots, K_{group}\}$).

For another example, for $K_{group}=1$, component C may include the beam metric(s) other than the beam metric(s) reported in part 1 of the UCI/CSI for FSBM (e.g., the first/last beam metric and/or the highest/lowest measured beam metric such as L1-RSRP/L1-SINR and/or the p-th beam metric and/or the p-th highest/lowest beam metric such as L1-RSRP/L1-SINR, where $p \in \{1, \ldots, P_{group,g}\}$). In the present disclosure, the UE 116 could be indicated/provided/configured by the network 130, e.g., via higher layer RRC signaling/parameter and/or MAC CE command and/or dynamic DCI based L1 signaling, the value(s)/number(s) of p and/or g. Alternatively, the UE 116 could autonomously determine the value(s)/number(s) of p and/or g, and report them, e.g., in part 1 (or part 2) of the UCI/CSI, to the network 130.

Component D—one or more beam metrics in one or more (e.g., $K_{group}$) groups of beam/report quantities. For example, component D may include the beam metric(s) in/among the one or more (e.g., $K_{group}$) groups of beam/report quantities other than the beam metric(s) in/among the one or more (e.g., $K_{group}$) groups of beam/report quantities reported in part 1 of the UCI/CSI for FSBM (e.g., the first/last beam metric in/among the one or more (e.g., $K_{group}$) groups of beam/report quantities and/or the highest/lowest measured beam metric such as L1-RSRP/L1-SINR in/among the one or more (e.g., $K_{group}$) groups of beam/report quantities and/or the p'-th beam metric in/among the one or more (e.g., $K_{group}$) groups of beam/report quantities and/or the p'-th highest/lowest beam metric such as L1-RSRP/L1-SINR in/among the one or more (e.g., $K_{group}$) groups of beam/report quantities). In the present disclosure, the UE 116 could be indicated/provided/configured by the network 130, e.g., via higher layer RRC signaling/parameter and/or MAC CE command and/or dynamic DCI based L1 signaling, the value(s)/number(s) of p'. Alternatively, the UE 116 could autonomously determine the value(s)/number(s) of p', and report it, e.g., in part 1 (or part 2) of the UCI/CSI for FSBM, to the network 130.

Component E—one or more groups of beam/report quantities. For example, component E may include the group(s) of beam/report quantities other than the first/last group of beam/report quantities; for another example, the group(s) of beam/report quantities other than the group of beam/report quantities with/having the highest/lowest measured beam metric such as L1-RSRP/L1-SINR in/among all the $K_{group}$ groups of beam/report quantities.

Yet for another example, component E may include the group(s) of beam/report quantities other than the group of beam/report quantities with the lowest/highest group ID/index in/among all the $K_{group}$ groups of beam/report quantities; yet for another example, the group(s) of beam/report quantities other than the g-th group of beam/report quantities with $g \in \{1, \ldots, K_{group}\}$.

Yet for another example, component E may include the group(s) of beam/report quantities other than the group of beam/report quantities with/having the p'-th highest/lowest beam metric such as L1-RSRP/L1-SINR in/among all the $K_{group}$ groups of beam/report quantities.

Yet for another example, component E may include the group(s) of beam/report quantities other than the group of beam/report quantities with the p''-th lowest/highest group ID/index in/among all the $K_{group}$ groups of beam/report quantities. In the present disclosure, the UE 116 could be indicated/provided/configured by the network 130, e.g., via higher layer RRC signaling/parameter and/or MAC CE command and/or dynamic DCI based L1 signaling, the value(s)/number(s) of p' and/or p'' and/or g'. Alternatively, the UE 116 could autonomously determine the value(s)/number(s) of p' and/or p'' and/or g', and report them, e.g., in part 1 (or part 2) of the UCI/CSI for FSBM, to the network 130.

As discussed/described herein, a UCI/CSI for FSBM could contain/comprise/include two parts with part 1 of the two-part UCI/CSI for FSBM providing/indicating/containing/comprising one or more of the component 1-component 15 specified in the present disclosure, and part 2 of the two-part UCI/CSI for FSBM providing/indicating/containing/comprising one or more of the component A-component E specified in the present disclosure. For example, for $K_{group}=1$, the two-part UCI/CSI for FSBM could provide/indicate/contain/comprise $P_{report}$ resource indicators such as SSBRIs/CRIs and $Q_{report}$ beam metrics such as L1-RSRPs/L1-SINRs.

Part 1 of the two-part UCI/CSI for FSBM could provide/indicate/contain/comprise at least the resource indicator with the highest/lowest beam metric (e.g., component 1), the highest/lowest beam metric (e.g., component 3), the number of resource indicators reported in part 2 of the two-part UCI/CSI for FSBM—i.e., $P_{report}-1$ (e.g., component 11), and the number of beam metrics reported in part 2 of the two-part UCI/CSI for FSBM—i.e., $Q_{report}-1$ (e.g., component 15).

Part 2 of the two-part UCI/CSI for FSBM could provide/indicate/contain/comprise at least the $P_{report}-1$ resource indicators such as SSBRIs/CRIs and the $Q_{report}-1$ beam metrics such as L1-RSRPs/L1-SINRs.

Figure 13:
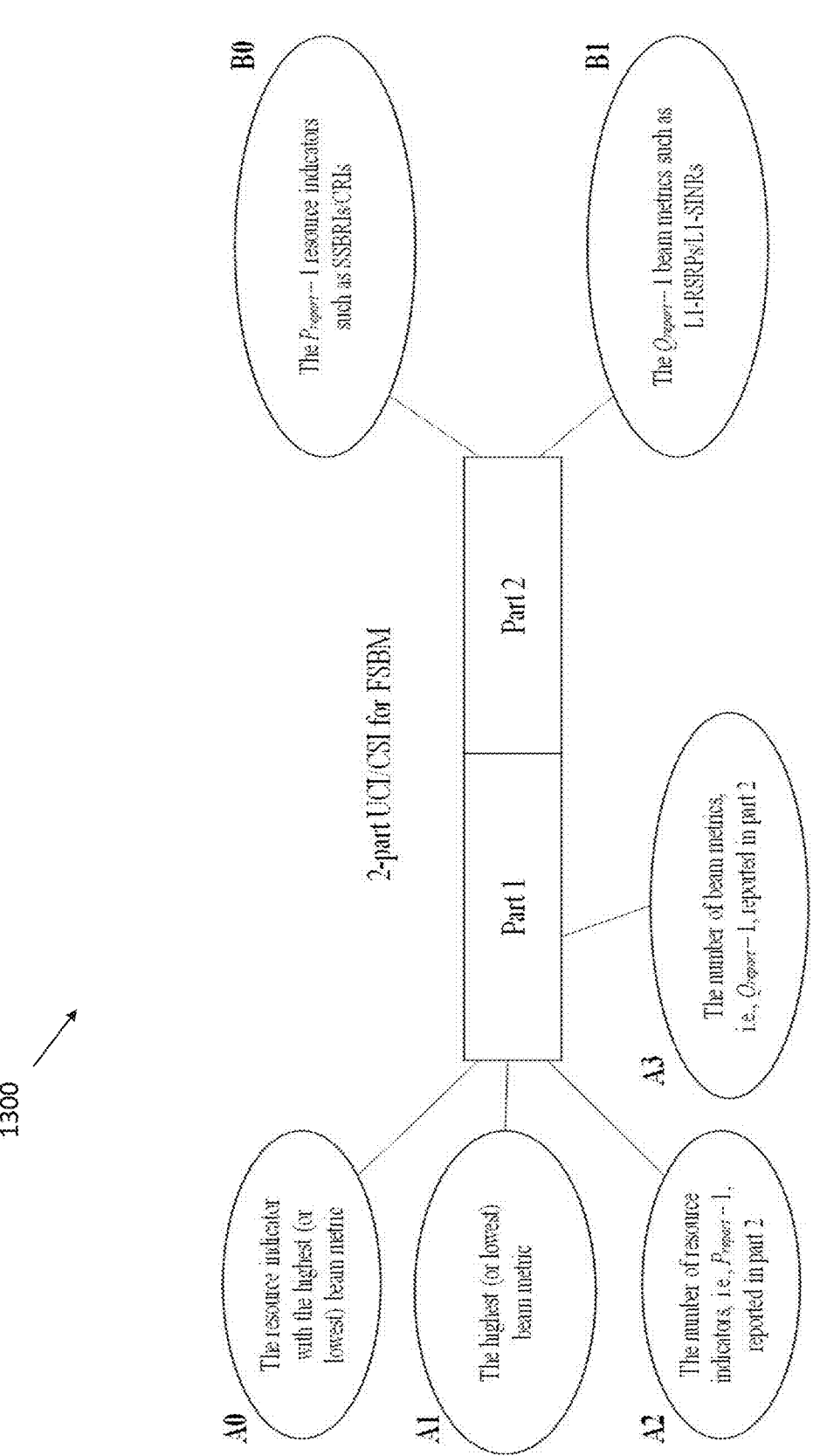
FIG. 13 illustrates an example of the two-part UCI/CSI content(s) for FSBM according to embodiments of the present disclosure.

FIG. 13 illustrates an example 1300 of the two-part UCI/CSI content(s) for FSBM according to embodiments of the present disclosure. In one embodiment, the example 1300 can characterize the architecture 1200 in FIG. 12. This example is for illustration only and other embodiments can be used without departing from the scope of the present disclosure.

Figure 14:
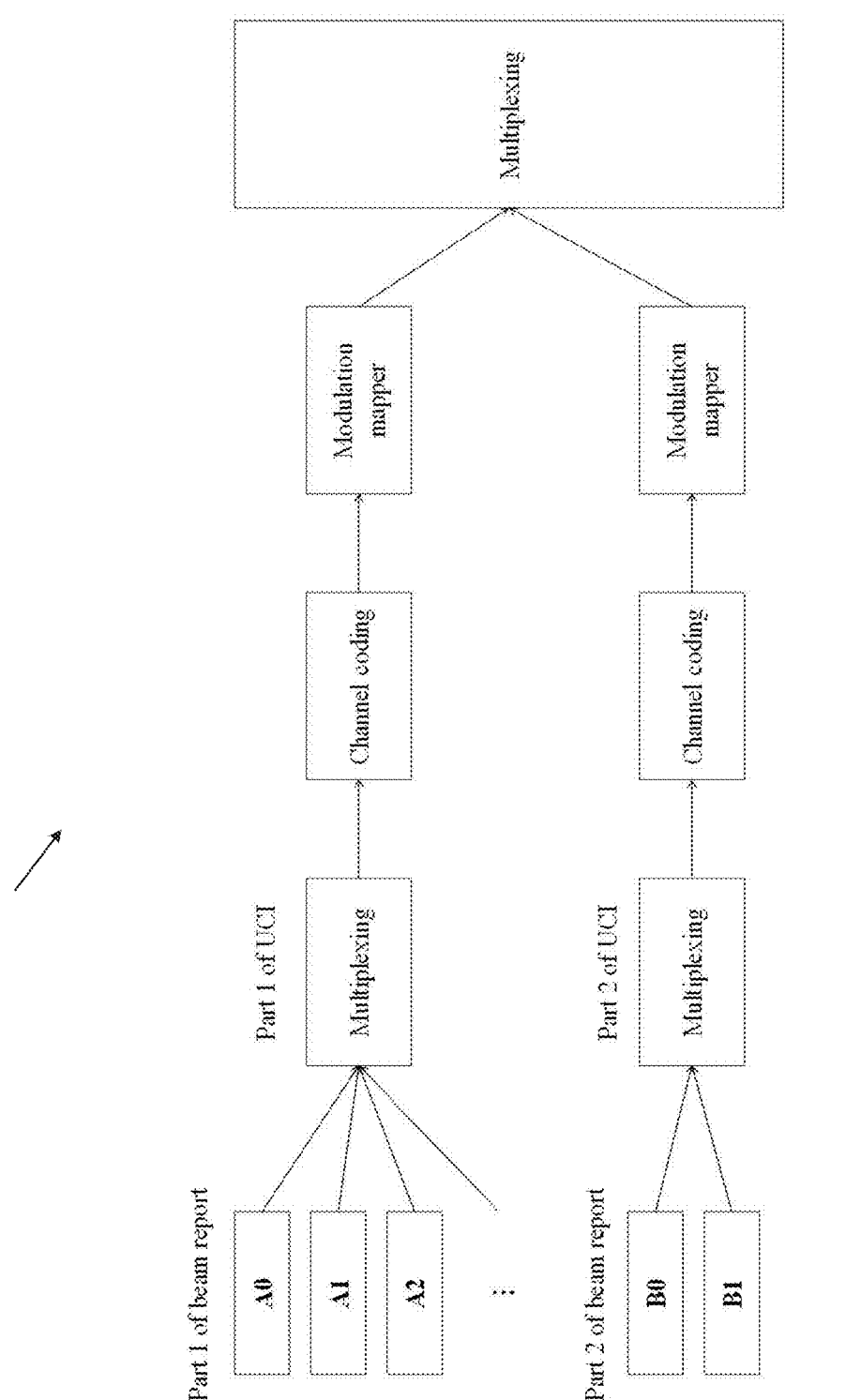
FIG. 14 illustrates an example of constructing/encoding the two-part UCI/CSI for FSBM according to embodiments of the present disclosure.

FIG. 14 illustrates an example of constructing/encoding the two-part UCI/CSI for FSBM 1400 according to embodiments of the present disclosure. For example, part 1 and part 2 of the architecture 1200 for FSBM could be separately encoded as shown by UCI/CSI 1400 and reported in a single CSI reporting instance. Furthermore, the payload size of part 1 of the 2-part UCI/CSI for FSBM could be fixed for a given RRC configuration; however, the payload size of part 2 of the 2-part UCI/CSI for FSBM could vary. This example is for illustration only and other embodiments can be used without departing from the scope of the present disclosure.

In a first variation, the frequency-selective beam reporting for FSBM could be via one-part UCI/CSI or a two-part UCI/CSI depending on a condition.

In one example, the condition is based on the number of reported groups of beam/report quantities. For example, when the number of reported groups of beam/report quantities (e.g., $K_{group}$) is less than or equal to x1 (where x1 is a threshold, fixed or configured), the one-part UCI is used for the reporting, and when the number of reported groups of beam/report quantities (e.g., $K_{group}$) is greater than x, the two-part UCI is used for the reporting.

In another example, the condition is based on the number of reported resource indicators such as SSBRIs/CRIs (in one or more groups)—e.g., $P_{report}$ when $K_{group}=1$. For example, when the number of reported resource indicators (e.g., $P_{report}$) is less than or equal to x2 (where x2 is a threshold, fixed or configured), the one-part UCI is used for the reporting, and when the number of reported resource indicators (e.g., $P_{report}$) is greater than x2, the two-part UCI is used for the reporting.

In yet another example, the condition is based on the number of reported beam metrics such as L1-RSRPs/L1-SINRs (in one or more groups)—e.g., $Q_{report}$ when $K_{group}=1$. For example, when the number of reported beam metrics (e.g., $Q_{report}$) is less than or equal to x3 (where x3 is a threshold, fixed or configured), the one-part UCI is used for the reporting, and when the number of reported beam metrics (e.g., $Q_{report}$) is greater than x3, the two-part UCI is used for the reporting.

In yet another example, the condition is based on the total number of reported resource indicators such as SSBRIs/CRIs and reported beam metrics such as L1-RSRPs/L1-SINRs (in one or more groups)—e.g., $P_{report}+Q_{report}$ (or $K_{report}$) when $K_{group}=1$. For example, when the total number of reported resource indicators and reported beam metrics (e.g., $P_{report}+Q_{report}$ or $K_{report}$) is less than or equal to x3 (where x3 is a threshold, fixed or configured), the one-part UCI is used for the reporting, and when the number of reported resource indicators and reported beam metrics (e.g., $P_{report}+Q_{report}$ or $K_{report}$) is greater than x3, the two-part UCI is used for the reporting. For the one-part UCI/CSI for FSBM, all the (group(s) of) resource indicators and beam metrics could be reported in part 1 of the UCI/CSI for FSBM; for this case, part 2 of the UCI/CSI for FSBM is absent.

In a second variation of the described/specified design examples herein, the frequency-selective beam reporting for FSBM could be via one-part UCI/CSI or a two-part UCI/CSI depending on a signaling from the network 130. This signaling could be semi-static via higher layer RRC signaling (using a dedicated parameter or with a joint configuration parameter) or more dynamic via MAC CE or DCI based signaling (using a dedicated indication or with a joint indication).

In a third variation of the described/specified design examples herein, the frequency-selective beam reporting for FSBM could be multiplexed with other types of CSI or beam reports, wherein whether one-part or two-part UCI/CSI for FSBM is used for beam reporting could depend on the other CSI or beam reports. For example, the two-part UCI is used for the frequency-selective beam reporting for FSBM only when at least one of the other CSI or beam reports is configured with a two-part UCI.

In a fourth variation of the described/specified design examples herein, the UL channel for the frequency-selective beam reporting for FSBM (via two-part UCI/CSI) can be fixed, e.g., to PUSCH. In one example, the UL channel for the frequency-selective beam reporting for FSBM (via two-part UCI) can be fixed, e.g., to PUCCH. In one example, the UL channel for the frequency-selective beam reporting for FSBM (via two-part UCI) can be configured from PUCCH and PUSCH.

In a fifth variation of the described/specified design examples herein, the frequency-selective beam reporting for FSBM (via two-part UCI) can be configured via higher layer RRC signaling and/or MAC CE command. In one example, the frequency-selective beam reporting for FSBM (via two-part UCI) can only be triggered via a code point in DCI (UL-related or DL-related DCI).

FIG. 15 illustrates an example method 1500 performed by a UE in a wireless communication system according to embodiments of the present disclosure. The method 1500 of FIG. 15 can be performed by any of the UEs 111-116 of FIG. 1, such as the UE 116 of FIG. 3, and a corresponding method can be performed by any of the BSs 101-103 of FIG. 1, such as BS 102 of FIG. 2. The method 1500 is for illustration only and other embodiments can be used without departing from the scope of the present disclosure.

The method begins with the UE receiving first information for a CSI reporting setting to enable group based frequency selective beam reporting (1510). For example, in 1510, the first information indicates at least one of a higher layer parameter groupBasedFreqSelectiveBeamReporting configured or enabled; a number of the one or more groups; a maximum number of the one or more groups; a number of resource indicators in each of the one or more groups; and a maximum number of resource indicators in each of the one or more groups. The UE then receives second information indicating a set of frequency subbands for the CSI reporting setting (1520).

The UE then determines, based on the first and second information, one or more groups of resource indicators (1530). For example, in 1530, each group of the one or more groups of resource indicators respectively corresponds to at least one frequency subband from the set of frequency subbands and a resource indicator from the one or more groups of resource indicators is a SSBRI or a CRI.

In various embodiments, each group of the one or more groups of resource indicators corresponds to all the frequency subbands from the set of frequency subbands, and resource indicators in each group of the one or more groups are mapped to the frequency subbands from the set of frequency subbands according to one of a fixed mapping in system specifications or a network configuration or indication received via RRC signaling, a MAC-CE, or DCI. For example, the network configuration or indication includes a bitmap corresponding to the resource indicators in a group from the one or more groups, entries of the bitmap correspond to frequency subbands, respectively, from the frequency subbands, and when an entry of the bitmap is set to '1', a corresponding frequency subband belongs to the resource indicators in the group.

In various embodiments, the one or more groups are mapped to the at least one frequency subband from the set of frequency subbands according to one of a fixed mapping in system specifications or a network configuration or indication received via RRC signaling, a MAC-CE, or DCI. For example, the network configuration or indication includes a bitmap corresponding to the one or more groups, entries of the bitmap correspond to frequency subbands, respectively, from the set of frequency subbands, and when an entry of the bitmap is set to '1', a corresponding frequency subband belongs to the one or more groups.

The UE then transmits, in a first beam report, the one or more groups of resource indicators (1540). For example, in 1540, the UE may report the group(s) of resource indicators to a BS, such as BS 102. In various embodiments, the UE may also identify a subset of frequency subbands from the set of frequency subbands and transmit a second beam report including information corresponding to the subset frequency subbands. For example, the information includes at least one of IDs of the subset of frequency subbands; indexes of the subset of frequency subbands; and a bitmap including entries corresponding to frequency bands, respectively, from the set frequency subbands. If the information includes the bitmap, and when an entry of the bitmap is set to '1', a corresponding frequency subband belongs to the subset of frequency subbands.

In various embodiments, the first beam report includes a part one and a part two. The part one of the first beam report includes a first subset of the one or more groups and indicates a size of a second subset of the one or more groups.

The part two of the first beam report includes the second subset of the one or more groups.

Any of the above variation embodiments can be utilized independently or in combination with at least one other variation embodiment.

The above flowchart(s) illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of the present disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the descriptions in this application should be read as implying that any particular element, step, or function is an essential element that must be included in the claims scope. The scope of patented subject matter is defined by the claims.

What is claimed is:

1. A user equipment (UE), comprising:

a transceiver configured to:

receive first information for a channel state information (CSI) reporting setting associated with group based frequency selective beam reporting; and receive second information indicating a set of frequency subbands, and a processor operably coupled to the transceiver, the processor configured to determine, based on the first and second information, one or more groups of resource indicators, wherein the transceiver is further configured to transmit, in a first beam report, the one or more groups of resource indicators, wherein each group of the one or more groups of resource indicators respectively corresponds to at least one frequency subband from the set of frequency subbands, wherein a resource indicator from the one or more groups of resource indicators is a synchronization signal block resource indicator (SSBRI) or a CSI reference signal resource indicator (CRI), and wherein the one or more groups are mapped to the at least one frequency subband from the set of frequency subbands according to one of:

a fixed mapping in system specifications, or a network configuration or indication received via radio resource control (RRC) signaling, a medium access control (MAC) control element (CE), or downlink control information (DCI).

2. The UE of claim 1, wherein the first information indicates at least one of:

a higher layer parameter groupBasedFreqSelectiveBeamReporting configured or enabled;

a number of the one or more groups;

a maximum number of the one or more groups;

a number of resource indicators in each of the one or more groups; and a maximum number of resource indicators in each of the one or more groups.

3. The UE of claim 1, wherein:

each group of the one or more groups of resource indicators corresponds to all the frequency subbands from the set of frequency subbands, and resource indicators in each group of the one or more groups are mapped to the frequency subbands from the set of frequency subbands according to one of:

a fixed mapping in system specifications; or a network configuration or indication received via RRC signaling, a MAC CE or DCI.

4. The UE of claim 3, wherein:

the network configuration or indication includes a bitmap corresponding to the resource indicators in a group from the one or more groups, entries of the bitmap correspond to frequency subbands, respectively, from the frequency subbands, and when an entry of the bitmap is set to '1', a corresponding frequency subband belongs to the resource indicators in the group.

5. The UE of claim 1, wherein:

the network configuration or indication includes a bitmap corresponding to the one or more groups, entries of the bitmap correspond to frequency subbands, respectively, from the set of frequency subbands, and when an entry of the bitmap is set to '1', a corresponding frequency subband belongs to the one or more groups.

6. The UE of claim 1, wherein:

the processor is further configured to identify a subset of frequency subbands from the set of frequency subbands, the transceiver is further configured to transmit a second beam report including information corresponding to the subset frequency subbands, the information includes at least one of:

identities (IDs) of the subset of frequency subbands;

indexes of the subset of frequency subbands; and a bitmap including entries corresponding to frequency bands, respectively, from the set frequency subbands, and if the information includes the bitmap, and when an entry of the bitmap is set to '1', a corresponding frequency subband belongs to the subset of frequency subbands.

7. The UE of claim 1, wherein:

the first beam report includes a part one and a part two;

the part one of the first beam report includes a first subset of the one or more groups and indicates a size of a second subset of the one or more groups; and the part two of the first beam report includes the second subset of the one or more groups.

8. A base station (BS), comprising:

a transceiver configured to:

transmit first information for a channel state information (CSI) reporting setting associated with group based frequency selective beam reporting;

transmit second information indicating a set of frequency subbands; and receive, in a first beam report, one or more groups of resource indicators that are based on the first and second information, wherein each group of the one or more groups of resource indicators respectively corresponds to at least one frequency subband from the set of frequency subbands, wherein a resource indicator from the one or more groups of resource indicators is a synchronization signal block resource indicator (SSBRI) or a CSI reference signal resource indicator (CRI), and wherein the one or more groups are mapped to the at least one frequency subband from the set of frequency subbands according to one of:

a fixed mapping in system specifications; or a network configuration or indication received via radio resource control (RRC) signaling, a medium access control (MAC) control element (CE), or downlink control information (DCI).

9. The BS of claim 8, wherein the first information indicates at least one of:

a higher layer parameter groupBasedFreqSelectiveBeam-Reporting configured or enabled;

a number of the one or more groups;

a maximum number of the one or more groups;

a number of resource indicators in each of the one or more groups; and a maximum number of resource indicators in each of the one or more groups.

10. The BS of claim 8, wherein:

each group of the one or more groups of resource indicators corresponds to all the frequency subbands from the set of frequency subbands, and resource indicators in each group of the one or more groups are mapped to the frequency subbands from the set of frequency subbands according to one of:

a fixed mapping in system specifications; or a network configuration or indication transmitted via RRC signaling, a MAC CE or DCI.

11. The BS of claim 10, wherein:

the network configuration or indication includes a bitmap corresponding to the resource indicators in a group from the one or more groups, entries of the bitmap correspond to frequency subbands, respectively, from the frequency subbands, and when an entry of the bitmap is set to '1', a corresponding frequency subband belongs to the resource indicators in the group.

12. The BS of claim 8, wherein:

the network configuration or indication includes a bitmap corresponding to the one or more groups, entries of the bitmap correspond to frequency subbands, respectively, from the set of frequency subbands, and when an entry of the bitmap is set to '1', a corresponding frequency subband belongs to the one or more groups.

13. The BS of claim 8, wherein:

the transceiver is further configured to receive a second beam report including information corresponding to a subset frequency subbands from the set of frequency subbands, the information includes at least one of:

identities (IDs) of the subset of frequency subbands;

indexes of the subset of frequency subbands; and a bitmap including entries corresponding to frequency bands, respectively, from the set frequency subbands, and if the information includes the bitmap, and when an entry of the bitmap is set to '1', a corresponding frequency subband belongs to the subset of frequency subbands.

14. The BS of claim 8, wherein:

the first beam report includes a part one and a part two;

the part one of the first beam report includes a first subset of the one or more groups and indicates a size of a second subset of the one or more groups; and the part two of the first beam report includes the second subset of the one or more groups.

15. A method performed by a user equipment (UE), the method comprising:

receiving first information for a channel state information (CSI) reporting setting associated with group based frequency selective beam reporting;

receiving second information indicating a set of frequency subbands;

determining, based on the first and second information, one or more groups of resource indicators; and transmitting, in a first beam report, the one or more groups of resource indicators, wherein each group of the one or more groups of resource indicators respectively corresponds to at least one frequency subband from the set of frequency subbands, wherein a resource indicator from the one or more groups of resource indicators is a synchronization signal block resource indicator (SSBRI) or a CSI reference signal resource indicator (CRI), and wherein the one or more groups are mapped to the at least one frequency subband from the set of frequency subbands according to one of:

a fixed mapping in system specifications, or a network configuration or indication received via radio resource control (RRC) signaling, a medium access control (MAC) control element (CE), or downlink control information (DCI).

16. The method of claim 15, wherein the first information indicates at least one of:

a higher layer parameter groupBasedFreqSelectiveBeam-Reporting configured or enabled;

a number of the one or more groups;

a maximum number of the one or more groups;

a number of resource indicators in each of the one or more groups; and a maximum number of resource indicators in each of the one or more groups.

17. The method of claim 15, wherein:

each group of the one or more groups of resource indicators corresponds to all the frequency subbands from the set of frequency subbands, and resource indicators in each group of the one or more groups are mapped to the frequency subbands from the set of frequency subbands according to one of:

a fixed mapping in system specifications; or a network configuration or indication received via RRC signaling, a MAC CE or DCI.

18. The UE of claim 17, wherein:

the network configuration or indication includes a bitmap corresponding to the resource indicators in a group from the one or more groups, entries of the bitmap correspond to frequency subbands, respectively, from the frequency subbands, and when an entry of the bitmap is set to '1', a corresponding frequency subband belongs to the resource indicators in the group.

* * * * *